United States Patent
Lee et al.

(10) Patent No.: US 10,236,942 B2
(45) Date of Patent: Mar. 19, 2019

(54) ELECTRONIC DEVICE HAVING LOOP ANTENNA

(71) Applicant: Samsung Electronics Co., Ltd., Gyeonggi-do (KR)

(72) Inventors: Woosup Lee, Gyeonggi-do (KR); Jungsik Park, Gyeonggi-do (KR); Sehwan Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 187 days.

(21) Appl. No.: 15/430,761

(22) Filed: Feb. 13, 2017

(65) Prior Publication Data
US 2017/0237149 A1   Aug. 17, 2017

(30) Foreign Application Priority Data

Feb. 11, 2016 (KR) .................. 10-2016-0015432
Sep. 19, 2016 (KR) .................. 10-2016-0119109

(51) Int. Cl.
*H04B 5/00* (2006.01)
*G06F 1/16* (2006.01)
(Continued)

(52) U.S. Cl.
CPC ........... *H04B 5/0075* (2013.01); *G04G 21/00* (2013.01); *G06F 1/1601* (2013.01); *G06F 1/163* (2013.01);
(Continued)

(58) Field of Classification Search
CPC ..... G04G 21/00; G06F 1/1601; G06F 1/1626; G06F 1/163; G06F 1/1698; G06K 7/00;
(Continued)

(56) References Cited

U.S. PATENT DOCUMENTS 7,545,337 B2    6/2009  Guenther
8,462,002 B2 *  6/2013  Hyde ................. G08B 3/10
                                                340/600

(Continued)

FOREIGN PATENT DOCUMENTS

KR   1020130127853    11/2013
KR     101485569      1/2015

OTHER PUBLICATIONS

International Search Report dated May 19, 2017 issued in counterpart application No. PCT/KR2017/001338, 3 pages.
European Search Report dated Dec. 13, 2018 issued in counterpart application No. 17750424.8-1221, 8 pages.

*Primary Examiner* — Lewis G West
(74) *Attorney, Agent, or Firm* — The Farrell Law Firm, P.C.

(57) ABSTRACT

An electronic device is provided that includes a housing having a first surface facing a first direction, and a second surface facing a second direction opposite to the first direction. The electronic device also includes a conductive pattern having a first conductive coil with an axis that is substantially perpendicular to the first direction or the second direction. The electronic device additionally includes a communication circuit configured to cause the first conductive coil to generate a magnetic flux. The second surface includes a first region made of a conductive material and a second region made of a nonconductive material. When viewed from the second surface, the first conductive coil is disposed mostly under the first region. The first conductive coil is configured to include a first section disposed near or on the second region to cause the magnetic flux to pass through the second region.

20 Claims, 82 Drawing Sheets

(51) Int. Cl.

| | |
|---|---|
| *G06Q 20/32* | (2012.01) |
| *H01Q 7/00* | (2006.01) |
| *H04M 1/725* | (2006.01) |
| *G04G 21/00* | (2010.01) |
| *G06K 7/00* | (2006.01) |
| *H01Q 1/24* | (2006.01) |
| *H01Q 1/27* | (2006.01) |
| *H02J 7/02* | (2016.01) |
| *H02J 50/10* | (2016.01) |

(52) U.S. Cl.
CPC .......... *G06F 1/1626* (2013.01); *G06F 1/1698* (2013.01); *G06K 7/00* (2013.01); *G06Q 20/3278* (2013.01); *H01Q 1/243* (2013.01); *H01Q 7/00* (2013.01); *H04M 1/725* (2013.01); *H01Q 1/273* (2013.01); *H02J 7/025* (2013.01); *H02J 50/10* (2016.02)

(58) Field of Classification Search
CPC .... G06Q 20/3278; H01Q 1/243; H01Q 1/273; H01Q 7/00; H02J 50/10; H02J 7/025; H04B 5/0075; H04M 1/725
See application file for complete search history.

(56) References Cited

U.S. PATENT DOCUMENTS

| | | |
|---|---|---|
| 2004/0017318 A1 | 1/2004 | Annabi et al. |
| 2006/0139034 A1* | 6/2006 | Nevermann ............ G01D 5/48 324/644 |
| 2013/0176179 A1* | 7/2013 | Park ....................... H01Q 1/243 343/702 |
| 2014/0035793 A1 | 2/2014 | Kato et al. |
| 2014/0123701 A1 | 5/2014 | Kim |
| 2014/0125528 A1 | 5/2014 | Tsai et al. |
| 2014/0291404 A1* | 10/2014 | Matsuoka .......... G06K 7/10881 235/462.46 |
| 2014/0375262 A1* | 12/2014 | Yamaguchi ............. H02J 50/90 320/108 |
| 2015/0188228 A1 | 7/2015 | Yosui |
| 2015/0198981 A1 | 7/2015 | Chung et al. |
| 2015/0207223 A1* | 7/2015 | Nakano .................. H01Q 1/243 343/702 |
| 2015/0207913 A1* | 7/2015 | Nakano .................... H01Q 7/00 455/41.1 |
| 2015/0222009 A1 | 8/2015 | Asou et al. |
| 2018/0069312 A1* | 3/2018 | Lee .................... G06Q 20/3278 |
| 2018/0097275 A1* | 4/2018 | Lee ....................... G06F 1/1635 |

* cited by examiner

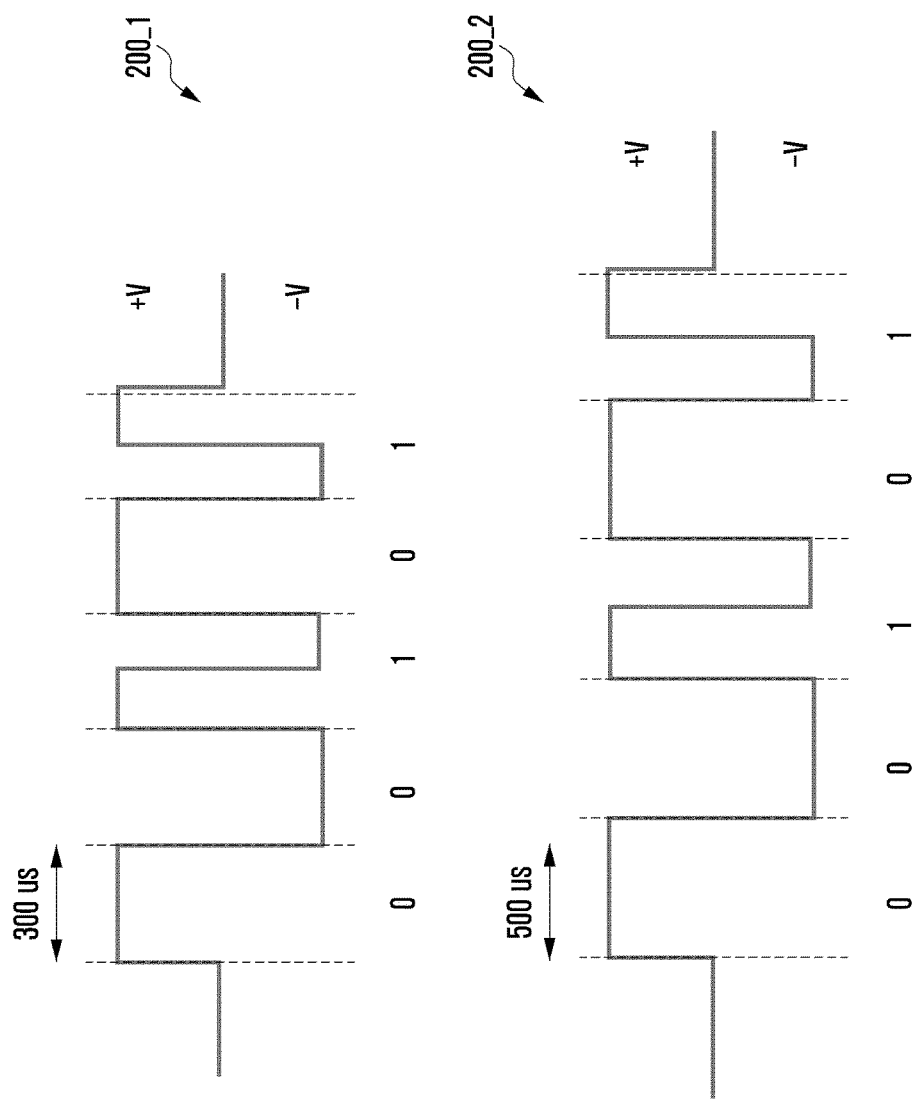

FIG. 3

%B5178057716182832^HUANG/ENYANG^13071010000000000101404080000000?

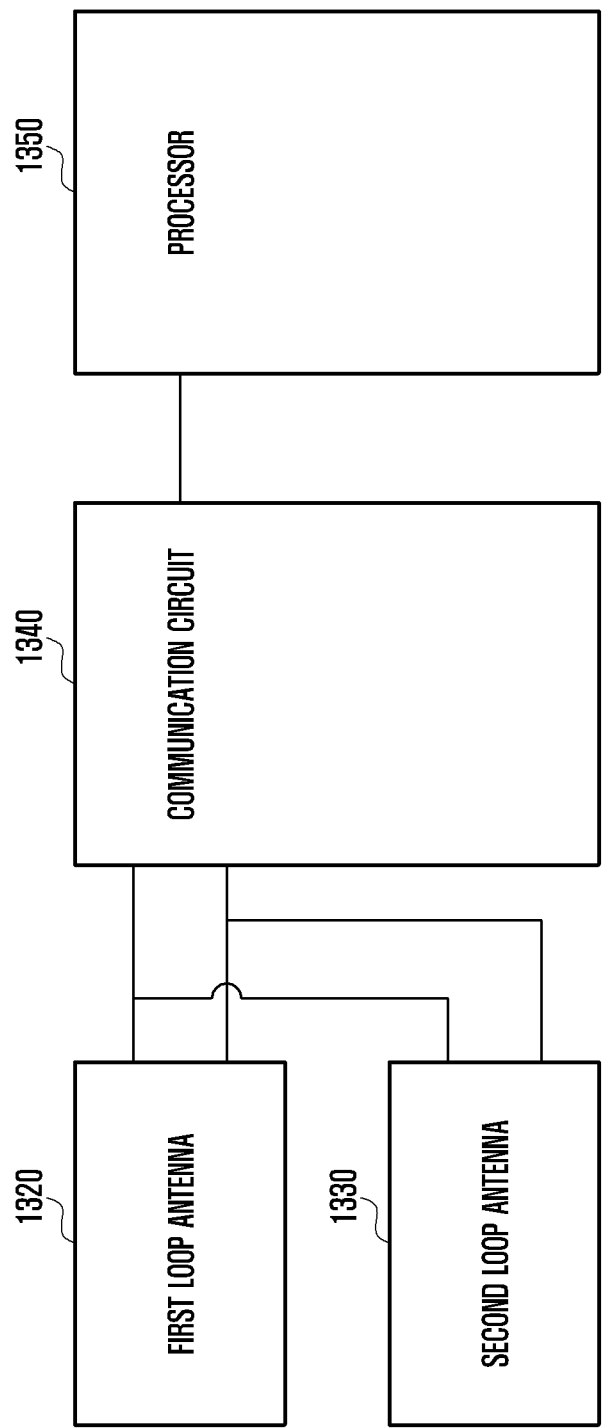

FIG. 47A

| SS | FC | PAN | FS | NAME | FS | ADDITIONAL DATA | ES | DISCRETIONARY DATA | ES | LRC |
|---|---|---|---|---|---|---|---|---|---|---|
| | | [19 Digits max] | | [26 alphanumeric characters Max] | | Expiration data (YYMM) 4 Service Code 3 | | *PVKI 1 *PVV or Oset 4 *CVV or *CVC 3 Some or all of the above elds may be found with the discretionary data | | |
| % | B | 1234123412341234 | < | TOM/SMITH | < | 1908201 | | 000000000000000001190000000 | ? | |

FIG. 47B

| SS | PAN (19 Digits max) | FS | ADDITIONAL DATA<br>No. of characters<br>Expiration data (YYMM) 4<br>Service Code 3 | DISCRETIONARY DATA<br>*PVKI 1<br>*PVV or Oset 4<br>*CVV or *CVC 3<br>Some or all of the above<br>elds may be found with<br>the discretionary data<br>Card Data Format – Track 3 (ISO 4909)<br>104 NUMERIC DATA CHARACTERS<br>SS | ES | LRC |
|---|---|---|---|---|---|---|
| ; | 1234123412341234 | = | 1905201 | 00000119000000 | ? | LRC |

FIG. 47C

| SS | FC | PAN (19 Digits max) | FS | USE AND SECURITY DATA<br>No. of characters<br>County Code (optional) 3<br>Currency Code 3<br>Currency Exponent 1<br>Anlybt Authorized per Cycle 4<br>Anlybt Remaining this Cycle 4<br>Cycle Begin (Validity Data) 4<br>Cycle Length 2<br>Retry Count 1<br>PIN Control Parameters (optional) 6<br>Interchange Controls 1<br>PAN Service Restriction 2<br>SAN-1 Service Restriction 2<br>SAN-2 Service Restriction 2<br>Expiration Data (optional) 4<br>Card Sequence Number 1<br>Card Security Number (optional) 9 | ADDITIONAL DATA<br>First subsidiary Account No.<br>(optional)<br>*CVV or *CVC 3<br>Secondary subsidiary Account No.<br>(optional)<br>Relay Marker 1<br>Cryptographic Check Digits 6<br>(optional)<br>Discretionary Data | ES | LRC |
|---|---|---|---|---|---|---|---|
| + | 01 | 1234123412341234 | = | 5834667805007704D=410410300000000000000000000015000<br>0099991=58346678050000000==0-030777000000004 | | ? | LRC |

ELECTRONIC DEVICE HAVING LOOP ANTENNA

PRIORITY

This application claims priority under 35 U.S.C. § 119(a) to Korean Patent Application No. 10-2016-0015432, which was filed in the Korean Intellectual Property Office on Feb. 11, 2016, and Korean Patent Application No. 10-2016-0119109, which was filed in the Korean Intellectual Property Office on Sep. 19, 2016, the contents of which are incorporated herein by reference.

BACKGROUND

1. Field of the Disclosure

The present disclosure relates generally to an electronic device having a loop antenna, and more particularly, to an electronic device that uses a loop antenna to emit a magnetic field signal containing, for example, payment information.

2. Description of the Related Art

A typical card reader (e.g., a point of sales (POS) terminal) includes a header and coil to read information stored in the track of a magnetic card. Card data is recorded in the track of a magnetic strip line of a magnetic card, and the track may include a start sentinel (SS), an end sentinel (ES), and longitudinal a redundancy check (LRC) character.

When the track is swiped through the header at a rail of the card reader, a change occurs in the magnetic flux through the coil coupled to the header. This change in the magnetic flux causes a current to flow through the card reader. The card reader is able to read and process card data recorded in the track due to this current.

An electronic device may be equipped with a module for magnetic field communication. The electronic device may use this module to carry out magnetic field communication with another device.

An electronic device may have an antenna for magnetic field communication. However, when the size of an electronic device decreases and the functionality thereof remains versatile, the space required to mount an antenna may become insufficient in the electronic device. Further, the electronic device may have to mount various types of antennas in a limited amount of space. In addition, due to the fact that the electronic device includes various components made of conductive materials, those conductive components may degrade antenna performance for transmission and reception.

SUMMARY

The present disclosure has been made to address at least the above problems and/or disadvantages and to provide at least the advantages described below. Accordingly, an aspect of the present disclosure provides an electronic device with high radiation performance.

In accordance with an aspect of the present disclosure, an electronic device is provided that includes a housing having a first surface facing a first direction, a second surface facing a second direction opposite to the first direction, and a side member enclosing at least a portion of a space between the first surface and the second surface. The electronic device also includes a conductive pattern disposed in the housing and having a first conductive coil with an axis that is substantially perpendicular to the first direction or the second direction. The electronic device additionally includes a communication circuit disposed in the housing, electrically connected with the first conductive coil, and configured to cause the first conductive coil to generate a magnetic flux. The electronic device further includes a display exposed through at least a portion of the first surface, and a processor disposed in the housing and electrically connected with the communication circuit and the display. The second surface includes a first region made of a conductive material and a second region made of a nonconductive material. The first region includes one or more openings. The second region fills a first opening of the one or more openings. When viewed from the second surface, the first conductive coil is disposed mostly under the first region. The first conductive coil is configured to include a first section disposed near or on the second region to cause the magnetic flux to pass through the second region.

In accordance with another aspect of the present disclosure, an electronic device is provided that includes a housing having a first surface facing a first direction, a second surface facing a second direction opposite to the first direction, and a side member enclosing at least a portion of a space between the first surface and the second surface. The electronic device also includes a conductive pattern disposed in the housing, and having a first conductive coil with a first axis that is substantially parallel with the first direction or the second direction, and a second conductive coil with a second axis that is substantially perpendicular to the first direction or the second direction. The electronic device additionally includes a communication circuit disposed in the housing, electrically connected with the first conductive coil and the second conductive coil, and configured to cause at least one of the first conductive coil and the second conductive coil to generate a magnetic flux. The electronic device further includes a display exposed through at least a portion of the first surface, and a processor disposed in the housing and electrically connected with the communication circuit and the display. When viewed from the second surface, the first conductive coil encloses the second conductive coil, and the second conductive coil is disposed mostly under the second surface.

BRIEF DESCRIPTION OF THE DRAWINGS

The above and other aspects, features, and advantages of certain embodiments of the present disclosure will be more apparent from the following detailed description when taken in conjunction with the accompanying drawings, in which:

FIG. 2B is a diagram illustrating an MST signal having a pulse timing that is different from that of FIG. 2A, according to an embodiment of the present disclosure;

FIG. 3 illustrates a character string contained in the track, according to an embodiment of the present disclosure;

FIG. 5 illustrates track information carried by an MST signal, according to an embodiment of the present disclosure;

FIG. 6 illustrates multiple pieces of track information carried by an MST signal, according to an embodiment of the present disclosure;

FIGS. 13A and 13B are diagrams illustrating an electronic device having multiple solenoid-type loop antennas, according to an embodiment of the present disclosure;

FIGS. 47A to 47C are diagrams illustrating formats of data recorded on tracks of a magnetic card, according to an embodiment of the present disclosure;

DETAILED DESCRIPTION

Figure 1A:
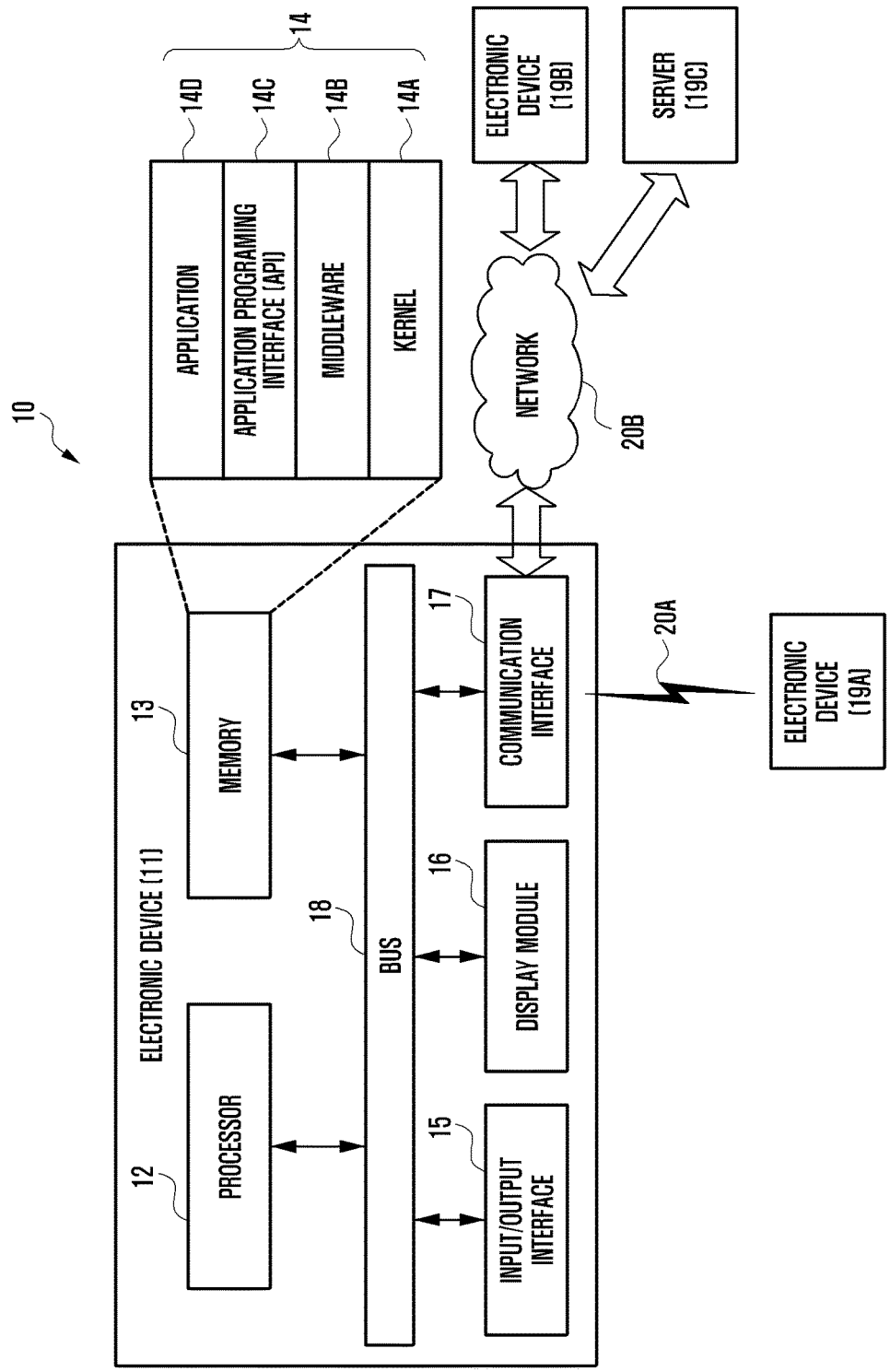
FIG. 1A is a block diagram of a network environment including electronic devices, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used herein are not limited to their dictionary meanings, but are merely used to enable a clear and consistent understanding of the present disclosure. Accordingly, it should be apparent to those skilled in the art that the following description is provided for illustrative purposes only and not for the purpose of limiting the present disclosure.

It is to be understood that the singular forms "a," "an," and "the" also include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include" or "may include" refers to the existence of a corresponding disclosed function, operation, or component, which can be used in various embodiments of the present disclosure and does not limit the use of one or more additional functions, operations, or components. Terms such as "include" and "have" may refer to a certain characteristic, number, operation, constituent element, component or a combination thereof, but may not be construed to exclude the existence of or a possibility of the addition of one or more other characteristics, numbers, operations, constituent elements, components, or combinations thereof.

The expressions "or" and "at least one of A and B" includes any or all of combinations of words listed together. For example, the expression "A or B" or "at least one of A and B" may include A, B, or both A and B.

The expressions "1", "2", "first", and "second", as used herein, may modify various components of the various embodiments but do not limit the corresponding components. For example, the above expressions do not limit the sequence and/or importance of the components. The expressions may be used for distinguishing one component from other components. For example, a first user device and a second user device may indicate different user devices although both are user devices. For example, without departing from the scope of the present disclosure, a first structural element may be referred to as a second structural element. Similarly, the second structural element may be referred to as the first structural element.

When a component is described as "coupled to" or "connected to" another component, the component may be directly coupled or connected to the other component, or a component may exist between the component and the other component. In contrast, when a component is described as "directly coupled to" or "directly connected to" another component, a component does not exist between the component and the other component.

Unless defined differently, all terms used herein, which include technical terminologies or scientific terminologies, have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined herein.

An electronic device, according to an embodiment of the present disclosure, may have a communication function. For example, the electronic device may be one of or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD), such as electronic glasses, electronic clothes, an electronic bracelet, an electronic necklace, an electronic accessary, an electronic tattoo, a smart watch, and the like).

According to an embodiment of the present disclosure, the electronic device may be a smart home appliance having a communication function. The smart home appliance may include at least one of a television (TV), a digital versatile disc (DVD) player, an audio player, an air conditioner, a cleaner, an oven, a microwave oven, a washing machine, an air cleaner, a set-top box, a TV box, game consoles, an electronic dictionary, an electronic key, a camcorder, and an electronic frame.

According to an embodiment of the present disclosure, the electronic device may include at least one of various types of medical devices (e.g., magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, a point of sales (POS) device of shops, and an Internet of things (IoT) device (e.g., a fire alarm, various sensors, electric or gas meter units, a sprinkler, a thermostat, a streetlamp, a toaster, sport outfits, a hot-water tank, a heater, a boiler and the like).

According to an embodiment of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function. The electronic device may be one or a combination of the above described various devices. Further, the electronic device may be a flexible device. It is apparent to those skilled in the art that the electronic device is not limited to the above described devices.

The term "user", as used herein, may refer to a person who uses an electronic device or a device (e.g., an artificial intelligence electronic device) that uses an electronic device.

FIG. 1A is a diagram illustrating a network environment including an electronic device, according to an embodiment of the present disclosure.

Referring to FIG. 1A, an electronic device 11 includes a bus 18, a processor 12, a memory 13, an input/output interface 15, a display 16, and a communication interface 17.

The bus 18 may be a circuit connecting the above-described components and transmitting communication (e.g., a control message) between the above-described components.

The processor 12 may receive commands from other components (e.g., the memory 13, the input/output interface 15, the display 16, the communication interface 17, or a power management module) through the bus 18, analyze the received commands, and execute a calculation or data processing according to the analyzed commands.

The memory 13 stores commands or data received from the processor 12 or other components (e.g., the input/output interface 15, the display 16, the communication interface 17, or the power management module) or generated by the processor 12 or other components. The memory 13 may store software and/or a program. For example, a program 14 includes a kernel 14A, middleware 14B, an application programming interface (API) 14C, and an application program (or an application) 14D. At least part of the kernel 14A, the middleware 14B or the API 14C may refer to an operating system (OS).

The kernel 14A controls or manages system resources (e.g., the bus 18, the processor 12, or the memory 13) used for executing an operation or function implemented by the remaining other programming modules, for example, the middleware 14B, the API 14C, or the application 14D. Further, the kernel 14A provides an interface for accessing individual components of the electronic device 11 from the middleware 14B, the API 14C, or the application 14D to control or manage the components.

The middleware 14B performs a relay function of allowing the API 14C or the application 14D to communicate with the kernel 14A to exchange data. Further, in operation requests received from the application 14D, the middleware 14B performs a control for the operation requests (e.g., scheduling or load balancing) by using a method of assigning a priority, by which system resources (e.g., the bus 18, the processor 12, the memory 13 and the like) of the electronic device 11 can be used, to the application 14D.

The API 14C is an interface by which the application 14D can control a function provided by the kernel 14A or the middleware 14B and includes, for example, at least one interface or function (e.g., a command) for a file control, a window control, image processing, or a character control.

According to an embodiment of the present disclosure, the application 14D may include a short message service (SMS)/multimedia messaging service (MMS) application, an email application, a calendar application, an alarm application, a health care application (e.g., application measuring quantity of exercise or blood sugar level) or an environment information application (e.g., application providing information on barometric pressure, humidity or temperature). Additionally, or alternatively, the application 14D may be an application related to an information exchange between the electronic device 11 and an external electronic device (e.g., a second external electronic device 19B). The application 14D related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 11 to the external electronic device 19B. Additionally, or alternatively, the notification relay application may receive notification information from, for example, the second external electronic device 19B, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 11, an application executed in the second external electronic device 19B, or a service (e.g., a call service or a message service) provided by the second external electronic device 19B.

According to an embodiment of the present disclosure, the application 14D may include an application designated according to an attribute (e.g., a type of electronic device) of the second external electronic device 19B. For example, when the second external electronic device 19B is a moving picture experts group (MPEG-1 or MPEG-2) audio layer III (MP3) player, the application 14D may include an application related to music reproduction. Similarly, when the second external electronic device 19B is a mobile medical device, the application 14D may include an application related to health care. According to an embodiment of the present disclosure, the application 14D may include at least one of an application designated to the electronic device 11 and an application received from an external electronic device (e.g., a server 19C or the second external electronic device 19B).

The input/output interface 15 transmits a command or data input from the user through an input/output device 15 (e.g., a sensor, a keyboard, or a touch screen) to the processor 12, the memory 13, the communication interface 17, or the display control module 16 through, for example, the bus 18. For example, the input/output interface 15 may provide data on a user's touch input through a touch screen to the processor 12. Further, the input/output interface 15 may output a command or data received through, for example, the bus 18, from the processor 12, the memory 13, the communication interface 17, or the power management module through the input/output device (e.g., a speaker or a display). For example, the input/output interface 15 may output voice data processed through the processor 12 to the user through the speaker.

The display 16 may include, for example, liquid crystal display (LCD), flexible display, transparent display, light-emitting diode (LED) display, organic LED (OLED) display, microelectromechanical systems (MEMS) display, or electronic paper display. The display 16 may visually offer, for example, various contents (e.g., text, image, video, icon, symbol, and the like) to users. The display 16 may include a touch screen and receive, for example, a touch, gesture, proximity, or hovering input using an electronic pen or a user's body. The display 16 may be one or more displays. For example, the display 16 may be included in the electronic device 11 or included in an external device (e.g., a first external electronic device 19A or the second external electronic device 19B) having a wired or wireless connection with the electronic device 11, thus outputting information offered by the electronic device 11 to users.

According to an embodiment of the present disclosure, the display 16 may be attachable to or detachable from the electronic device 11. For example, the display 16 may include an interface which can be mechanically or physically connected with the electronic device 11. In case the display 16 is detached (e.g., separated) from the electronic device 11 by a user's selection, the display 16 may receive various control signals or image data from the power management module or the processor 12, e.g., through wireless communication.

The communication interface 17 may establish communication between the electronic device 11 and any external device (e.g., the first external electronic device 19A, the second external electronic device 19B, or the server 19C).

For example, the communication interface 17 may be connected with a network 20B through wired or wireless communication and thereby communicate with any external device.

According to an embodiment of the present disclosure, the electronic device 11 may be connected with the first external electronic device 19A and the second external electronic device 19B without using the communication interface 17. For example, based on at least one of a magnetic sensor, a contact sensor, a light sensor, and the like that is equipped in the electronic device 11, the electronic device 11 may detect whether at least one of the first and second external electronic devices 19A and 19B is contacted with at least part of the electronic device 11, or whether at least one of the first and second external electronic device 19A and 19B, respectively, is attached to at least part of the electronic device 11.

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication 20A may include, for example, at least one of Wi-Fi, Bluetooth (BT), near field communication (NFC), MST or near field magnetic data stripe transmission, and GNSS, and the like. The GNSS may include at least one of, for example, a global positioning system (GPS), a global navigation satellite system (GLONASS), a BeiDou navigation satellite system (BeiDou), and Galileo (European global satellite-based navigation system). Hereinafter, the "GPS" may be interchangeably used with the "GNSS". Wired communication may include, for example, at least one of universal serial bus (USB), high definition multimedia interface (HDMI), recommended standard-232 (RS-232), plain old telephone service (POTS), and the like. The network 20B may include telecommunication network, for example, at least one of a computer network (e.g., local area network (LAN) or wide area network (WAN)), internet, and a telephone network.

The first and second external electronic devices 19A and 19B may be identical to, or different from, the electronic device 11. According to an embodiment of the present disclosure, the first and second external electronic devices 19A and 19B may include, for example, a plurality of electronic devices. The server 19C may include a single server or a group of servers. All or part of operations executed in the electronic device 11 may be executed in other electronic device(s), such as the first and second electronic devices 19A and 19B or the server 19C.

According to an embodiment of the present disclosure, when the electronic device 11 is required to perform a certain function or service automatically or by request, the electronic device 11 may request another device (e.g., the first or second external electronic device 19A or 19B or the server 19C) to execute instead, or additionally at least part, of at least one or more functions associated with the required function or service. The requested device may execute the requested function and deliver the result of execution to the electronic device 11. Then, the electronic device 11 may offer the required function or service, based on the received result or by processing the received result. For the above, cloud computing technology, distributed computing technology, or client-server computing technology may be used, for example.

Figure 1B:
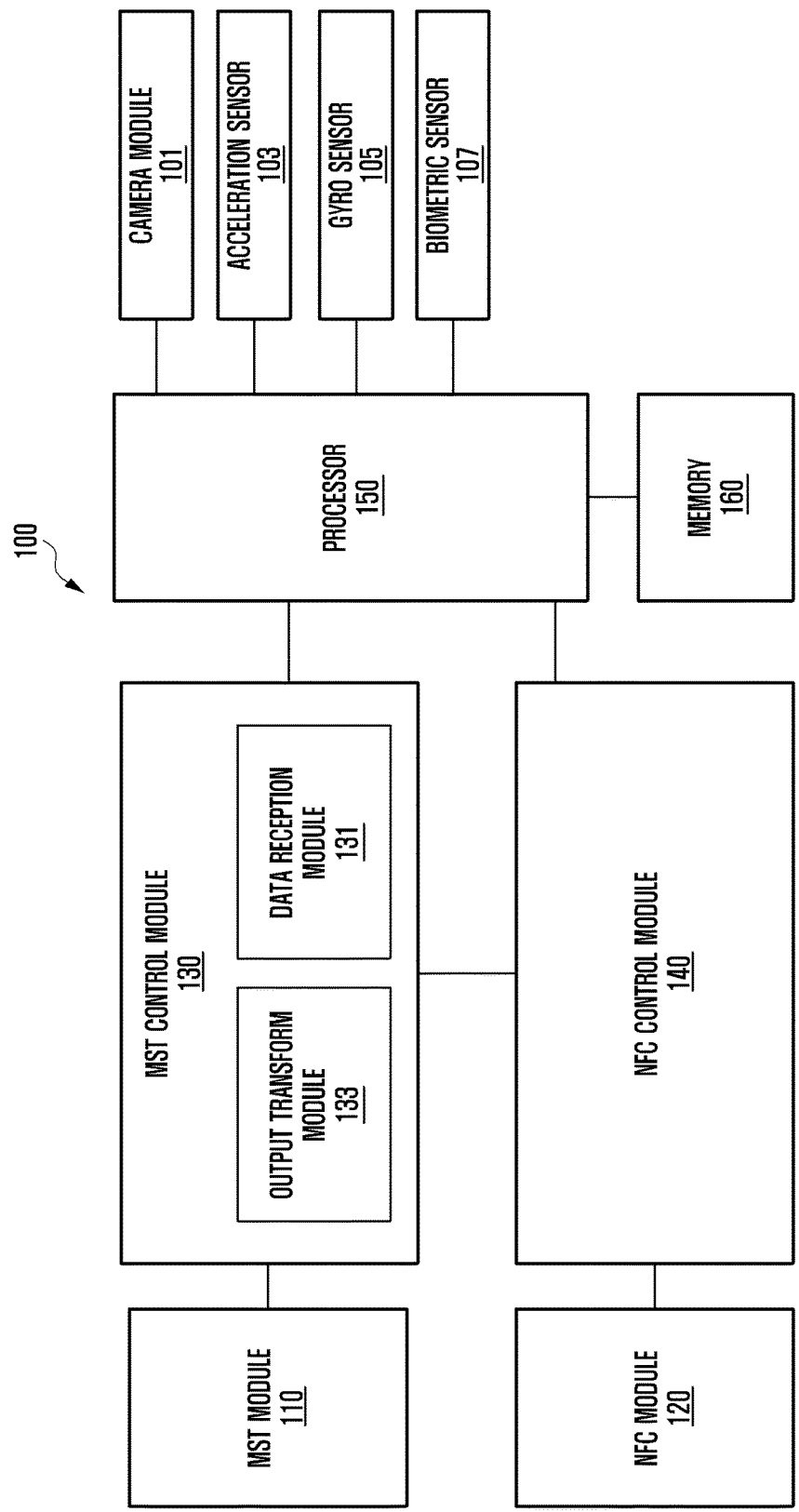
FIG. 1B is a block diagram of an electronic device providing a payment function, according to an embodiment of the present disclosure.

FIG. 1B is a block diagram illustrating a configuration of an electronic device capable of performing a payment function, according to an embodiment of the present disclosure.

Referring to FIG. 1B, an electronic device 100 includes a camera module 101, an acceleration sensor 103, a gyro sensor 105, a biometric sensor 107, an MST module 110, an NFC module 120, an MST control module 130, an NFC control module 140, a processor 150, and a memory 160.

In an embodiment of the present disclosure, the camera module 101 takes an image of a card to make a payment and obtains the card information. The camera module 101 is capable of recognizing card information (e.g., card issuing company, card number, expiration date, card holder name, and the like), recorded in a card, via an optical character reader (OCR) function. Alternatively, a user may directly input card information to his/her electronic device, using an input device of the electronic device, e.g., a touch panel, a pen sensor, keys, an ultrasonic input system, a microphone, and the like.

In an embodiment of the present disclosure, the acceleration sensor 103 or gyro sensor 105 is capable of obtaining location information regarding the electronic device when payment is performed, and transferring the obtained location information to the processor 150. The processor 150 controls the current supplied to an antenna (e.g., coil antenna) of the MST module 110, based on the location information regarding the electronic device, to control the intensity of magnetic field emitted to a POS terminal. Alternatively, when the MST module 110 has a number of coil antennas, the processor 150 may select a coil antenna that is used.

In an embodiment of the present disclosure, the biometric sensor 107 is capable of obtaining user biometric information (e.g., fingerprint or iris information) to authenticate a card for payment or a user.

In an embodiment of the present disclosure, the MST module 110 is capable of including a coil antenna. The MST control module 130 is capable of supplying voltage to both ends of the coil antenna, in a different polarity, according to data (e.g., a binary value, 0 or 1), thereby controlling the direction of electric current flowing in the coil antenna. The signal emitted from the coil antenna (or a magnetic field signal induced by electric current flowing in the coil) produces induced electromotive force in an POS terminal as if a magnetic card is read by the POS terminal.

In an embodiment of the present disclosure, the MST control module 130 includes a data reception module 131 and an output transform module 133. The data reception module 131 is capable of receiving a logical high/low pulse containing payment information from the processor 150 (or a built-in security module of the electronic device 100).

In an embodiment of the present disclosure, the output transform module 133 is implemented with a circuit that is capable of transforming data, recognized by the data reception module 131, to a corresponding format of data to be transmitted to the MST module 110. The circuit may include an H-bridge configured to alternate the polarity of voltage supplied to both ends of the MST module 110.

In an embodiment of the present disclosure, the electronic device 100 is capable of receiving information regarding a card via the camera module 101 or an input device (e.g., a touch panel, a pen sensor, and the like), and payment information (e.g., Track 1, Track 2, Track 3 or token information), contained in at least part of the magnetic strip of the card (e.g., a magnetic card), from a card issuing company/bank server, via a communication module, based on the card information. The electronic device 100 is capable of storing the payment information, as a corresponding format, in the processor 150 or a built-in security module.

Figure 2A:
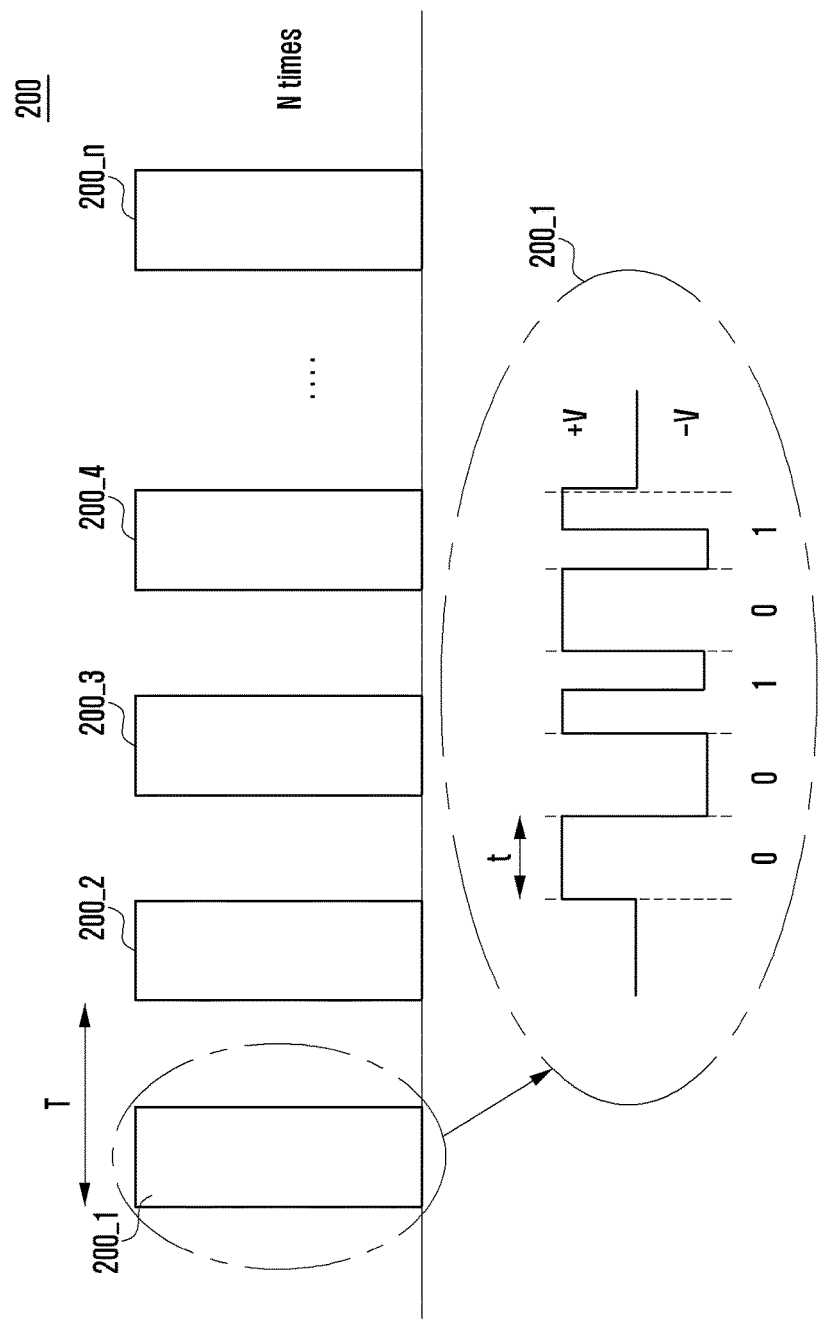
FIG. 2A is a diagram illustrating a magnetic secure transmission (MST) signal emitted by an MST module, according to an embodiment of the present disclosure.

FIG. 2A is a diagram illustrating an MST signal emitted from an MST module, according to an embodiment of the present disclosure. FIG. 2B shows diagrams illustrating pulse timings of an MST signal, according to an embodiment of the present disclosure. Herein, the expression "pulse timing" refers to a time interval from a start point of a pulse to a start point of the next pulse, and is also referred to as "pulse duration" or "duration."

Referring to FIG. 2A, the electronic device (e.g., the electronic device 100 of FIG. 1B) is capable of emitting MST signals containing payment information via an MST module, a number of times (e.g., N times, where N is a positive integer), every one cycle T. Each of the emitted MST signals, first MST signal 200_1 to n-th MST signal 200_*n*, may contain a logical low/high pulse corresponding to 0 or 1 binary value. For example, when a voltage formed in a pulse does not change in level for a period of time t, the state represents '0', which is a logical low. When a voltage formed in a pulse changes in level (or in phase), the state represents '1', which is a logical high.

In an embodiment of the present disclosure, the MST module is capable of periodically emitting the same MST signal. For example, an MST signal may contain payment information recorded in at least part of a card. As shown in FIG. 2A, each of the MST signals 200, the first MST signal 200_1 to n-th MST signal 200_*n*, may contain at least part of the following pieces of information regarding a card, Track 1, Track 2, Track 3, and token. For example, each of the first MST signal 200_1 to n-th MST signal 200_*n* may contain two or more of the following pieces of information regarding a card, Track 1, Track 2, Track 3, and token.

In an embodiment of the present disclosure, the MST module may periodically emit other MST signals. For example, while MST signals 200 are emitted, the first MST signal 200_1 to the n-th MST signal 200_*n* may contain track information items that differ from each other. For example, each of the MST signals, e.g., the MST signals 200_1 to 200_*n*, may contain information items recorded in two or more of the following card tracks, Track 1, Track 2, and Track 3.

While MST signals 200 are emitted, MST signals 200_1 to 200_*n* may have formats that differ from each other. For example, MST signals may have pulse timings or cycles Ts, which differ from each other.

Referring to FIG. 2B, the electronic device (e.g., the electronic device 100 shown in FIG. 1B) is capable of emitting MST signals containing payment information via the MST module, at different pulse timings t. In an embodiment of the present disclosure, the MST signals, e.g., MST signals 200_1 to 200_*n*, may have different pulse timings t. For example, the first MST signal 200_1 may contain at least part of the following card information Track 1, Track 2, Track 3, and token, and in this case, each of the pulses may have a pulse timing of 300 μs. The second MST signal 200_2 may contain at least part of the following card information Track 1, Track 2, Track 3, and token, and in this case, each of the pulses may have a pulse timing of 500 μs. When the pulse timing t is small, an external device (e.g., a POS terminal) may receive a signal from the electronic device, similar to a signal when a card holder rapidly swipes the card over the external device. On the other hand, when the pulse timing t is large, an external device (e.g., a POS terminal) may receive a signal from the electronic device, similar to a signal when a card holder slowly swipes the card over the external device.

In an embodiment of the present disclosure, cycle T is variable. For example, each of the first MST signal 200_1 and the second MST signal 200_2 may contain at least part of the following card information Track 1, Track 2, Track 3, and token, and the first MST signal 200_1 and the second MST signal 200_2 may be emitted once per second. Each of the third MST signal 200_3 and the fourth MST signal 200_4 may contain at least part of the following card information Track 1, Track 2, Track 3, and token, and the third MST signal 200_3 and the fourth MST signal 200_4 may be emitted once per two seconds.

While the MST signal is emitted, an NFC module (e.g., the NFC module 120 of FIG. 1B) may operate in a polling mode.

FIG. 3 shows character strings included in payment data corresponding to payment information, according to an embodiment of the present disclosure.

Referring to FIGS. 3A and 3B, the electronic device (e.g., the electronic device 100 of FIG. 1B) is capable of emitting a signal containing payment data (e.g., payment information) using the MST module at cycle T (e.g., once per second). For example, a signal transmitted once per second may contain information regarding Track 1 as shown in (a) of FIG. 3 or information regarding Track 2 as shown in (b) of FIG. 3. For example, a signal transmitted once per second may contain part of information regarding Track 1 as shown in (a) or information regarding Track 2 as shown in (b).

Figure 4:
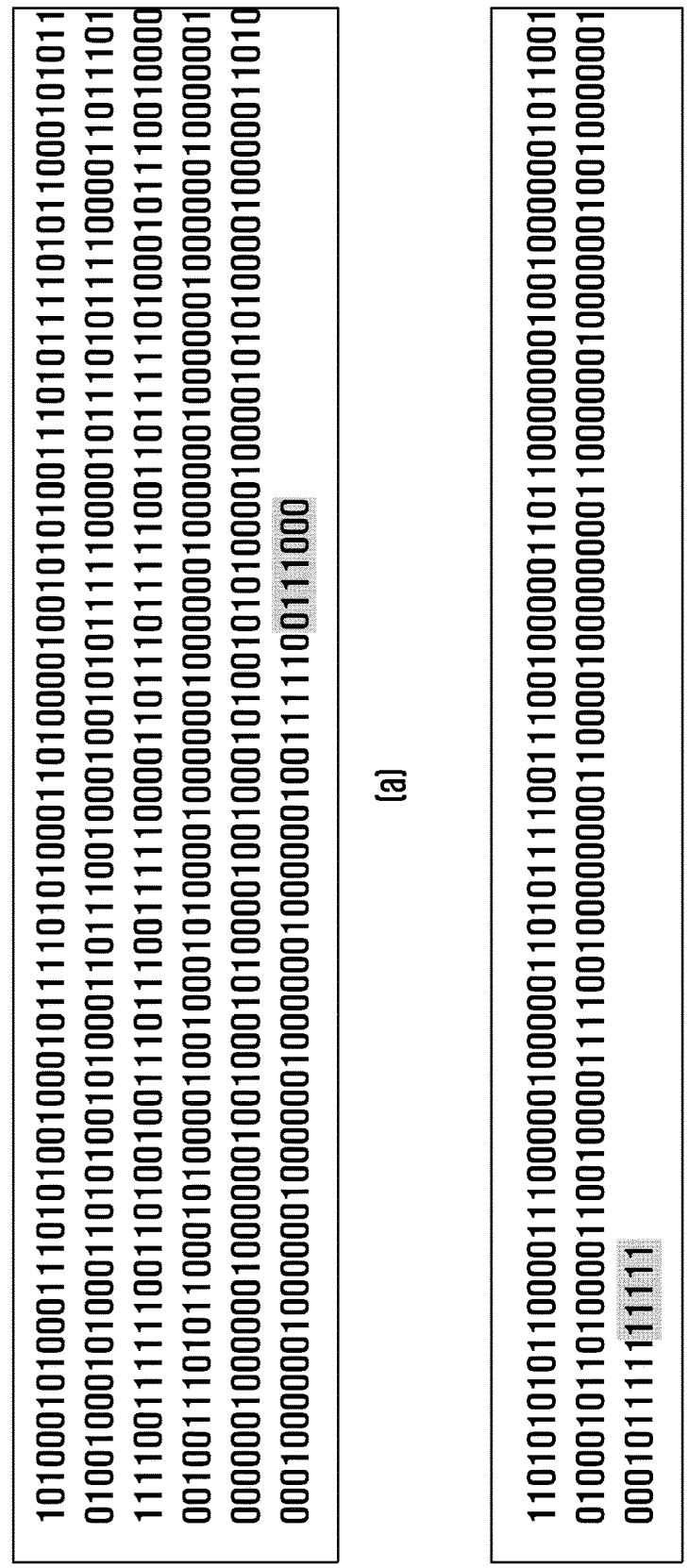
FIG. 4 illustrates a binary string obtained by encoding information of FIG. 3, according to an embodiment of the present disclosure.

FIG. 4 shows binary strings encoded from information, according to an embodiment of the present disclosure.

Referring to FIGS. 4, (a) shows a binary string of the data shown in (a) of FIG. 3. The data may contain a longitudinal redundancy check character (LRC), e.g., "0111000," in the last (tail). (b) of FIG. 4 shows a binary string of the data shown in (b) of FIG. 3. The data may contain an LRC, e.g., "11111," in the last (tail).

Figure 5:
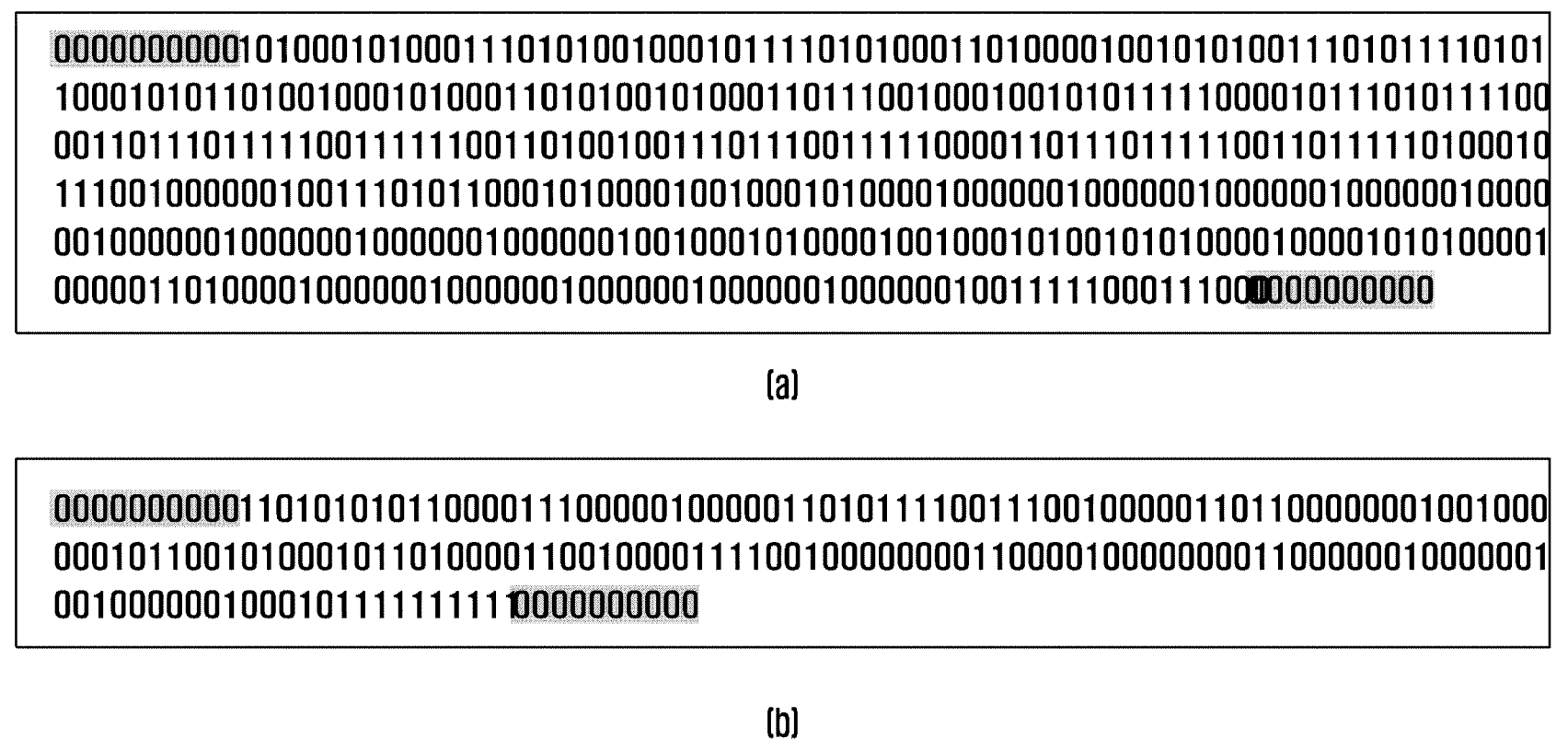

FIG. 5 shows track information transmitted via an emission of an MST signal, according to an embodiment of the present disclosure.

Referring to FIG. 5, the data shown in (a) is created as data, e.g., "00000000," is added to the lead and tail of the binary string of (a) of FIG. 4. The data shown in (b) of FIG. 5 is created as data, e.g., "00000000," is added to the lead and tail of the binary string of (b) of FIG. 4.

In an embodiment of the present disclosure, the electronic device (e.g., the electronic device 100 of FIG. 1B) is capable of emitting information regarding one track via the MST module for a cycle T, and this emission is referred to as a simple sequence. For example, an electronic device is capable of emitting an MST signal containing information regarding Track 1 (e.g., data shown in (a) of FIG. 5) or information regarding Track 2 (e.g., data shown in (b) of FIG. 5) via the MST module for a cycle T. The electronic device is capable of emitting signals containing information regarding a number of tracks for a cycle T, and this emission is called a complex sequence. Embodiments to implement the simple sequence and complex sequence are described as follows.

Figure 6:
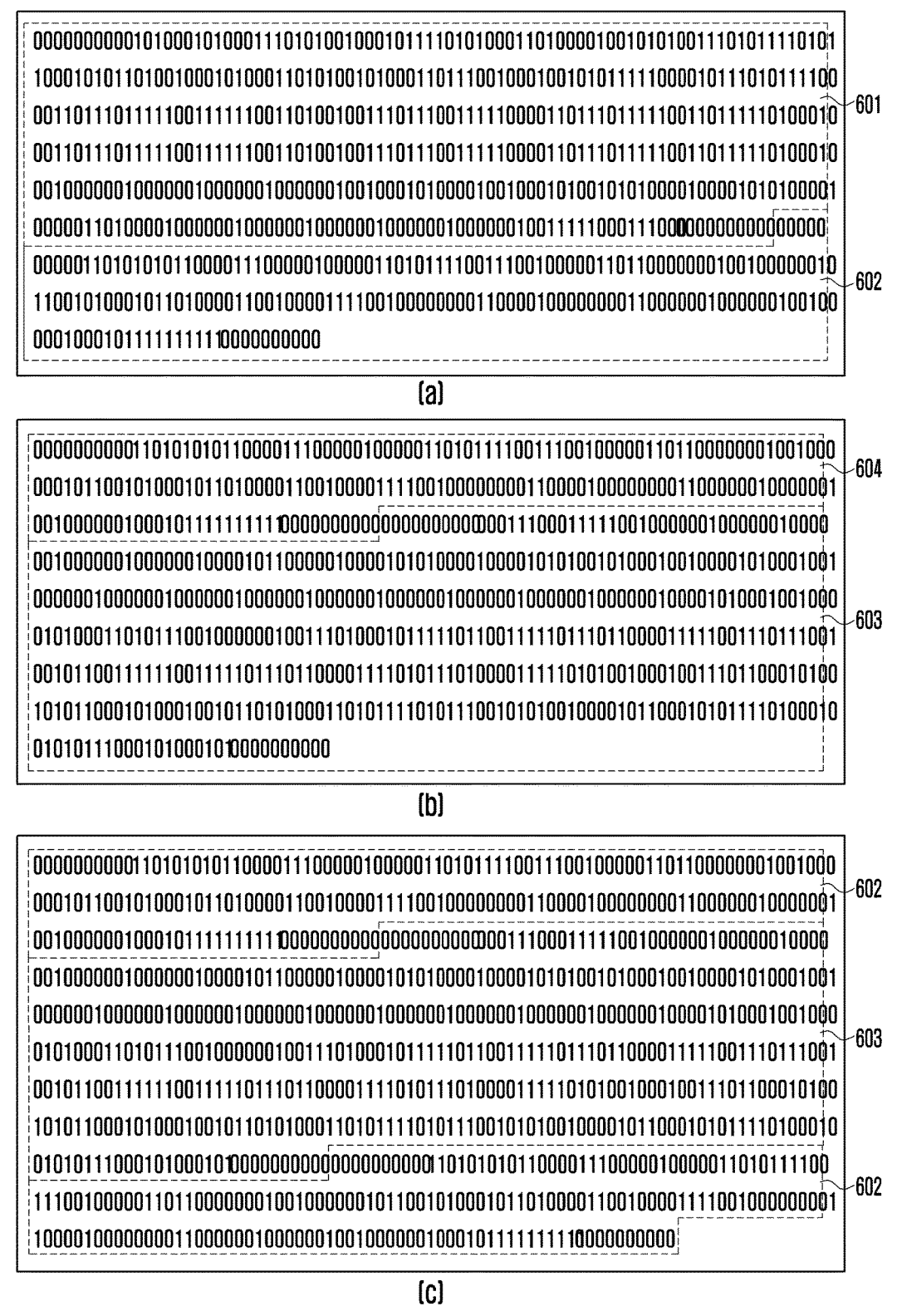

FIG. 6 shows a method of including a number of track information items in an MST signal, according to an embodiment of the present disclosure.

Referring to (a) of FIG. 6, the electronic device lumps Track 1 data 601 shown in (a) of FIG. 5 and Track 2 data 602 shown in (b) of FIG. 5, together, sequentially, to configure one item of data, and emits the configured data for one cycle T. For example, data shown in (a) of FIG. 6 may be contained in at least one of the MST signals 200 shown in FIG. 2A.

Referring to (b) of FIG. 6, the electronic device is capable of configuring at least part of the MST signal by arranging the binary numbers of data of at least one of the tracks in reverse order. For example, the electronic device configures the binary numbers of Track 1 data shown in (a) of FIG. 5, in reverse order, thereby creating reversal Track 1 data 603. The electronic device sequentially lumps Track 2 data 604 shown in (b) of FIG. 5 and the reversal Track 1 data 603 together into one data item and emits the lumped data for one cycle T. The reversal Track 1 data 603 has the same effect as the card holder swipes the card over the external device in the reverse direction.

Referring to (c) of FIG. 6, the electronic device sequentially lumps the Track 2 data 602 shown in (b) of FIG. 5, the reversals Track 1 data 603 created as the Track 1 data of (a) of FIG. 5 is configured in the reverse order, and the Track 2 data 602 of (b) of FIG. 5, to create one data item, and emits the lumped data for one cycle T. It should be understood that lumping or combining track data may also be performed in various ways other than the method described above. For example, Track 2 data and the reversal Track 2 data may be lumped sequentially.

Therefore, the electronic device is capable of including various formats of track information in at least one of the MST signals 200 periodically emitted by the MST module.

Figure 7:
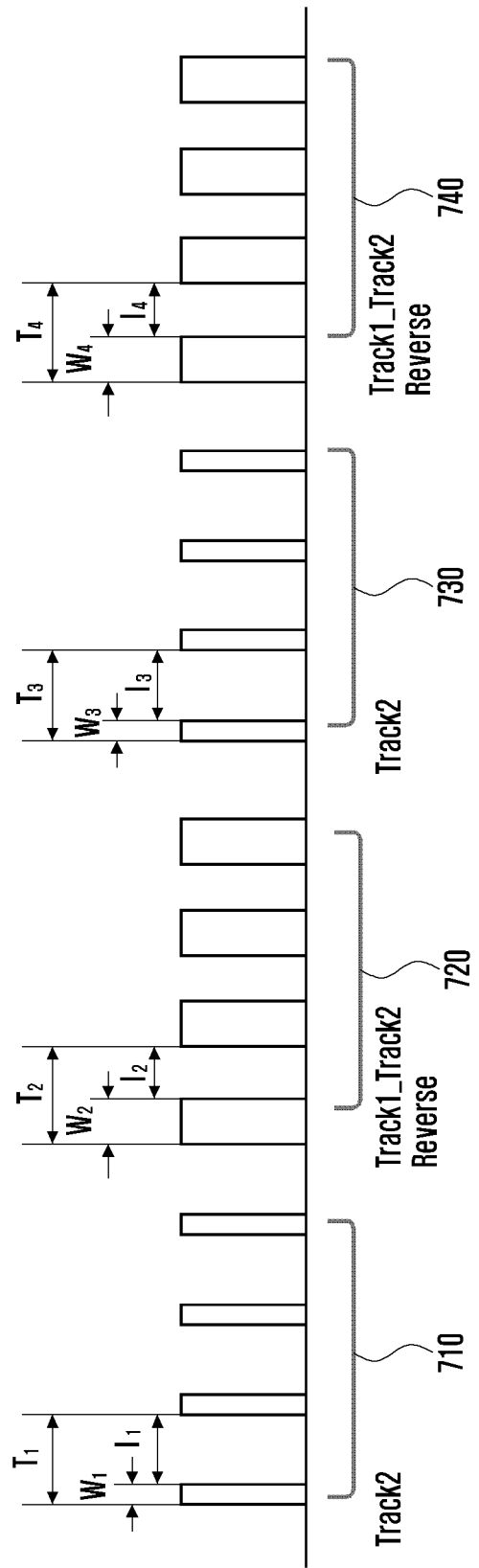
FIG. 7 is a diagram illustrating a simple transmission sequence and complex transmission sequence, according to an embodiment of the present disclosure.

FIG. 7 is a diagram illustrating a simple transmission sequence and a complex transmission sequence, according to an embodiment of the present disclosure.

Referring to FIG. 7, the electronic device (e.g., the electronic device 100 of FIG. 1B) is capable of performing emission in a first simple transmission sequence 710. For example, the electronic device emits an MST signal containing Track 2 information (e.g., data of FIG. 5B) successively, four times, periodically, where one time is one second (or cycle T1). The MST signal determines the width W based on the pulse timing. For example, the pulse timing of the first simple transmission sequence 710 is set to 300 μs The electronic device is capable of performing emission in a first complex transmission sequence 720. For example, the electronic device emits an MST signal, successively, four times, periodically (a cycle T2), where the MST signal contains information regarding Track 1 and reversal Track 2 (e.g., data created by sequentially lumping Track 1 data 601 and reversal Track 2 data created as the Track 2 data 602 is configured in reverse order). The electronic device reduces the pulse timing of the first complex transmission sequence 720 to equalize cycle T2 to cycle T1. As another example, the electronic device may equalize the pulse timing of the first complex transmission sequence 720 to that of the first simple transmission sequence 710. In this case, the amount of information transmitting for cycle T2 is greater than that for cycle T1, and thus, the width W2 is also greater than W1. Therefore, when the intervals I2 and I1 are set to the same, cycle T2 is greater than cycle T1. When the electronic device reduces the interval I2 to be less than I1, cycle T2 may be identical to cycle T1.

The electronic device is capable of performing emission in a second simple transmission sequence 730. For example, the electronic device emits an MST signal containing Track 2 information (e.g., data of FIG. 5B) successively, four times, periodically (a cycle T3). In this case, the pulse timing of the second simple transmission sequence 730 may be greater than that of the first simple transmission sequence 710. For example, the first simple transmission sequence 710 has a pulse timing of 300 μs, and the second simple transmission sequence 730 has a pulse timing of 500 μs.

The electronic device is capable of performing emission in a second complex transmission sequence 740. For example, the electronic device emits an MST signal, successively, four times, periodically (a cycle T4), where the MST signal contains information regarding Track 1 and reversal Track 2 (e.g., data created as the binary numbers of the data of FIG. 5A and data of FIG. 5B are configured in reverse order). In this case, the pulse timing of the second complex transmission sequence 740 may be greater than that of the first complex transmission sequence 720. For example, the first complex transmission sequence 720 has a pulse timing of 300 μs and the second complex transmission sequence 740 has a pulse timing of 500 μs.

According to an embodiment of the present disclosure, the electronic device (e.g., the MST control module 130 of the electronic device 100 of FIG. 1B) is capable of adjusting a pulse timing. Alternatively, the electronic device (e.g., the MST control module 130 of the electronic device 100 shown in FIG. 1B) is capable of adjusting a cycle of an MST signal. Alternatively, the electronic device is capable of performing emission in a simple transmission sequence. Alternatively, the electronic device is capable of performing emission in a complex transmission sequence. Alternatively, the electronic device is capable of combining a simple transmission sequence with a complex transmission sequence and performing the processes. For example, as shown in FIG. 7, the electronic device combines a simple transmission sequence with a complex transmission sequence 16 times for 20 seconds. It should be understood that the present disclosure is not limited by 16 times as the number of occurrences and 20 seconds as the period of time. One MST signal and other MST signals may differ from each other, in terms of at least one of the following type of data, cycle and pulse timing. For example, when an MST signal has a signal emission cycle of one second, another MST signal has a signal emission cycle of any other values, but not one second.

The MST signal may vary according to states of the electronic device, and the varied MST signal is emitted. For example, the electronic device obtains its location information (e.g., country code, internet protocol (IP) address, GPS data, and the like), recognizes its location using the obtained location information, and determines signal generating conditions (e.g., sequence combination, cycle, pulse timing, and the like) corresponding to the recognized location. For example, when the condition table has been stored in the memory of the electronic device, the processor obtains a condition corresponding to the recognized location from the condition table. The electronic device creates an MST signal based on the determined condition. The electronic device ascertains that a remaining battery capacity or a battery temperature. When a battery consumes its power or increases in temperature, the electronic device may emit a simple transmission sequence first. The electronic device may vary at least one of the following an emission cycle, pulse timing, and sequence, and emits an MST signal via cellular communication. For example, when the electronic device is implemented to perform GSM, it may adjust an emission cycle of an MST signal so that the MST signal cannot be affected by the time division multiple access (TDMA) cycle.

The MST signal may be varied and emitted by an external device located near the electronic device. For example, an electronic device (user equipment (UE)) receives characteristics of a POS terminal, related to, for example, tracks, emission cycle, and the like, from a beacon terminal installed in a store, and adjusts at least one of the following an emission cycle, pulse timing, and sequence, based on the received values.

According to an embodiment of the present disclosure, the electronic device alters an MST signal according to a type of card selected to make a payment and emits the altered MST signal. For example, a specific type of card (e.g., private label credit card (PLCC) is available only to pre-set stores. When a card available to a preset store is selected, the information regarding the selected card is transmitted to an external device (e.g., a payment server). In this case, the external device identifies the store using the received card information and transmits, to the electronic device, MST signal information corresponding to the store information. The electronic device alters at least one of the following an emission cycle, pulse timing and sequence, using the MST signal information received from the external device, and emits an MST signal. The MST signal information may be stored in the electronic device. For example, the electronic device has received MST signal information corresponding to stores from an external device (e.g., payment server). In this case, when a card available to only a pre-set store is selected, the electronic device identifies the store information via the selected card information, ascertains the MST signal information corresponding to the identified store information, varies at least one of the following, an emission cycle, pulse timing and sequence, to meet the MST signal information, and emits an MST signal.

Figure 8:
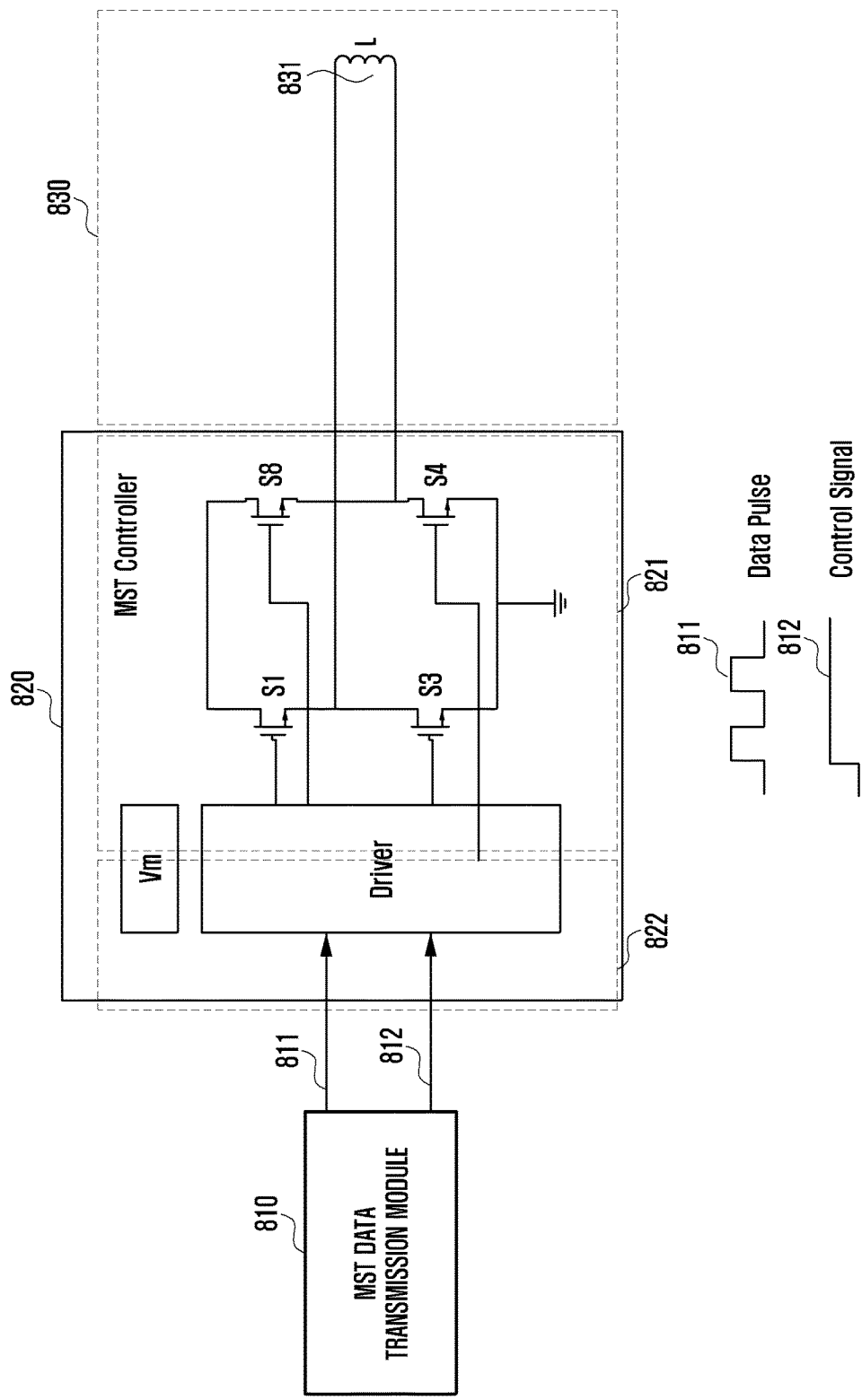
FIG. 8 is a diagram illustrating a configuration of an electronic device supporting an MST-based payment function, according to an embodiment of the present disclosure.

FIG. 8 is a diagram illustrating an electronic device capable of performing a payment function using MST, according to an embodiment of the present disclosure.

Referring to FIG. 8, an MST data transmission module 810 is capable of transmitting information required for payment (e.g., data shown in (a) and (b) of FIG. 5 or (a) and (b) of FIG. 6) to an MST control module 820. The MST data transmission module 810 may be a processor or a secure area in the processor. The MST data transmission module 810 may also be a security module (embedded secure element (eSE)/universal integrated circuit card (UICC)) embedded in an electronic device (e.g., the electronic device 100 of FIG. 1B). The MST data transmission module 810 is capable of transmitting, to the MST control module 820, a control signal 812, along with data pulse 811, for enabling an MST output module 830 to be activated for a required time (e.g., a period of time required to emit a preset number of MST signals periodically). The MST data transmission module 810 is capable of transmitting differential pairs of data that have different phases. The MST data transmission module 810 distinguishes Track 1, Track 2 or Track 3 data, contained in a magnetic card, from each other, based on times, and transmits them sequentially. Alternatively, the MST data transmission module 810 interleaves Track 1, Track 2 or Track 3 data with each other and transmits the interleaved results. The MST data transmission module 810 inverts at least part of the Track 1, Track 2 or Track 3 data (e.g., alters the order of 11110101 to 10101111) and then transmits the result. The MST data transmission module 810 may sequentially transmit the first simple transmission sequence 710, the first complex transmission sequence 720, the first simple transmission sequence 730 and the second complex transmission sequence 740, shown in FIG. 7.

According to an embodiment of the present disclosure, a data reception module 822 of the MST control module 820 is capable of recognizing the state of the received pulse data, logical low/high, as data (e.g., a binary value of 0 or 1). Alternatively, the data reception module 822 detects the number of transitions between low and high states for a preset period of time, and recognizes the result as data. For example, when the data reception module 822 ascertains that the number of transitions between low and high state for a preset period of time is one and two, it recognizes the results as '0 (zero)' and '1 (one)' binary values, respectively.

The output conversion module 821 of the MST control module 820 includes a circuit to convert the data recognized by the data reception module 822 into a form required for transfer to the MST module 230. The circuit includes a first switch S1, a second switch S2, a third switch S3, and a fourth switch S4. The first switch S1 and the fourth switch S4 can have the same control state, and the second switch S2 and the third switch S3 can have the same control state. According to the control states of the switches, the direction of the voltage supplied to the opposite ends of the coil antenna 831 can be changed. At this time, the level of voltage supplied to the coil antenna 831 may be Vm. For example, in the case of zero bit, the data reception module 822 may turn on the first switch and the fourth switch and turn off the second switch and the third switch, and vice versa. In the case of one bit, the data reception module 822 may turn off the first switch and the fourth switch and turn on the second switch and the third switch, and vice versa. The output conversion module 821 may change the direction of the voltage (direction of the current) supplied to the opposite ends of the coil antenna L in accordance with data recognized by the data reception module 822, thereby changing the direction of the magnetic field transmitted through the coil antenna L to an external device (e.g. POS terminal). For example, in the case of zero bit, the voltage level at the coil antenna 831 may be Vm and the current direction may be in the direction of 'A'. In the case of one bit, the voltage level at the coil antenna 831 may be Vm and the current direction may be in the direction of 'B' (opposite direction of 'A'). Magnetic fields generated by the coil antenna may be similar in form to those generated when a magnetic card is swiped through the POS terminal. The switch S1, S2, S3 or S4 may be an N-type MOSFET (metal oxide semiconductor field effect transistor), P-type MOSFET, or relay.

In an embodiment of the present disclosure, the MST output module 830 is capable of including a coil antenna L. The MST output module 830 may also include inductors, capacitors, resistors, and the like. In an embodiment of the present disclosure, the MST output module 830 may further include an amplifier for amplifying signals. The coil antenna L may also be used for NFC or wireless charging. In an embodiment of the present disclosure, a number of coil antennas may be employed by the module.

Figure 9:
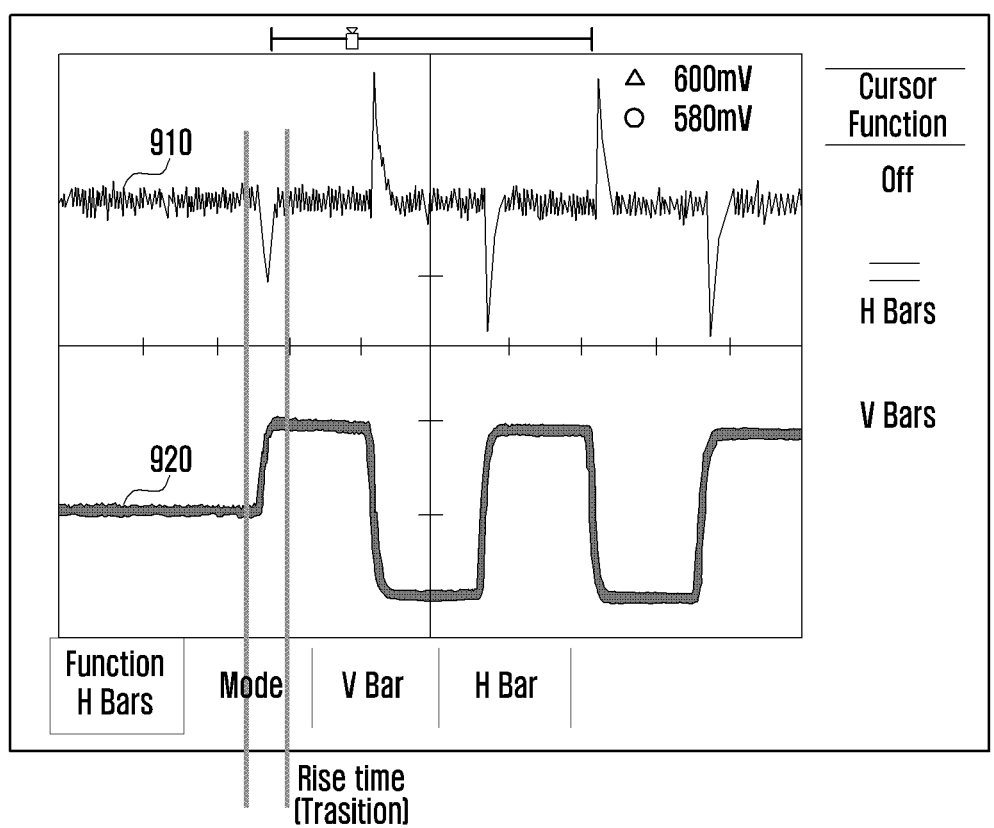
FIG. 9 is a diagram illustrating measurement of a signal emitted by an MST output module and a signal received by an external device, according to an embodiment of the present disclosure.

FIG. 9 is a diagram illustrating results of measuring a signal emitted from an MST output module and a signal received by an external device, according to an embodiment of the present disclosure.

Referring to FIG. 9, when an MST output module (e.g., MST output module 830 shown in FIG. 8) emits an MST signal 920 containing payment data, an external device (e.g., POS terminal) receives the signal 920 and recognizes data 910 based on the transition of the MST signal 920, e.g., rise time. In order to improve the recognition rate of an MST signal, the coil antenna may be optimized with an inductance value and the number of turns. For example, the inductance value may be greater than or equal to 10 μH.

Figure 10A:
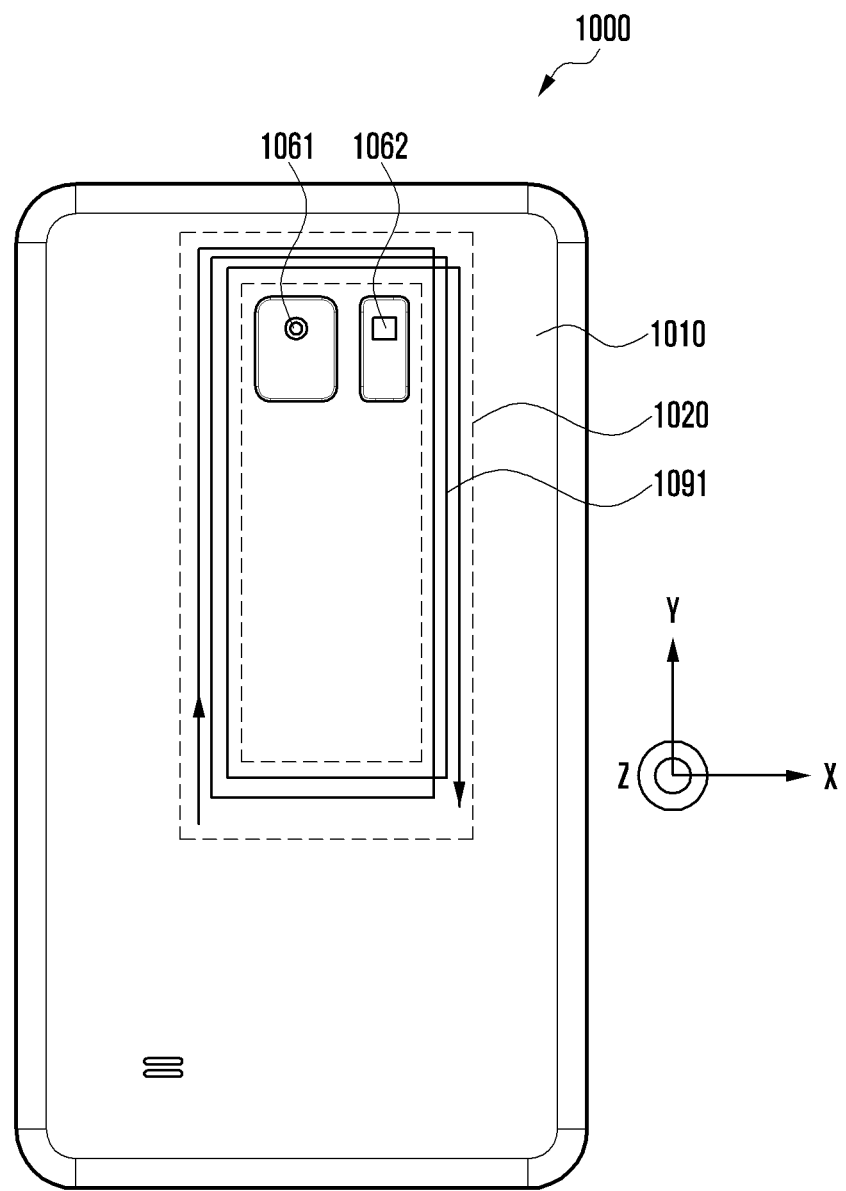
FIGS. 10A and 10B are diagrams illustrating an electronic device having a flat-type loop antenna, according to an embodiment of the present disclosure.
Figure 10B:
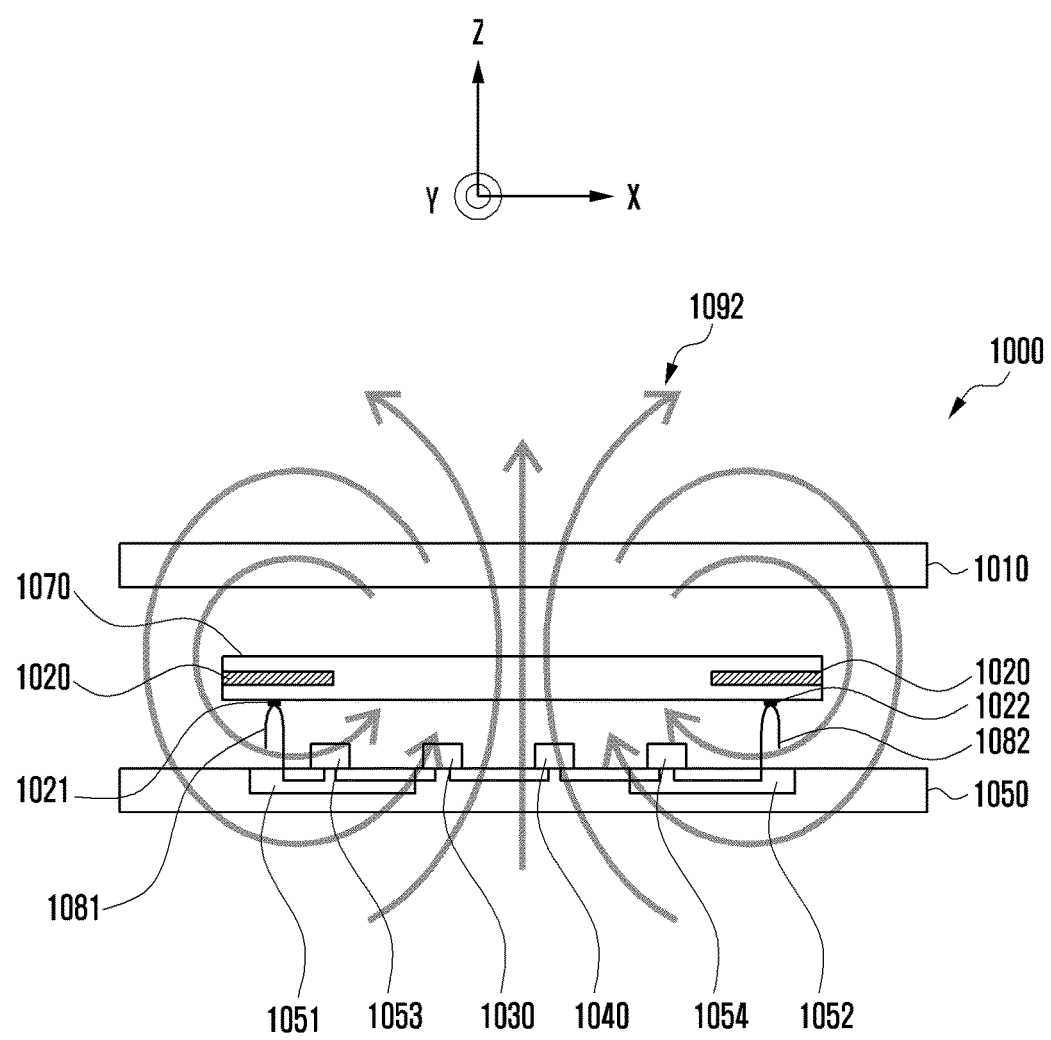

FIGS. 10A and 10B are diagrams illustrating an electronic device having a flat-type loop antenna, according to an embodiment of the present invention. FIG. 10A shows the rear face of the electronic device and the current path in the loop antenna, and FIG. 10B shows a schematic cross section of the electronic device and magnetic fields generated by the loop antenna.

Referring to FIGS. 10A and 10B, an electronic device 1000 (e.g. electronic device 11) includes a cover 1010, a loop antenna 1020, a connection module 1030, a communication module 1040, and a substrate 1050.

The cover 1010 constitutes the rear face of the electronic device 1000 and may be made of a nonconductive material (e.g. plastic or glass). The cover 1010 may have a hole to externally expose a specific component of the electronic device 1000. For example, a camera 1061 may be exposed through a first hole and a flash and sensor 1062 may be exposed through a second hole.

The loop antenna 1020 may be realized using a flat coil wound in a spiral with respect to the Z-axis. Hence, the loop antenna 1020 may generate magnetic fields in the vertical direction (Z-axis) relative to the rear face (XY plane) of the electronic device 1000. The flat coil may be contained in a flexible printed circuit board (FPCB) 1070. The FPCB 1070 may be attached to the bottom surface of the cover 1010.

The connection module 1030 may include various electric circuits. For example, the electric circuit may be composed of a passive element, an active element, a strip line, a micro strip line, or an interdigital structure, or a combination thereof. The electric circuit may change the impedance corresponding to the loop antenna 1020 according to the characteristic value (e.g. capacitance, inductance, or resistance). Passive elements may include a capacitor, inductor, and resistor. Active elements may include a field effect transistor (FET) and a bipolar junction transistor (BJT). An interdigital structure may be a chip or package of passive or active elements, and may be mounted on the substrate 1050. The electric circuit may compensate the physical dimension of the loop antenna 1020 by adjusting the electrical length of the loop antenna 1020.

The communication module 1040 may use the loop antenna 1020 to perform data communication with another electronic device connected with the electronic device 1000 through a network.

The substrate 1050 may supply an electrical signal to the loop antenna 1020. The substrate 1050 may be realized using a printed circuit board (PCB) and/or an FPCB. The substrate 1050 may feed a current to the loop antenna 1020 and receive a current from the loop antenna 1020. The substrate 1050 may serve as a ground plate to ground the loop antenna 1020. The connection module 1030 and the communication module 1040 may be mounted on the substrate 1050 and be electrically connected together through a conducting wire. The connection module 1030 and the communication module 1040 may be electrically connected with the loop antenna 1020 through a first connection terminal 1081 and a second connection terminal 1082, respectively. For example, the first connection terminal 1081 and the second connection terminal 1082 may come into electrical contact with a first feeding point 1021 and a second feeding point 1022 of the loop antenna 1020, respectively. The first connection terminal 1081 and the second connection terminal 1082 may each be an elastic pin (e.g. C-clip).

The substrate 1050 may include a dielectric material such as a first dielectric 1051 and a second dielectric 1052. The first connection terminal 1081 and the second connection terminal 1082 may be mounted respectively on the first dielectric 1051 and the second dielectric 1052. The first connection terminal 1081 may be connected to the connection module 1030 through a first capacitor 1053, and the second connection terminal 1082 may be connected to the communication module 1040 through a second capacitor 1054. The first and second capacitors 1053 and 1054 are used to prevent an electric shock and may have a capacitance of 10 to 1000 pF.

When a current is supplied from the communication module 1040 to the first feeding point 1021 or the second feeding point 1022 of the loop antenna 1020, the current flows from the corresponding feeding point (e.g. first feeding point 1021) to the other feeding point (e.g. second feeding point 1022), thereby forming a spiral current path 1091 with respect to the Z-axis. This current path 1091 may generate magnetic fields 1092 in the Z-axis direction perpendicular to the rear face (XY plane) of the electronic device 1000. A specific signal having a frequency corresponding to the length of the loop antenna 1020 (i.e. length of the current path 1091 may be selected (i.e. resonance) and the selected signal may be emitted to the outside of the electronic device 1000 through the cover 1010 made of a nonconductive material. According to the reciprocity principle, the loop antenna 1020 may receive an RF signal having a specified frequency, convert the received RF signal into a current, and forward the current to the communication module 1040.

Figure 11A:
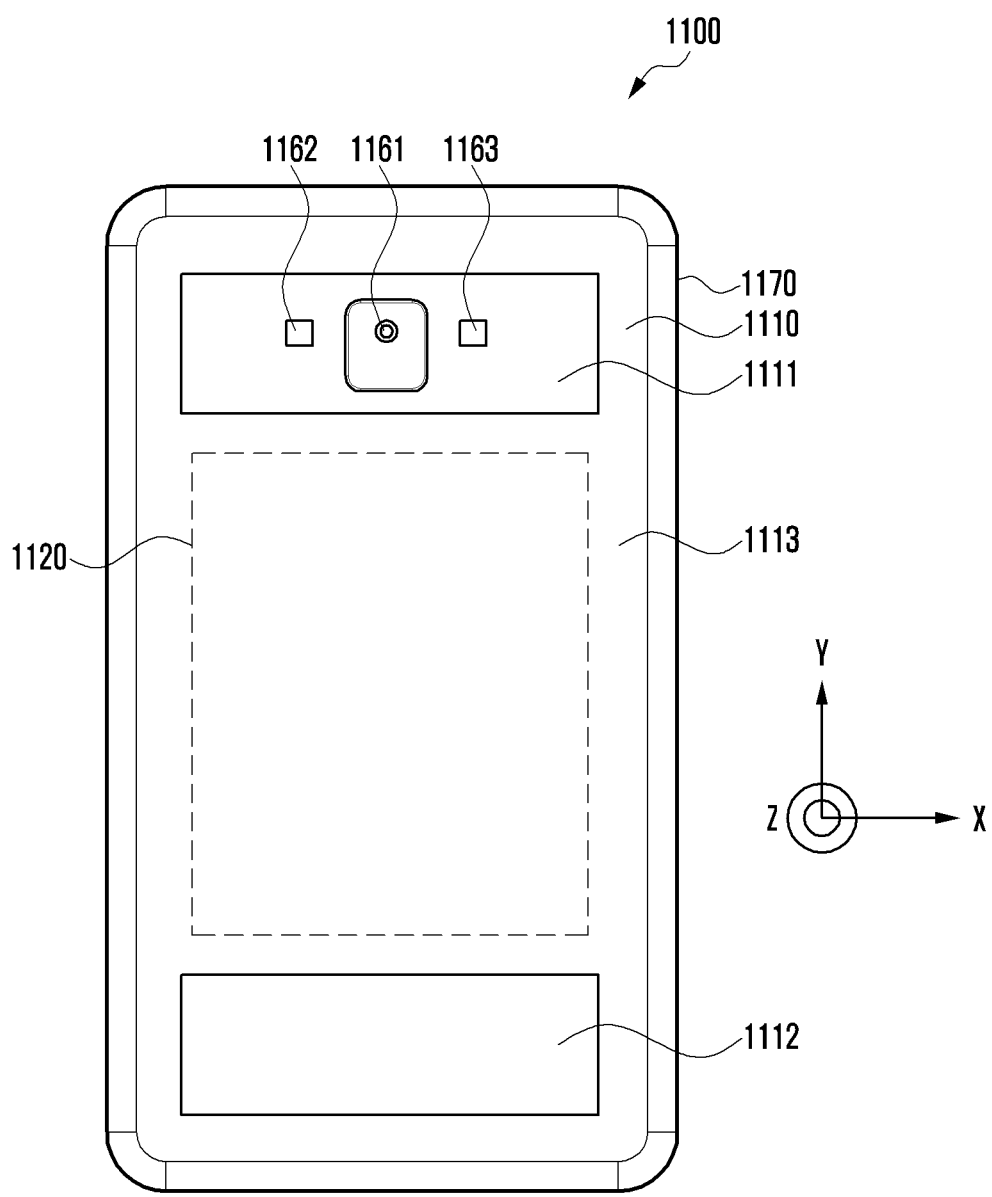
FIGS. 11A to 11F are diagrams illustrating an electronic device having a solenoid-type loop antenna, according to an embodiment of the present disclosure.
Figure 11B:
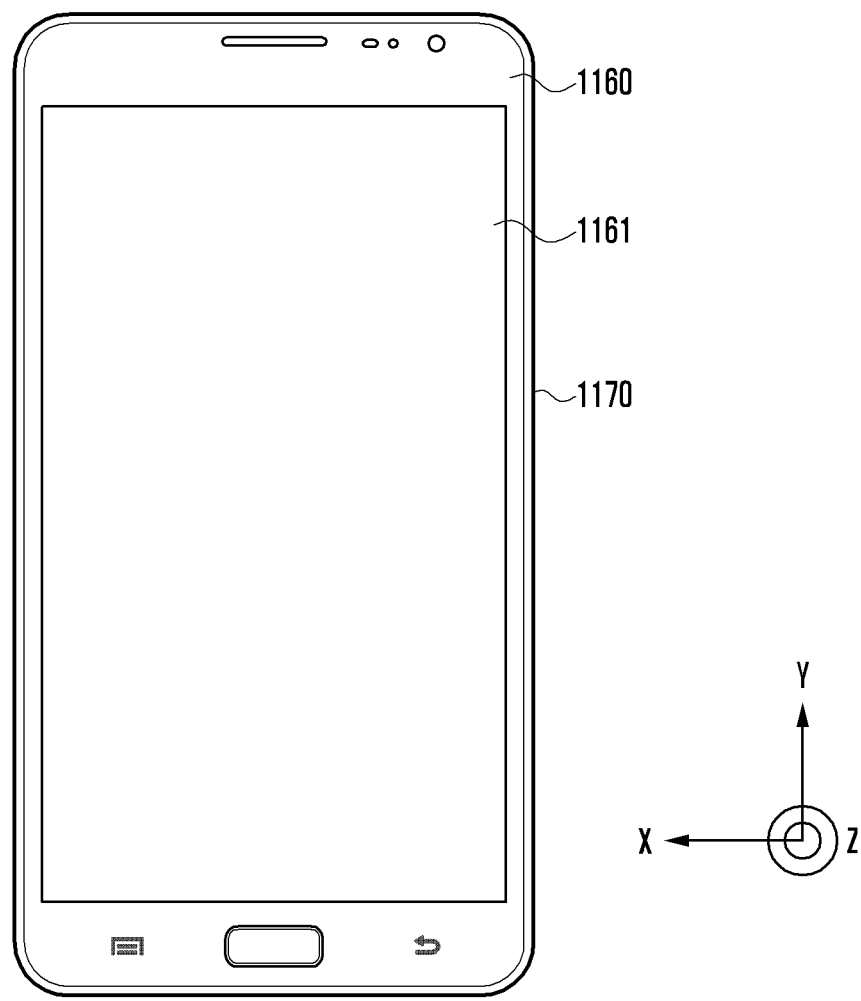
Figure 11C:
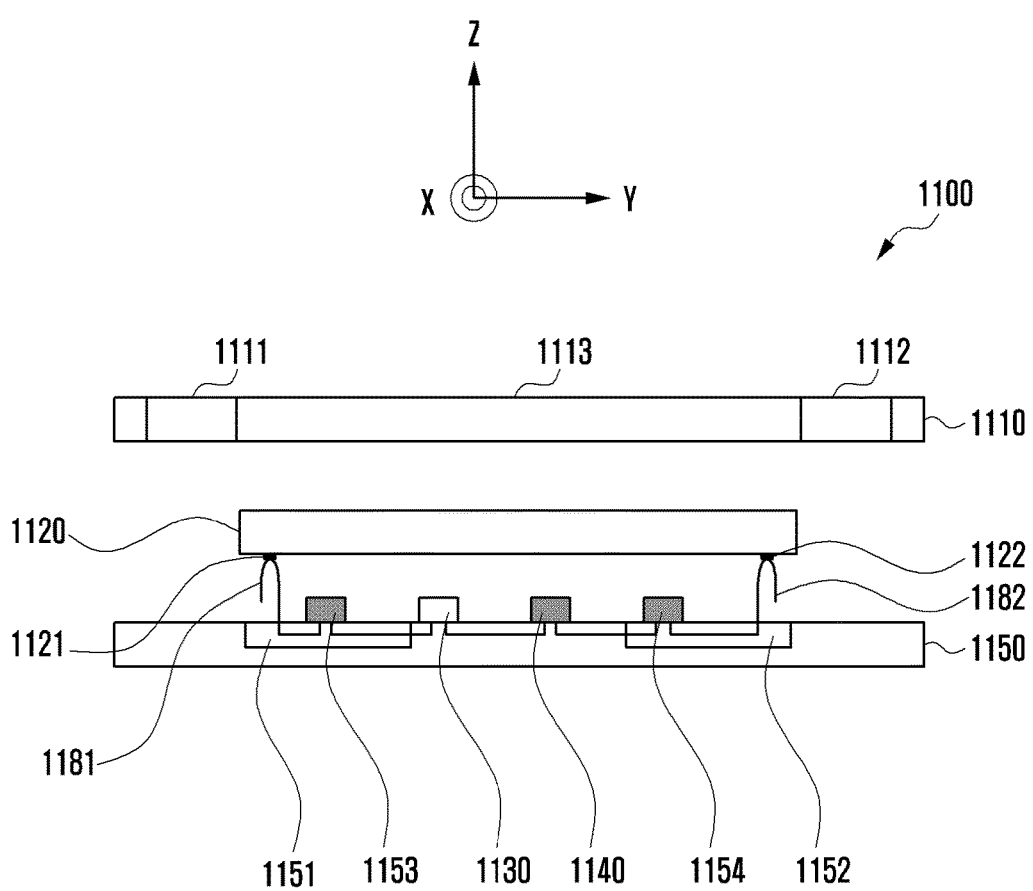
Figure 11D:
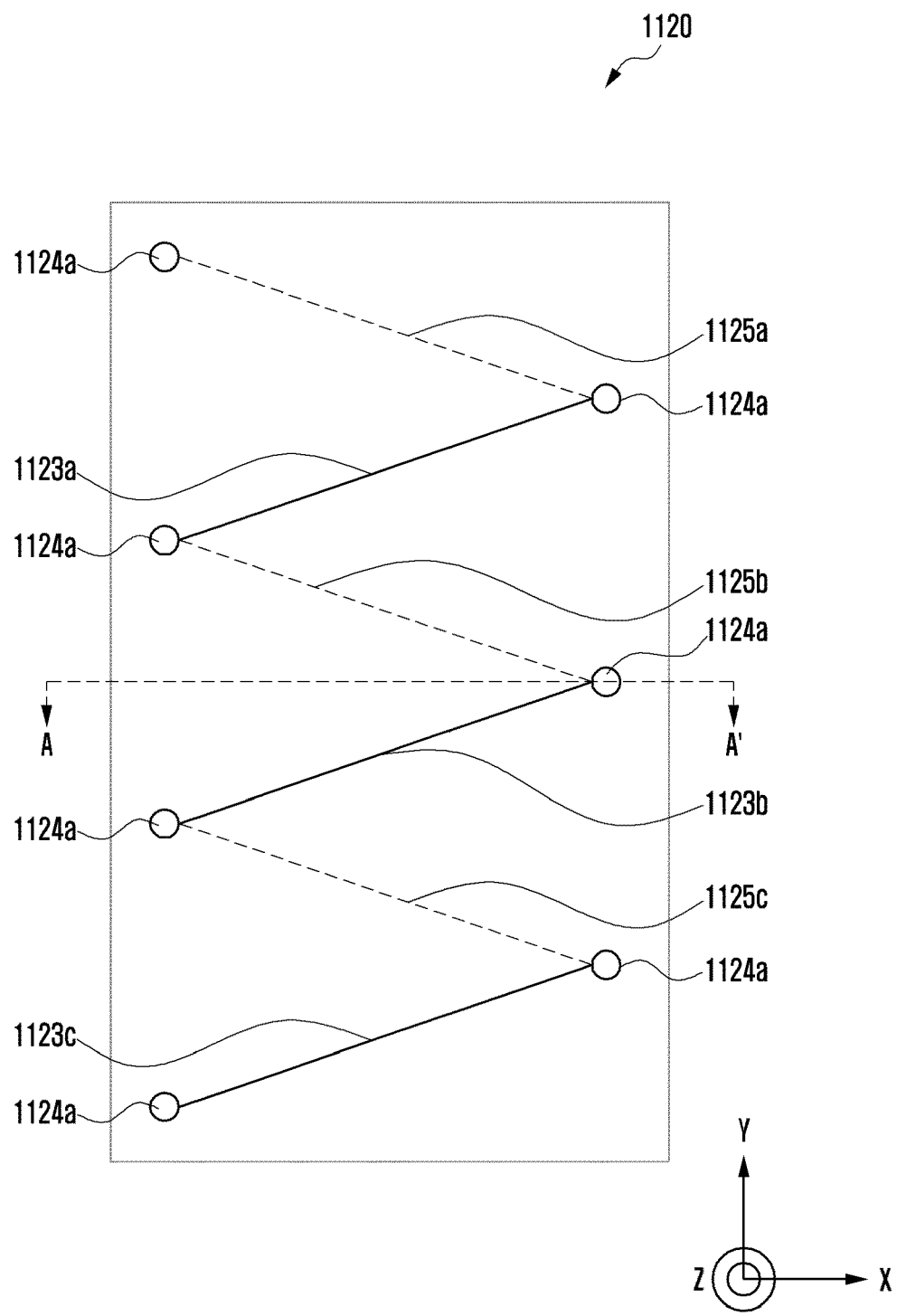
Figure 11E:
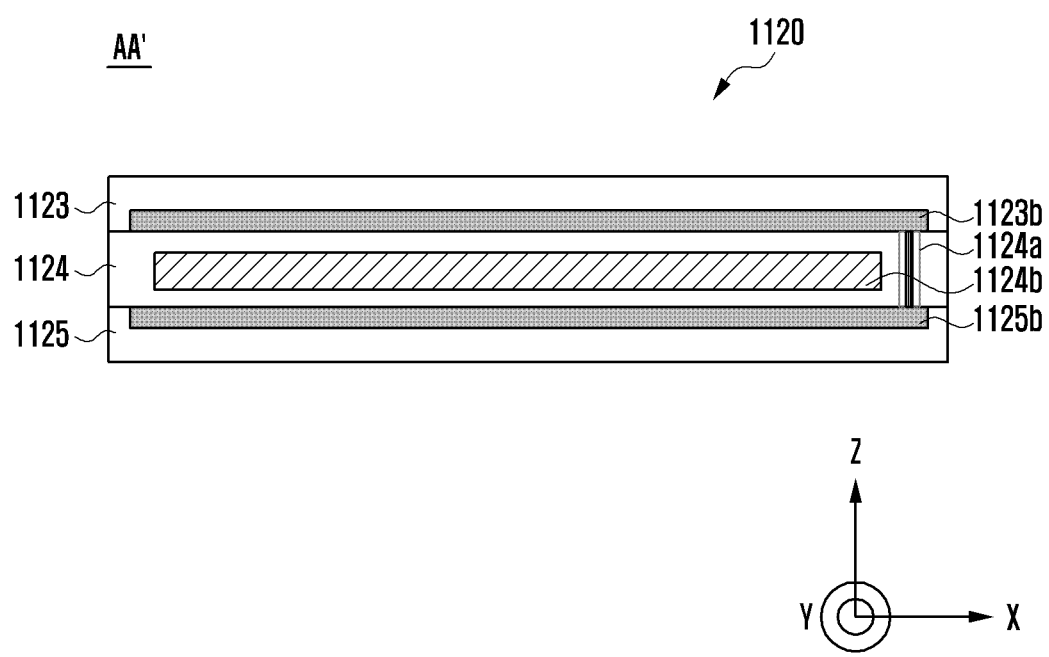
Figure 11F:
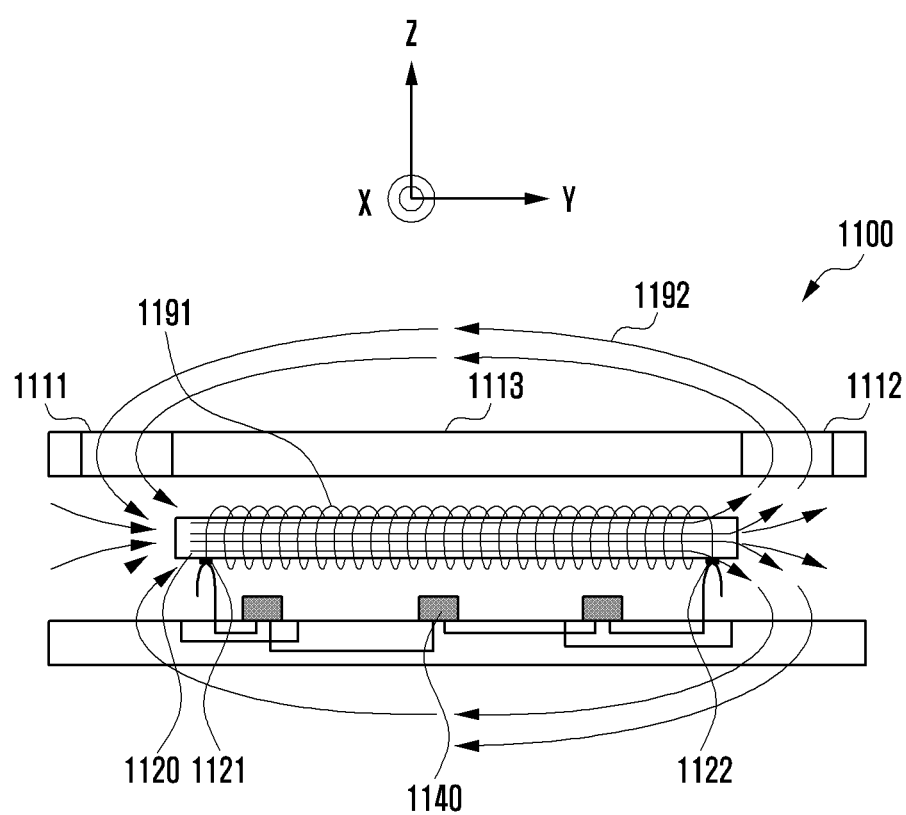

FIGS. 11A to 11F are diagrams illustrating an electronic device having a solenoid-type loop antenna, according to an embodiment of the present disclosure. FIG. 11A shows the rear face of the electronic device, FIG. 11B shows the front face of the electronic device, FIG. 11C shows a schematic cross section of the electronic device, FIG. 11D shows a schematic front view of the loop antenna, and FIG. 11E shows a schematic sectional view of the loop antenna. FIG. 11F shows a schematic cross section of the electronic device, the current path in the loop antenna, and magnetic fields generated by the loop antenna.

Referring to FIGS. 11A to 11C, an electronic device 1100 (e.g. electronic device 11) includes a loop antenna 1120, a connection module 1130 (e.g. the connection module 1030), a communication module 1140 (e.g. the communication module 1040), and a substrate 1150. These components 1120 to 1150 may be placed in the housing of the electronic device 1100. The housing may include a first surface 1110 in a first direction, a second surface 1160 in a second direction opposite that of the first direction, and a side member 1170 enclosing the space between the first surface 1110 and the second surface 1160. For example, the first surface 1110 may be a cover constituting the rear face of the electronic device 1100, and the second surface 1160 may be a cover constituting the front face of the electronic device 1100. The display 1161 may be exposed to the outside through the second surface 1160. The second surface 1160 and the side member 1170 may be formed as a single entity.

The cover 1110 may be composed of a conductive region made of a conductive material and a nonconductive region made of a nonconductive material. For example, the cover 1110 may include a first nonconductive region 1111, a second nonconductive region 1112, and a conductive region 1113. The first nonconductive region 1111 and the second nonconductive region 1112 may be arranged so that they are horizontally symmetric with respect to the central portion as shown in FIG. 11A. The remaining region of the cover 1110 excluding the nonconductive regions 1111 and 1112 and the conductive region 1113 may be made of a conductive material. Alternatively, the remaining region of the cover 1110 may be made of a nonconductive material. The cover 1110 may include at least one hole to expose a component of the electronic device 1100 to the outside. For example, three holes may be formed in the first nonconductive region 1111, and a camera 1161 may be exposed through the first hole, a flash 1162 may be exposed through the second hole, and a sensor 1163 may be exposed through the third hole.

The loop antenna 1120 may be placed under the conductive region 1113 formed between the first nonconductive region 1111 and the second nonconductive region 1112. Specifically, the loop antenna 1120 may be attached to the bottom surface of the conductive region 1113 in an electrically insulated manner. The loop antenna 1120 may have a solenoid coil with a number of turns wound in the Y-axis direction. Hence, the loop antenna 1120 may generate a magnetic flux parallel to the Y-axis direction of the rear face of the electronic device 1100. The configuration and structure of the solenoid coil are described in more detail later with reference to FIGS. 11D and 11E.

The substrate 1150 may supply an electrical signal to the loop antenna 1120. The substrate 1150 may be realized using a PCB and/or a FPCB. The substrate 1150 may feed a current to the loop antenna 1120 and receive a current from the loop antenna 1120. The substrate 1150 may serve as a ground plate to ground the loop antenna 1120. The connection module 1130 and the communication module 1140 may be mounted on the substrate 1150 and be electrically connected together through a conducting wire. The connection module 1130 and the communication module 1140 may be electrically connected with the loop antenna 1120 through a first connection terminal 1181 and a second connection terminal 1182, respectively. For example, the first connection terminal 1181 and the second connection terminal 1182 may come into electrical contact with a first feeding point 1121 and a second feeding point 1122 of the loop antenna 1120, respectively. The first connection terminal 1181 and the second connection terminal 1182 may each be an elastic pin (e.g. C-clip).

The substrate 1150 may include a dielectric material such as a first dielectric 1151 and a second dielectric 1152. The first connection terminal 1181 and the second connection terminal 1182 may be mounted on the first dielectric 1151 and the second dielectric 1152, respectively. The first connection terminal 1181 may be connected to the connection module 1130 through a first capacitor 1153, and the second connection terminal 1182 may be connected to the communication module 1140 through a second capacitor 1154. The first and second capacitors 1153 and 1154 are used to prevent an electric shock and may have a capacitance of 10 to 1000 pF. Referring to FIGS. 11D and 11E, the loop antenna 1120 may be realized using a FPCB having multiple layers 1123 to 1125. A top layer 1123 contains multiple conducting wires 1123a, 1123b and 1123c constituting a solenoid coil. A bottom layer 1125 contains multiple conducting wires 1125a, 1125b and 1125c constituting the solenoid coil. A middle layer 1124 includes conductive vias 1124a used to constitute the solenoid coil. That is, conducting wires on the top layer 1123 may be electrically connected with conducting wires on the bottom layer 1125 through the vias 1124a to thereby constitute a solenoid coil. The middle layer 1124 may include a core 1124b (e.g. mu-metal) to increase the magnetic force generated by the solenoid coil. In another embodiment, the core 1124b may be absent from the loop antenna 1120. A processor (e.g. the processor 12) may be mounted on the substrate 1150 to control communication and power supply of the communication module 1140.

Referring to FIG. 11F, when a current is supplied from the communication module 1140 to the first feeding point 1121 or the second feeding point 1122 of the loop antenna 1120, the current flows from the corresponding feeding point (e.g. first feeding point 1121) to the other feeding point (e.g. second feeding point 1122), thereby forming a cylindrical current path 1191 with the Y-axis as the center. This current path 1191 may generate magnetic fields 1192 in the Y-axis direction perpendicular to the current direction (i.e. parallel with the rear face of the electronic device 1100). The magnetic flux of the magnetic fields 1192 may pass through the first nonconductive region 1111 and the second nonconductive region 1112 and reach the outside of the electronic device 1100 without being blocked by the conductive region 1113.

Figure 12:
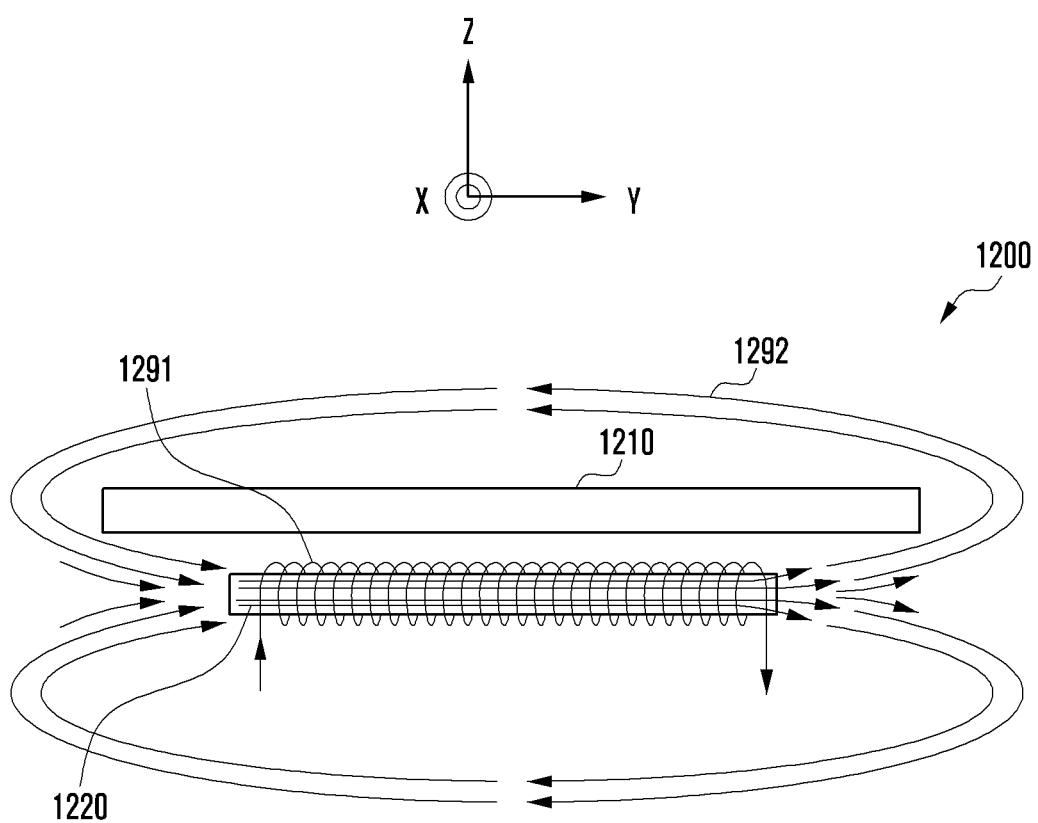
FIG. 12 is a diagram illustrating an electronic device having a solenoid-type loop antenna, according to an embodiment of the present disclosure.

FIG. 12 is a diagram illustrating an electronic device having a solenoid-type loop antenna, according to an embodiment of the present disclosure. Specifically, FIG. 12 shows a schematic cross section of the electronic device and magnetic fields generated by the loop antenna. Referring to FIG. 12, an electronic device 1200 includes a cover 1210, a loop antenna 1220, a connection module (e.g., the connection module 1030), a communication module (e.g., the communication module 1040), and a substrate (e.g., the substrate 1050).

The cover 1210 constitutes the rear face of the electronic device 1200 and may be made of a conductive material. The cover 1210 may include at least one hole to expose a component (e.g. camera, flash, or sensor) of the electronic device 1100 to the outside. The loop antenna 1220 may be attached to the bottom surface of the cover 1210 in an electrically insulated manner, and may have a solenoid coil with a number of turns wound in the Y-axis direction (i.e. horizontal direction relative to the rear face of the electronic device 1200). When a current is applied to the loop antenna 1220, a cylindrical current path 1291 is formed with the Y-axis as the center. This current path 1291 may generate magnetic fields 1292 in the Y-axis direction perpendicular to the current direction. Hence, the magnetic flux of the magnetic fields 1292 may bypass the cover 1210 and reach the outside of the electronic device 1200 without being blocked by the cover 1210 made of a conductive material.

Figure 13A:
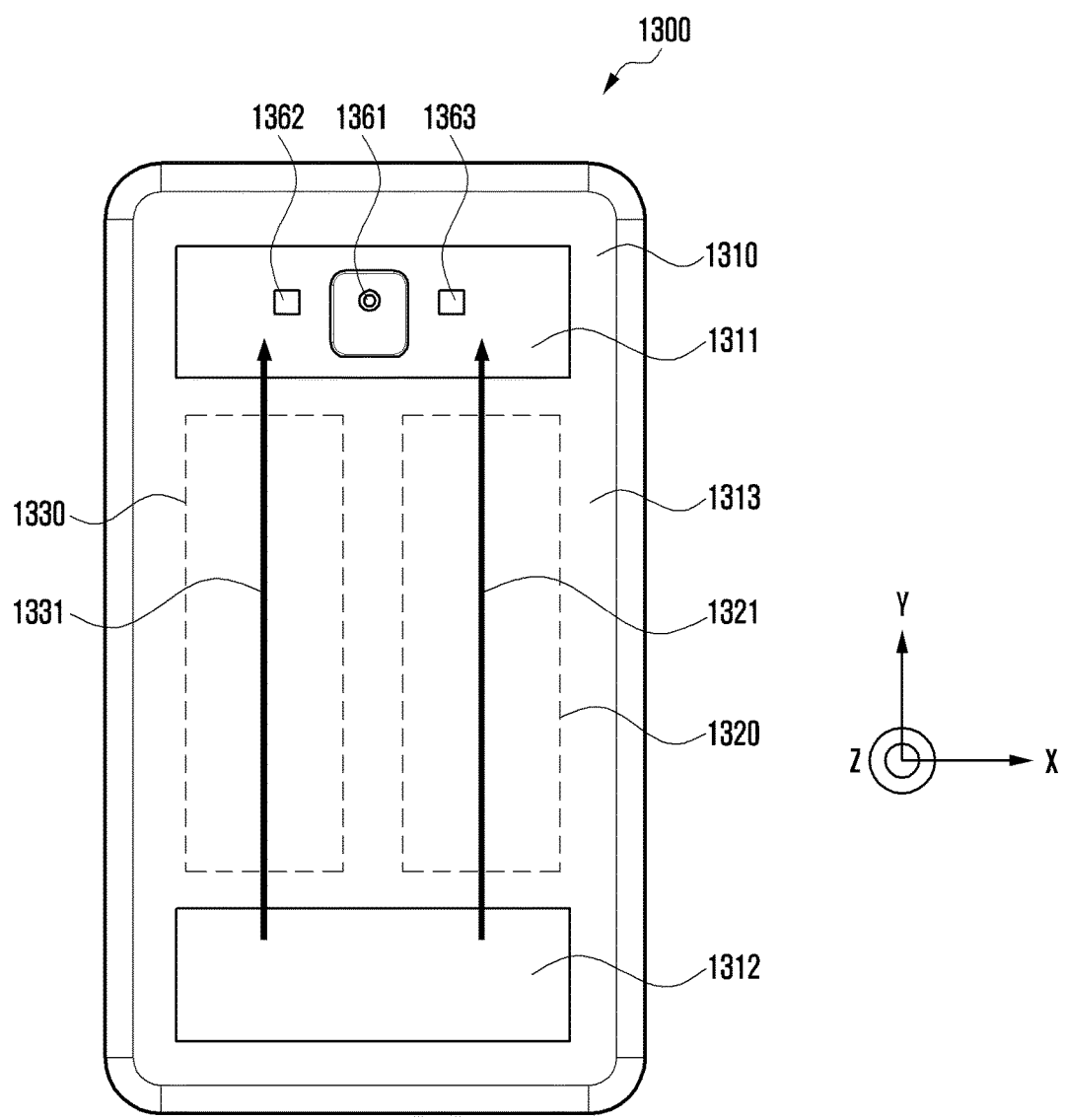

FIGS. 13A and 13B are diagrams illustrating an electronic device having multiple solenoid-type loop antennas, according to an embodiment of the present disclosure. FIG. 13A shows the rear face of the electronic device, and FIG. 13B illustrates electrical components of the electronic device.

Referring to FIGS. 13A and 13B, an electronic device 1300 (e.g. the electronic device 11) includes a first loop antenna 1320, a second loop antenna 1330, a communication circuit 1340, and a processor 1350. These components 1320 to 1350 are disposed in the housing of the electronic device 1300. The housing includes a cover 1310 constituting the rear face of the electronic device 1300.

The cover 1310 may be composed of a conductive region made of a conductive material and a nonconductive region made of a nonconductive material. For example, the cover 1310 includes a first nonconductive region 1311, a second nonconductive region 1312, and a conductive region 1313. The first nonconductive region 1311 and the second nonconductive region 1312 are arranged so that they are horizontally symmetric with respect to the central portion. The remaining region of the cover 1310, excluding the nonconductive regions 1311 and 1312, may be made of a conductive material. The cover 1310 includes holes 1361, 1362 and 1363 to expose specific components of the electronic device 1300 to the outside.

The first loop antenna 1320 and the second loop antenna 1330 are disposed in parallel with each other under the conductive region 1313 formed between the first nonconductive region 1311 and the second nonconductive region 1312. The first loop antenna 1320 and the second loop antenna 1330 may each have a solenoid coil with a number of turns wound in the Y-axis direction. The first loop antenna 1320 and the second loop antenna 1330 may each be realized using a FPCB shown in FIG. 11E. The first loop antenna 1320 and the second loop antenna 1330 respectively generate magnetic fields 1321 and magnetic fields 1331 in a direction parallel with the Y-axis direction of the rear face of the electronic device 1300. The magnetic fields 1321 and magnetic fields 1331 pass through the first nonconductive region 1311 and the second nonconductive region 1312, respectively, and radiate outside the cover 1310.

The communication circuit 1340 may convert data from the processor 1350 (e.g. processor 12) into a magnetic signal and output the magnetic signal to the first loop antenna 1320 and second loop antenna 1330. The communication circuit 1340 may be mounted on a substrate, and may include the connection module 1130 and the communication module 1140 of FIG. 11.

Figure 14A:
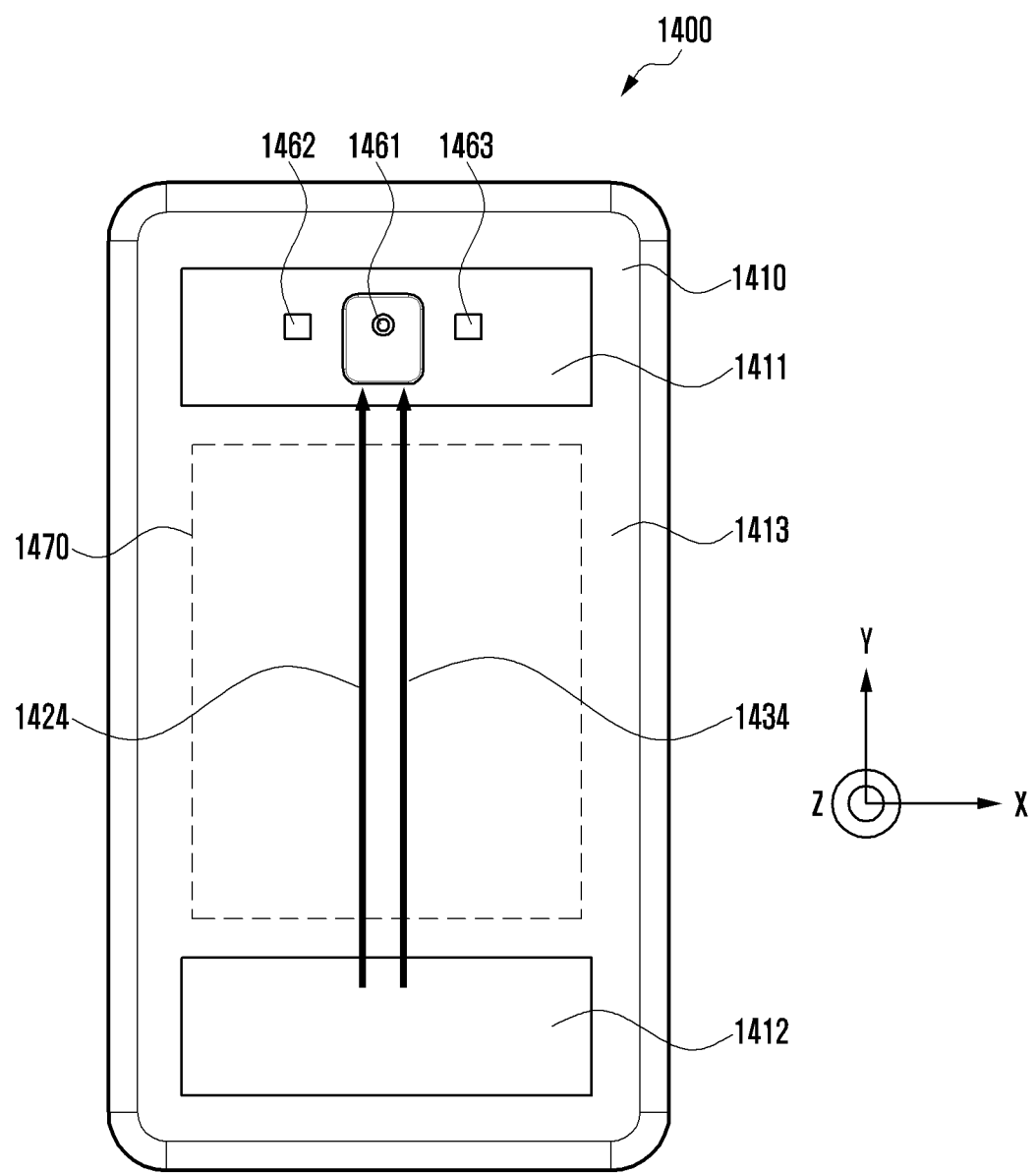
FIGS. 14A to 14C are diagrams illustrating an electronic device having multiple solenoid-type loop antennas, according to an embodiment of the present disclosure.
Figure 14B:
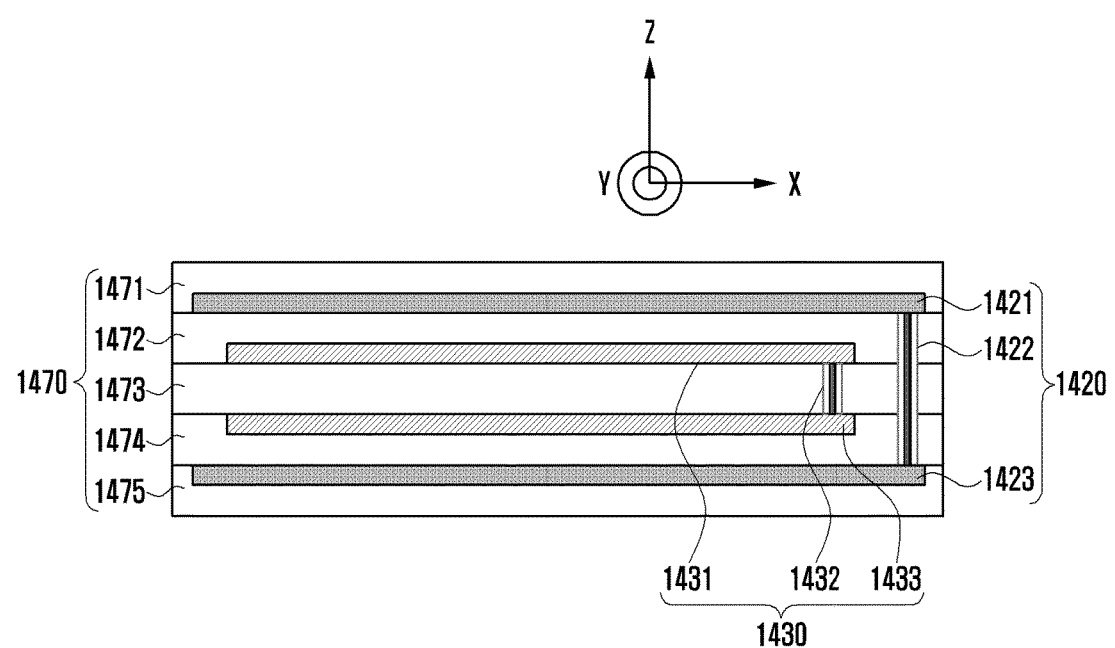
Figure 14C:
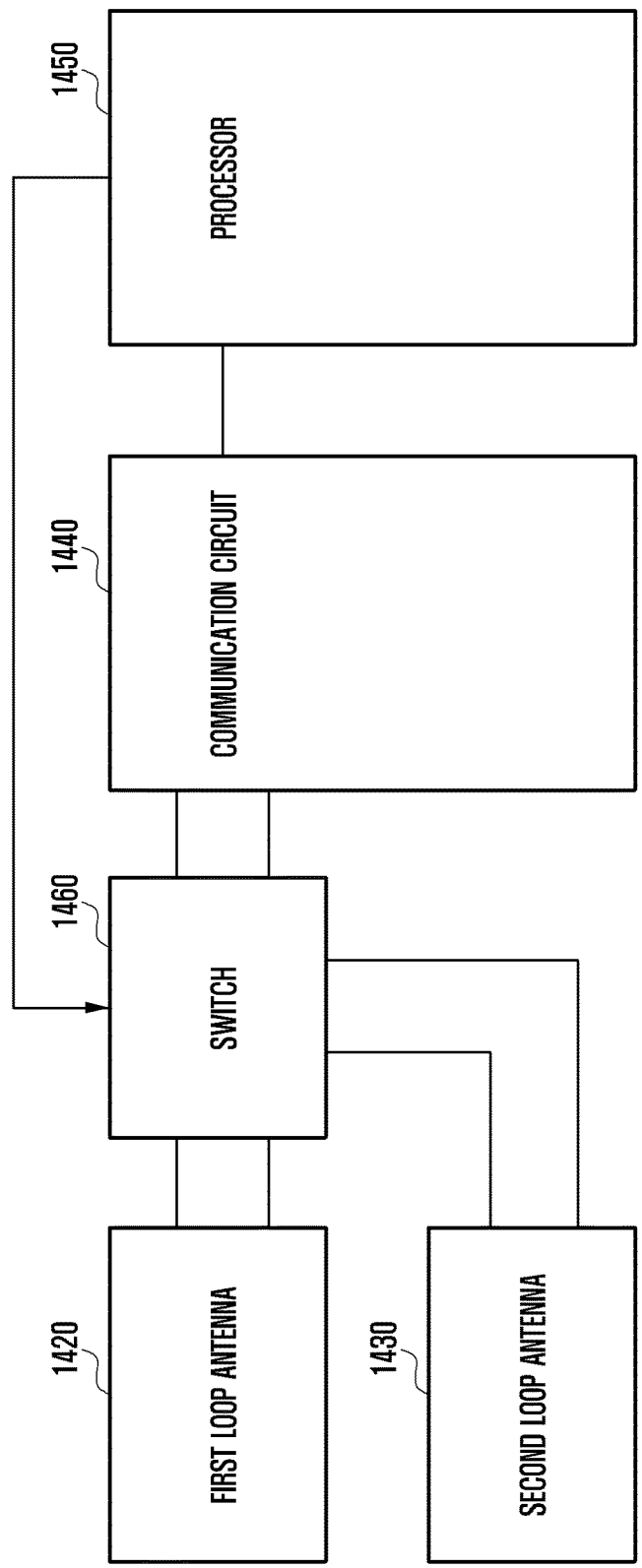

FIGS. 14A to 14C are diagrams illustrating an electronic device having multiple solenoid-type loop antennas, according to an embodiment of the present invention. FIG. 14A shows the rear face of the electronic device, FIG. 14B shows a cross section of a FPCB implementing multiple solenoid-type loop antennas, and FIG. 14C illustrates electrical components of the electronic device.

Referring to FIGS. 14A to 14C, an electronic device 1400 includes a first loop antenna 1420 of solenoid type, a second loop antenna 1430 of solenoid type, a communication circuit 1440, a processor 1450, and a switch 1460. These components 1420 to 1460 are disposed in the housing of the electronic device 1400. The housing includes a cover 1410 constituting the rear face of the electronic device 1400.

The cover 1410 may be composed of a conductive region made of a conductive material and a nonconductive region made of a nonconductive material. For example, the cover 1410 includes a first nonconductive region 1411, a second nonconductive region 1412, and a conductive region 1413. The first nonconductive region 1411 and the second nonconductive region 1412 may be arranged so that they are horizontally symmetric with respect to the central portion. The remaining region of the cover 1410, excluding the nonconductive regions 1411 and 1412, may be made of a conductive material. The cover 1410 includes holes 1461, 1462 and 1463 to expose specific components of the electronic device 1400 to the outside.

The first loop antenna 1420 and second loop antenna 1430 of solenoid type may be realized using a FPCB 1470. The FPCB 1470 is composed of multiple layers 1471 to 1475. The first layer 1471 and the fifth layer 1475 may each contain multiple conducting wires constituting the first loop antenna 1420. These conducting wires may be arranged as shown in FIG. 11C. The conducting wires of the first layer 1471 may be electrically connected with the conducting wires of the fifth layer 1475 through vias penetrating the second to fourth layers 1421 to 1474. For example, a conducting wire 1421 of the first layer may be electrically connected with a conducting wire 1423 of the fifth layer through a via 1422. The second layer 1472 and the fourth layer 1474 may each contain multiple conducting wires constituting the second loop antenna 1430. These conducting wires may be arranged as shown in FIG. 11C. The conducting wires of the second layer 1472 may be electrically connected with the conducting wires of the fourth layer 1474 through vias penetrating the third layer 1473. For example, a conducting wire 1431 of the second layer may be electrically connected with a conducting wire 1433 of the fourth layer through a via 1432. The first loop antenna 1420 and the second loop antenna 1430 may respectively generate magnetic fields 1424 and magnetic fields 1434 in a direction parallel with the Y-axis direction of the rear face of the electronic device 1400. Theses magnetic fields 1424 and magnetic fields 1434 may respectively pass through the first nonconductive region 1411 and the second nonconductive region 1412 and radiate outside the cover 1410. The third layer 1473 may include a core (e.g. ferromagnetic body like mu-metal) to increase the magnetic force generated by the solenoid coil.

The communication circuit 1440 may convert data from the processor 1450 (e.g. processor 12) into a magnetic signal and output the magnetic signal to the first loop antenna 1420 and second loop antenna 1430. The communication circuit 1440 may be mounted on a substrate, and may include the connection module 1130 and the communication module 1140 described in FIG. 11. The electronic device 1400 may selectively output a magnetic signal by use of the switch 1460. For example, a magnetic signal may be output through the switch 1460 to the first loop antenna 1420 or the second loop antenna 1430. The processor 1450 may control the switch 1460 to output a magnetic signal to one or both of the first loop antenna 1420 and the second loop antenna 1430.

Figure 15A:
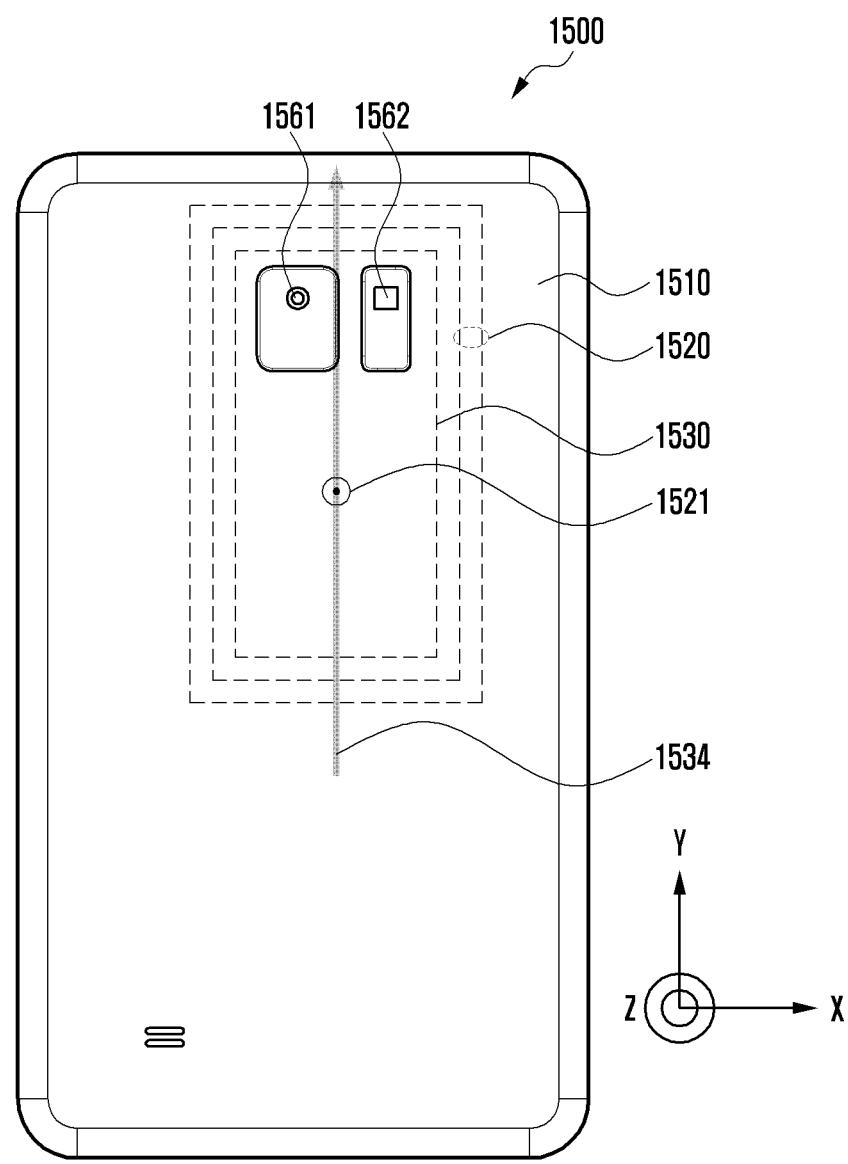
FIGS. 15A and 15B are diagrams illustrating an electronic device having flat-type and solenoid-type loop antennas, according to an embodiment of the present disclosure.
Figure 15B:
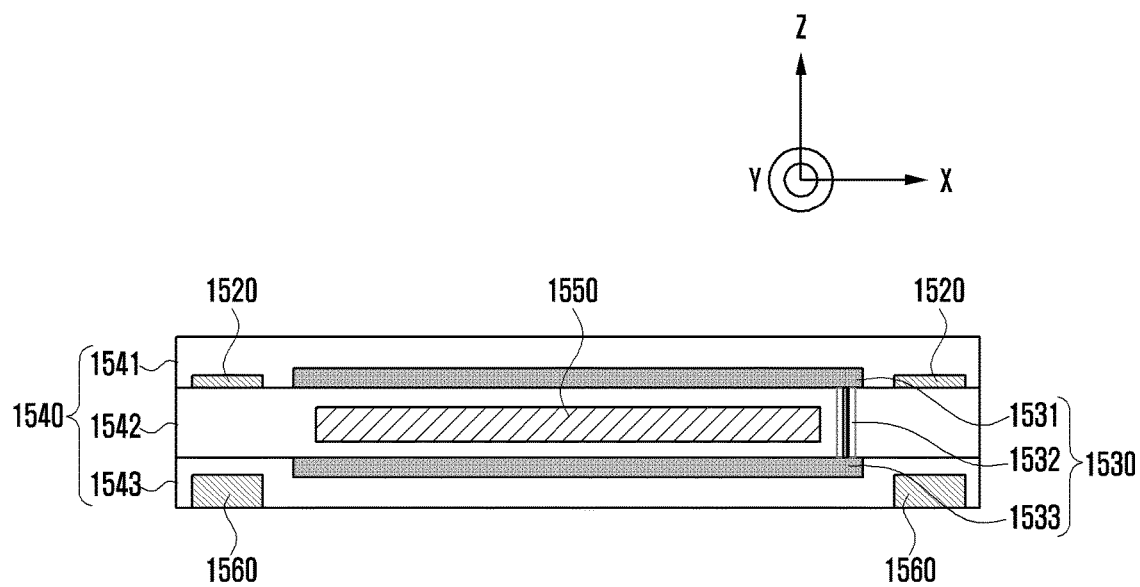

FIGS. 15A and 15B are diagrams illustrating an electronic device having flat-type and solenoid-type loop antennas, according to an embodiment of the present invention. FIG. 15A shows the rear face of the electronic device, and FIG. 15B shows a cross section of a FPCB implementing flat-type and solenoid-type loop antennas.

Referring to FIGS. 15A and 15B, an electronic device 1500 includes a first loop antenna 1520 of flat type, a second loop antenna 1530 of solenoid type, a communication circuit (e.g. the communication circuit 1440), and a processor (e.g. the processor 1450). The electronic device 1500 further includes a switch (e.g. the switch 1460) to select one of the first loop antenna 1520 and the second loop antenna 1530. These components are disposed in the housing of the electronic device 1500. The housing includes a cover 1510 constituting the rear face of the electronic device 1500.

The cover 1510 may be made of a nonconductive material (e.g. plastic or glass). The cover 1510 may include holes to expose specific components of the electronic device 1500 to the outside. For example, a camera 1561 is exposed through a first hole and a flash and sensor 1562 may be exposed through a second hole.

The first loop antenna 1520 of flat type and the second loop antenna 1530 of solenoid type may be realized using a FPCB 1540. The FPCB 1540 may be composed of multiple layers 1541 to 1543. At the first layer 1541, the first loop antenna 1520 may be realized using a flat coil wound in a spiral with the Z-axis as the center. The first loop antenna 1520 may generate magnetic fields 1512 in the Z-axis direction perpendicular to the rear face (XY plane) of the electronic device 1500. The first layer 1541 and the third layer 1543 may each contain multiple conducting wires constituting the second loop antenna 1530 of solenoid type. These conducting wires may be arranged as shown in FIG. 11C. The conducting wires of the first layer 1541 may be electrically connected with the conducting wires of the third layer 1543 through vias penetrating the second layer 1542. For example, a conducting wire 1531 of the first layer 1541 may be electrically connected with a conducting wire 1533 of the third layer 1543 through a via 1532. The second loop antenna 1530 may generate magnetic fields 1534 in a direction parallel with the Y-axis direction of the rear face of the electronic device 1500. Meanwhile, the FPCB 1540 may include a shield layer (e.g. graphite) to prevent interference between the first loop antenna 1520 and the second loop antenna 1530. For example, a first shield layer 1550 may be formed on the second layer 1542 to prevent a magnetic signal of the first loop antenna 1520 from affecting a magnetic signal of the second loop antenna 1530. A second shield layer 1560 may be formed on the third layer 1543 to prevent a magnetic signal of the second loop antenna 1530 from affecting a magnetic signal of the first loop antenna 1520.

Figure 16A:
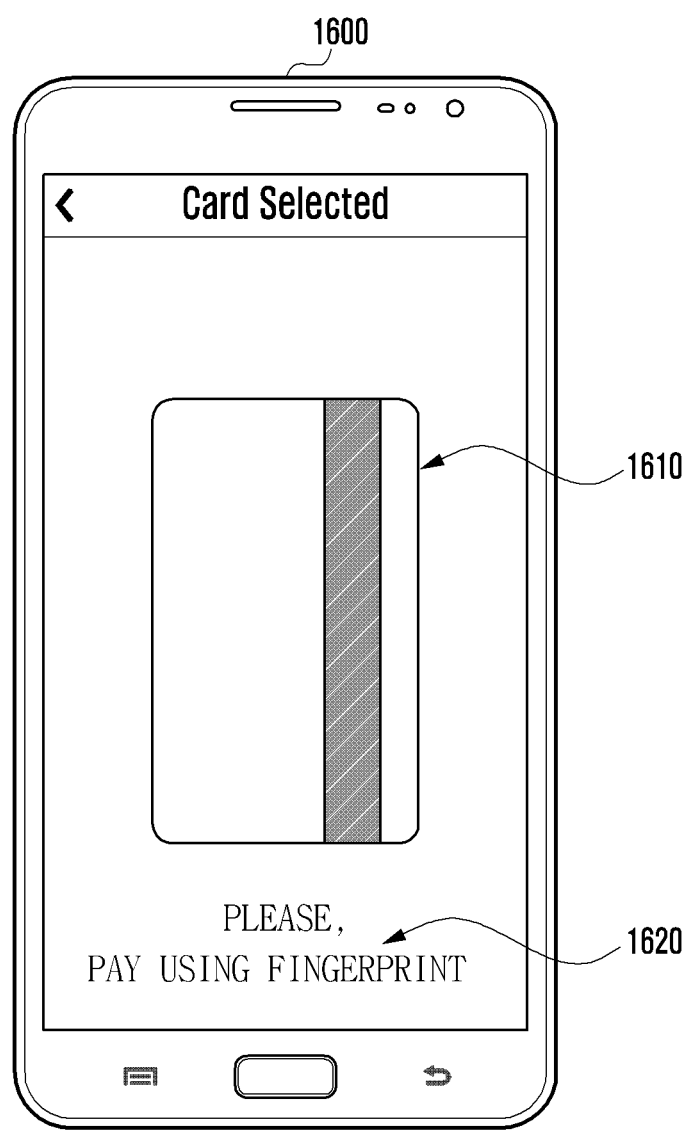
FIGS. 16A to 16C are diagrams illustrating generation of a magnetic field signal for payment, according to an embodiment of the present disclosure.
Figure 16B:
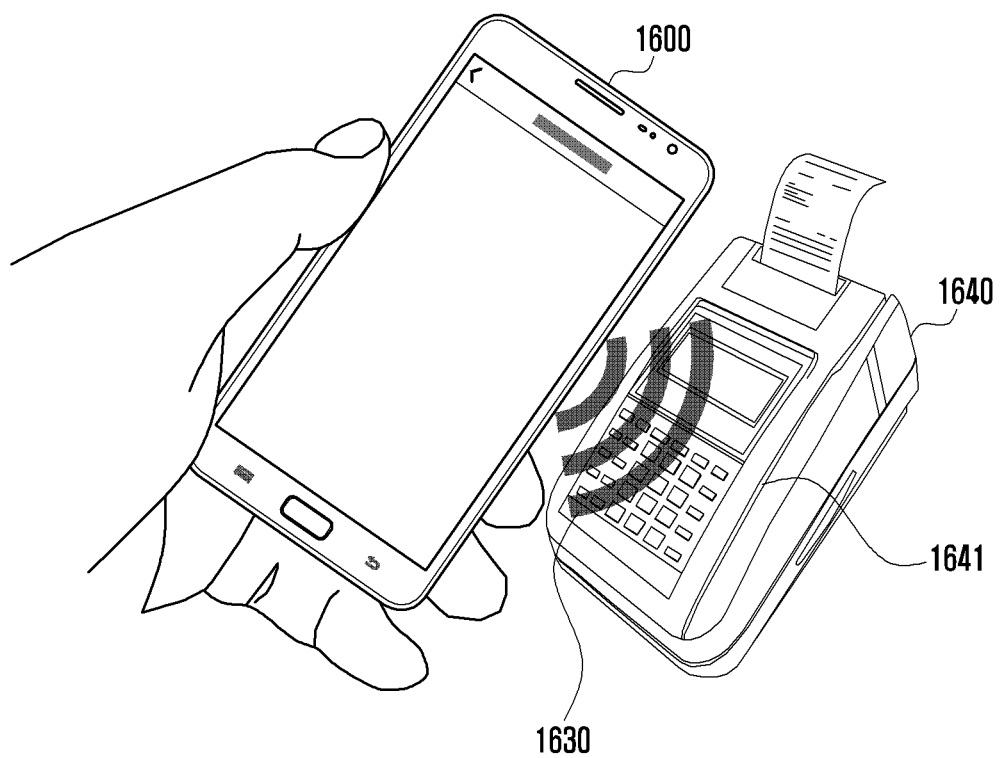
Figure 16C:
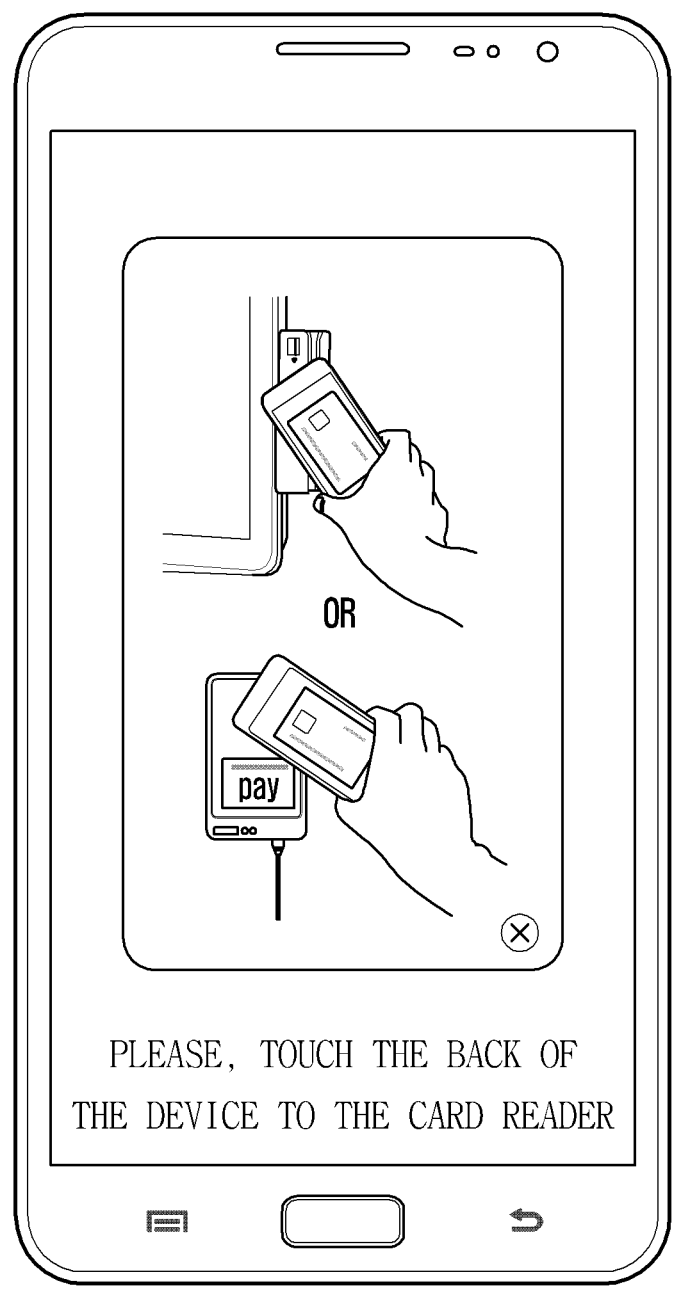

FIGS. 16A to 16C are diagrams illustrating generation of a magnetic field signal for payment, according to an embodiment of the present disclosure.

Referring to FIG. 16A, an electronic device 1600 (e.g., the electronic device 11) displays a selected payment card 1610. The electronic device 1600 also displays a guide message 1620 to guide the payment procedure. Upon completion of user authentication (e.g. fingerprint authentication), the electronic device 1600 emits a magnetic field signal 1630 containing card information.

Referring to FIGS. 16B and 16C, for payment, the user may bring the electronic device 1600 close to a rail 1641 of a card reader 1640. Here, successful recognition of the magnetic field signal 1630 may depend upon the portion or direction of the electronic device 1600 brought close to the rail 1641. For example, when the side of the electronic device 1600 is brought close to the rail 1641 while the direction that the screen of the electronic device 1600 is facing is at a right angle to the rail 1641, the card reader 1640 may fail to recognize the magnetic field signal 1630. Hence, to increase the possibility of successful payment, the electronic device 1600 may not only emit the magnetic field signal 1630 but also display a guide message indicating the right direction of the electronic device 1600 for successful recognition as shown in FIG. 16C. In addition, the electronic device 1600 may emit a magnetic field signal using multiple loop antennas. For example, the electronic device 1600 may emit a magnetic field signal by using a solenoid-type loop antenna (e.g. second loop antenna 1530) and a flat-type loop antenna (e.g. first loop antenna 1520) alternately or simultaneously.

Figure 17A:
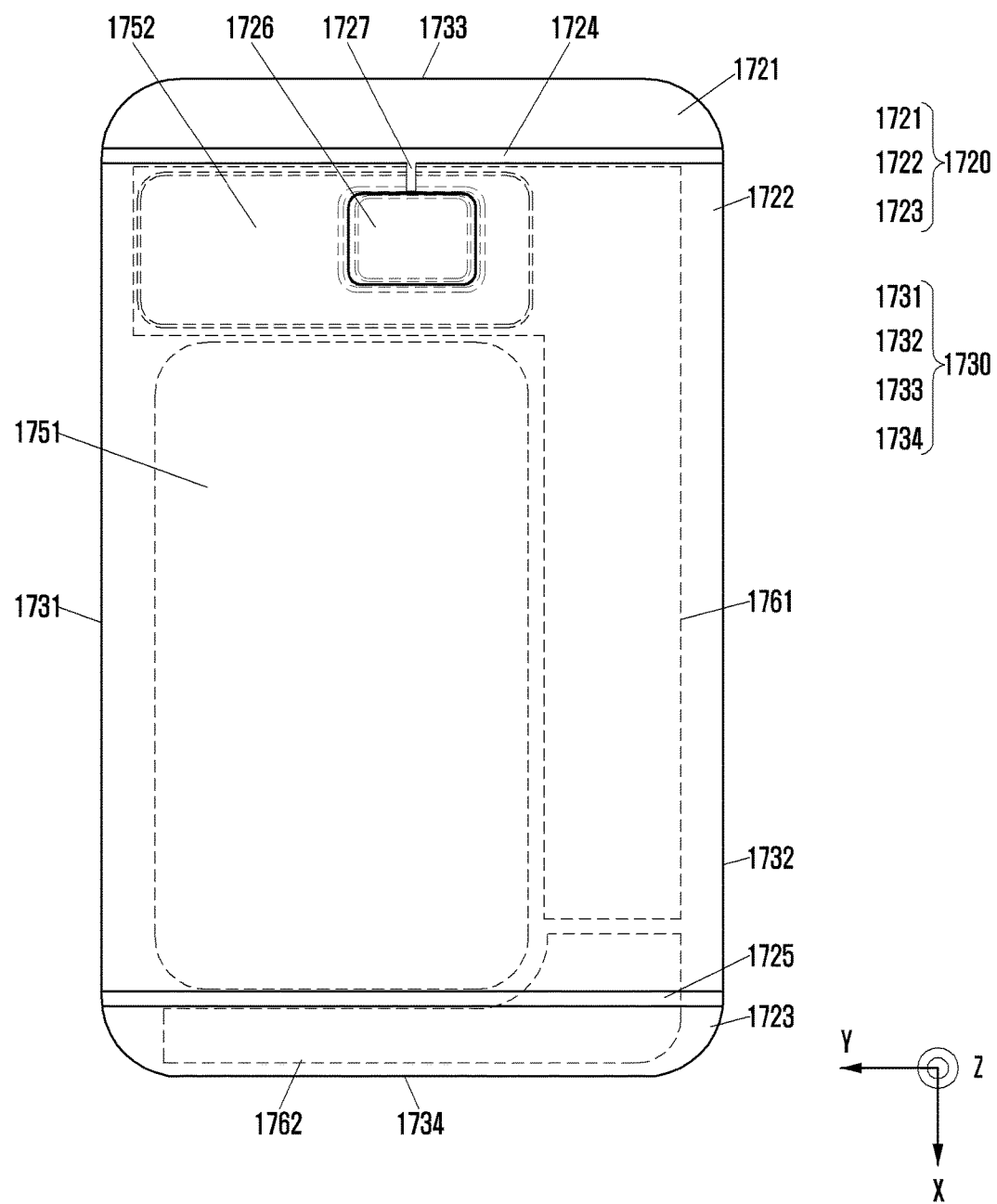
FIGS. 17A and 17B are diagrams illustrating an electronic device having a solenoid-type loop antenna, according to an embodiment of the present disclosure.
Figure 17B:
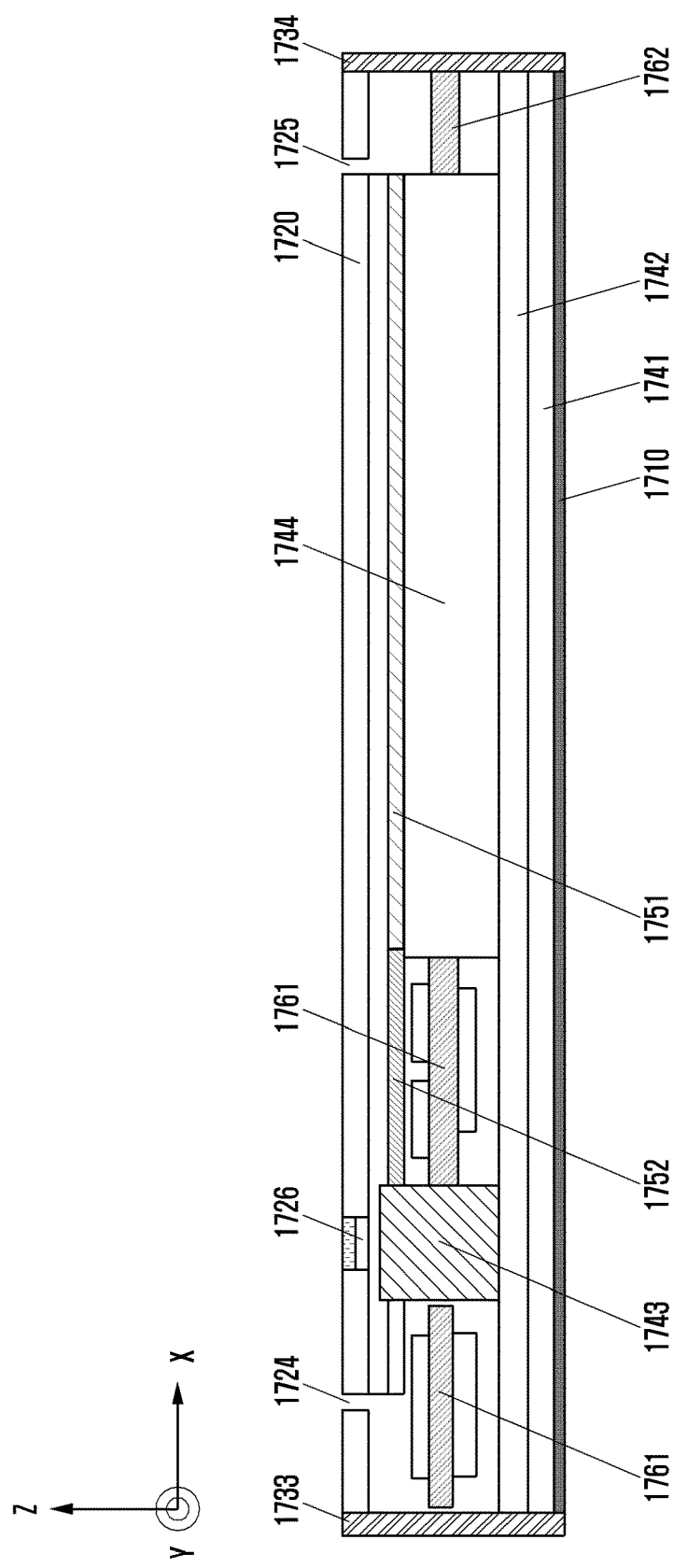

FIGS. 17A and 17B are diagrams illustrating an electronic device having a solenoid-type loop antenna, according to an embodiment of the present disclosure. FIG. 17A shows the rear face and some internal components of the electronic device, and FIG. 17B shows a cross section of the electronic device.

Referring to FIGS. 17A and 17B, the electronic device may include various electronic components and a housing to protect these electronic components. The housing includes a first surface 1710 in a first direction, a second surface 1720 in a second direction substantially opposite that of the first direction, and a side member 1730 enclosing at least a portion of the space between the first surface 1710 and the second surface 1720. For example, the first surface 1710 may be a cover constituting the front face of the electronic device, and the display 1741 may be exposed through an area of the cover. The second surface 1720 may be a cover constituting the rear face of the electronic device. The side member 1730 includes a right side cover 1731 constituting the right side of the electronic device, a left side cover 1732 constituting the left side thereof, a top side cover 1733 constituting the upper side thereof, and a bottom side cover 1734 constituting the lower side thereof.

Referring to FIG. 17A, the second surface 1720 may be made of a conductive material (e.g. metal), and anodizing may be applied to the second surface 1720 for coloring. The second surface 1720 may be demarcated into an upper region 1721, a central region 1722, and a lower region 1723. For example, the upper region 1721 and the central region 1722 are demarcated by an upper slit 1724 formed in a rectilinear form along the X-axis direction (left and right). The central region 1722 and the lower region 1723 are demarcated by a lower slit 1725 formed in a rectilinear form along the X-axis direction. The second surface 1720 (e.g. a portion of the upper region 1721, central region 1722, and lower region 1723) may be electrically connected with the communication module placed in the housing, and may be used as a radiator. The upper slit 1724 and the lower slit 1725 may be filled with a nonconductive substance. In the central region 1722, an opening 1726 is formed at a portion near the upper slit 1724 to expose the camera lens to the outside. Another slit 1727 linking the opening 1726 and the upper slit 1724 is formed between the opening 1726 and the upper slit 1724 along the Y-axis direction (up and down). The slit 1727 may also be filled with a nonconductive substance.

Referring to FIG. 17B, a display 1741, a bracket 1742, a camera 1743, a battery 1744, a loop antenna 1751, a metal plate 1752, a first substrate 1761, and a second substrate 1762 are arranged within the housing. Seen from the second surface 1720, the display 1741 is disposed on the first surface 1710, and the bracket 1742 designed to support the first surface 1710 is disposed on the display 1741. The camera 1743, the battery 1744, the first substrate 1761, and the second substrate 1762 are disposed on the bracket 1742. With the housing, the camera 1743 may be placed under the opening 1726, and the lens of the camera 1743 may be exposed to the outside through the opening 1726. The first substrate 1761 has an opening and the camera 1743 is exposed through the opening as shown. Seen towards the side of the housing (e.g. the right side cover 1731), the battery 1744 is disposed on the right of the camera 1743. The battery 1744 may supply power to various electronic components arranged in the housing (e.g., the display 1741, the camera 1743, and components mounted on the first substrate 1761 and the second substrate 1762 (e.g., the components shown in FIG. 1B)).

The loop antenna 1751 (e.g., the loop antenna 1120 of FIG. 11) is attached to the second surface 1720. Alternatively, an air gap may be present between the loop antenna 1751 and the second surface 1720. Seen from the second surface 1720, the loop antenna 1751 is disposed on the battery 1744. The metal plate 1752 has a plane substantially parallel to the first surface 1710 or the second surface 1720, and is disposed on a region of the first substrate 1761 near the upper slit 1724, as shown in FIG. 17A. The metal plate 1752 has an opening, and the camera 1743 may be exposed through the opening.

The loop antenna 1751 and the metal plate 1752 are disposed between the upper slit 1724 and the lower slit 1725. For example, one end of the metal plate 1752 may be extended close to or to contact one end of the loop antenna 1751, and the other end thereof may be extended close to the upper slit 1724. The other end of the loop antenna 1751 may be extended close to the lower slit 1725.

The loop antenna 1751 may have a wire wound several times (solenoid coil) in the X-axis direction (i.e., substantially parallel with the second substrate 1762). The opposite ends of the wire may be electrically connected with the substrate (e.g., communication module like the MST module 110 mounted on the first substrate 1761 or second substrate 1762). The loop antenna 1751 may contain a core (e.g., the core 1124*b*), which can increase the magnetic force generated by the solenoid coil together with the metal plate 1752. The magnetic flux generated by the solenoid coil may spread to the slits 1724 and 1725 through the core and the metal plate 1752 serving as a medium and be emitted to the outside through the slits 1724 and 1725.

Figure 18:
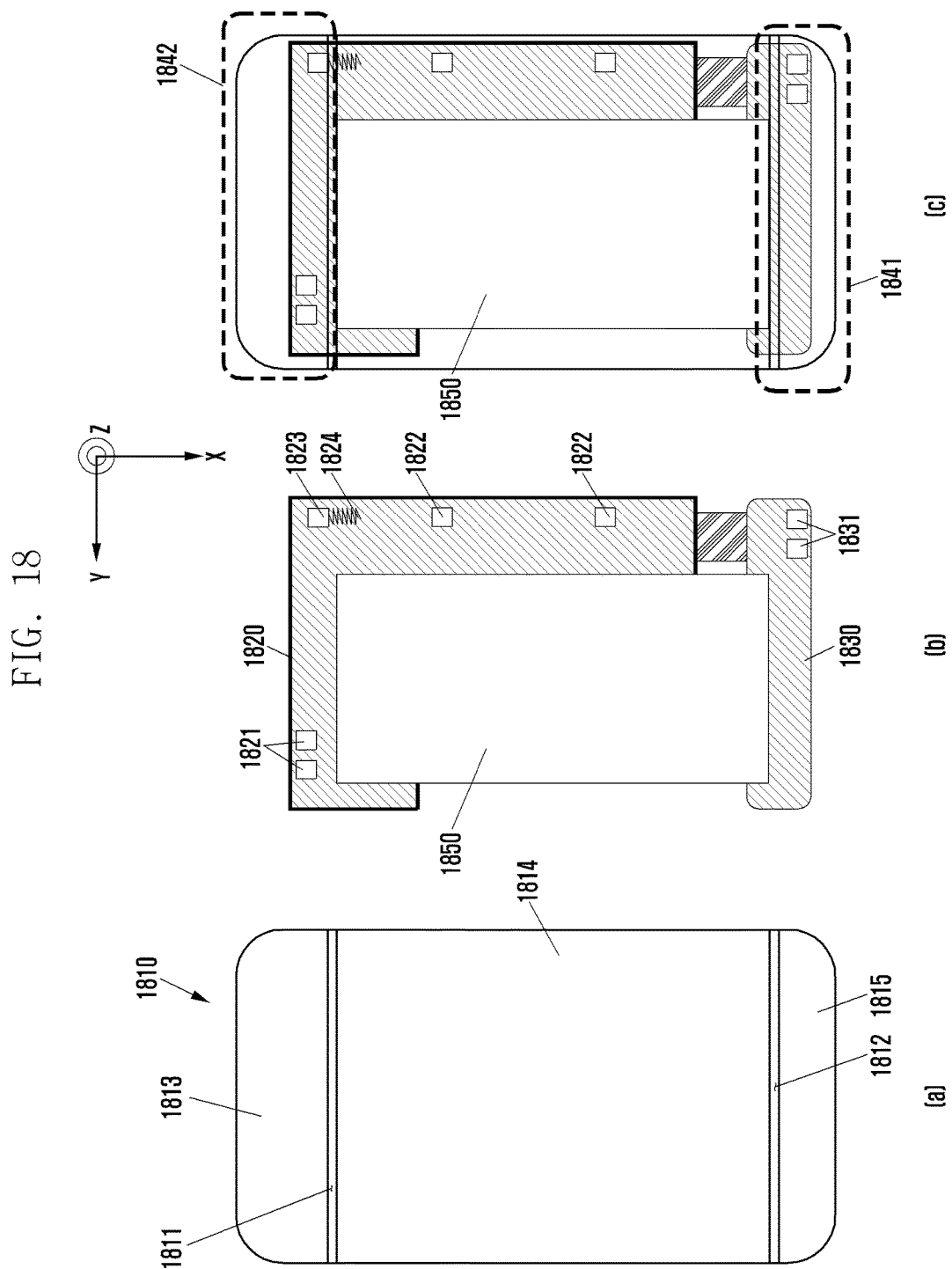
FIG. 18 is a diagram illustrating an electronic device having a solenoid-type loop antenna, according to an embodiment of the present disclosure.

FIG. 18 is a diagram illustrating an electronic device having a solenoid-type loop antenna, according to an embodiment of the present disclosure. Part (a) of FIG. 18 shows the rear face of the electronic device, part (b) of FIG. 18 shows internal components arranged below the rear face, and part (c) of FIG. 18 shows the rear face and internal components together.

Referring to part (a) of FIG. 18, a cover 1810 may constitute the rear face of the electronic device, and may be made of a conductive material. The cover 1810 may be demarcated by an upper slit 1811 and a lower slit 1812 into an upper region 1813, a central region 1814, and a lower region 1815.

Referring to parts (b) and (c) of FIG. 18, a loop antenna 1850 (e.g. loop antenna 1120 of FIG. 11) is disposed below the cover 1810. One end of the loop antenna 1850 extends close to the upper slit 1811 and the other end thereof may extends close to the lower slit 1812. The upper region 1813 is electrically connected to a first feeding point 1821 formed on a first substrate 1820 placed below the upper region 1813; the central region 1814 is electrically connected to a ground 1822 of the first substrate 1820; and the lower region 1815 is electrically connected to the second feeding point 1831 formed on a second substrate 1830. Hence, the lower region 1815 may act as a first antenna 1841, and the upper region 1813 may act as a second antenna 1842. In addition, when the upper region 1813 is electrically connected to a power feeding coil 1824 through a third feeding point 1823 formed on the first substrate 1820, it may act as a different antenna (e.g., an NFC antenna).

Figure 19:
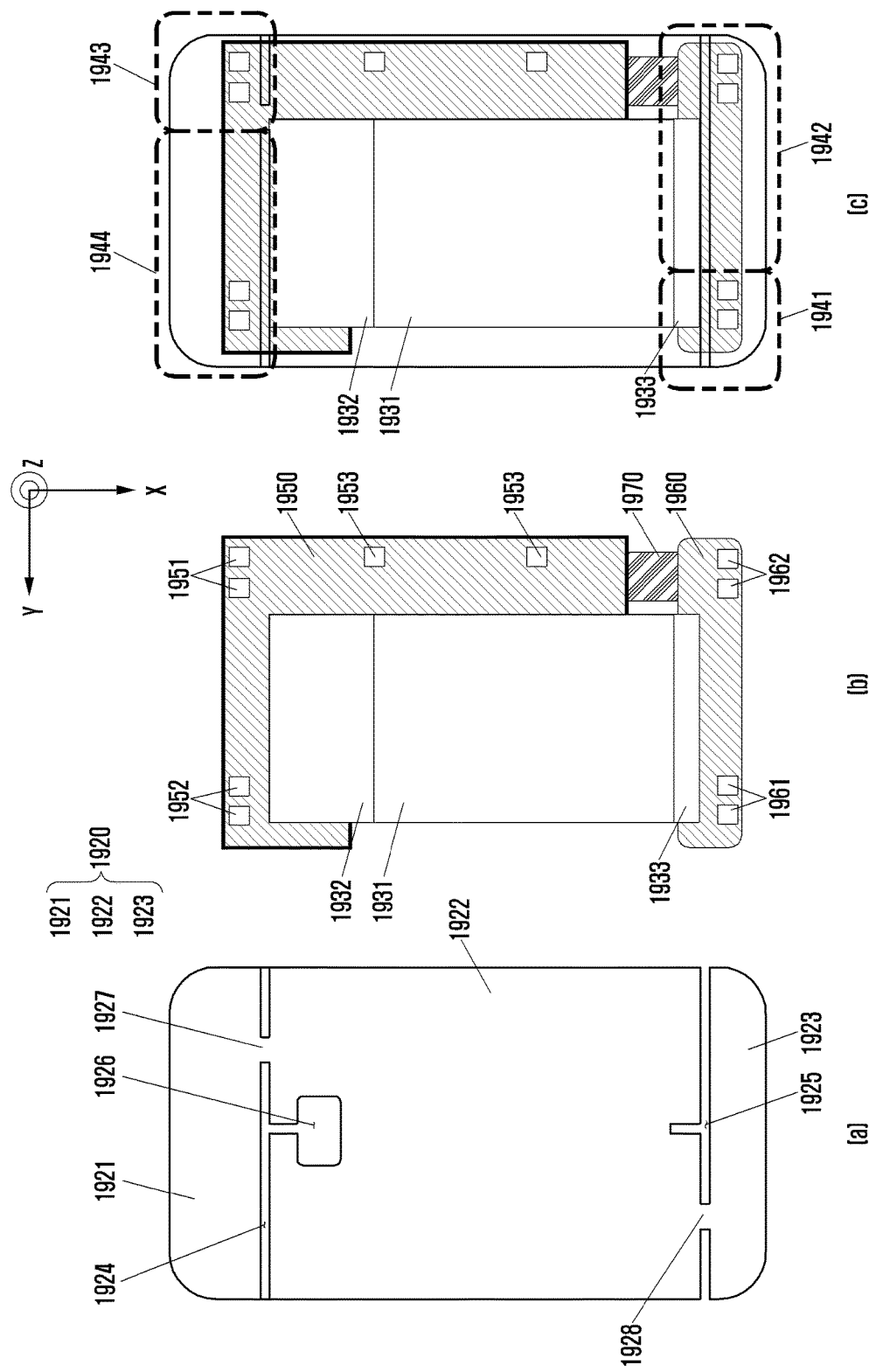
FIG. 19 is a diagram illustrating an electronic device having a solenoid-type loop antenna, according to an embodiment of the present disclosure.

FIG. 19 is a diagram illustrating an electronic device having a solenoid-type loop antenna, according to an embodiment of the present disclosure. Part (a) of FIG. 19 shows the rear face of the electronic device, part (b) of FIG. 19 shows internal components arranged below the rear face, and part (c) of FIG. 19 shows the rear face and internal components together.

Referring to part (a) of FIG. 19, a cover 1920 may constitute the rear face of the electronic device, and may be made of a conductive material. The cover 1920 has an opening 1926 to accommodate an optical sensor (e.g. camera or PPG sensor), and may be demarcated by an upper slit 1924 and a lower slit 1925 into an upper region 1921, a central region 1922, and a lower region 1923. A portion of the upper slit 1924 is extended toward the lower part of the cover 1920 (i.e. toward the opening 1926), and the upper slit 1924 may have a 'T' shape. Symmetrically, a portion of the lower slit 1925 is extended toward the upper part of the cover 1920, and the lower slit 1925 may also have a 'T' shape. The upper region 1921 and the central region 1922 are electrically connected through a first connection part 1927, and the central region 1922 and the lower region 1923 are electrically connected through a second connection part 1928.

Referring to parts (b) and (c) of FIG. 19, a loop antenna 1931 (e.g., the loop antenna 1120 of FIG. 11) is disposed between the upper slit 1924 and the lower slit 1925 and may generate magnetic fields in the X-axis direction. Hence, the magnetic flux generated by the loop antenna 1931 may spread to the upper slit 1924 and the lower slit 1925 and be emitted to the outside of the electronic device. A battery may be placed below the loop antenna 1931.

The length of the loop antenna 1931 may be less than the distance between the upper slit 1924 and the lower slit 1925. In this case, an eddy occurring in the cover 1920 or internal conductive components may reduce the radiation efficiency below a desired level. A first metal plate 1932 and a second metal plate 1933 may be attached close to (or in contact with) the opposite ends of the loop antenna 1931, respectively. Thereby, eddy generation may be reduced, and the magnetic flux may readily spread to the upper slit 1924 and the lower slit 1925. A first metal plate 1932 or a second metal plate 1933 may be used as a radiator for a different communication scheme. For example, the loop antenna 1931 may operate in concert with the first metal plate 1932 and the second metal plate 1933 and act as a radiator for MST. The first metal plate 1932 or the second metal plate 1933 may be used as a radiator for NFC or wireless power charging (WPC). Namely, the first metal plate 1932 and the second metal plate 1933 may be placed close to the upper slit 1924 and the lower slit 1925, respectively, and the magnetic flux generated by the first metal plate 1932 or the second metal plate 1933 may be emitted to the outside through the upper slit 1924 or the lower slit 1925.

The permeability of the metal plate (e.g. the core 1124b of FIG. 11) in the loop antenna 1931 may be different from that of the first metal plate 1932 or the second metal plate 1933. The permeability of the first metal plate 1932 may also be different from that of the second metal plate 1933. For example, when the metal plate of the loop antenna 1931, the first metal plate 1932 and the second metal plate 1933 are used respectively for MST, NFC, and WPC, they may have different operating frequencies (e.g. 13.56 MHz for NFC, 100 KHz to 205 KHz for WPC, and 100 KHz or less for MST) and have different permeabilities. Although the first metal plate 1932 and the second metal plate 1933 are used for different purposes, they may spread the magnetic flux generated by the loop antenna 1931 to the upper slit 1924 or the lower slit 1925, enhancing MST performance.

The region of the cover 1920 below the lower slit 1925 may be used as an antenna. For example, the left portion on the left of the second connection part 1928 may be used as a first antenna 1941, and the right portion on the right thereof may be used as a second antenna 1942. The first antenna 1941 and the second antenna 1942 may each be electrically connected with the second substrate 1960. The first antenna 1941 and the second antenna 1942 may receive a signal from the communication circuit through a first feeding point 1961 and a second feeding point 1962 disposed on the second substrate 1960, respectively, and emit the received signal, and may receive a radio signal from the outside and forward the received signal to the communication circuit through the first feeding point 1961 and the second feeding point 1962, respectively. The first antenna 1941 and the second antenna 1942 may operate as a main antenna for signal transmission and reception. The operating frequency of the first antenna 1941 may be higher than that of the second antenna 1942. For example, the first antenna 1941 may support 1.6 to 5 GHz and the second antenna 1942 may support 600 MHz to 2 GHz.

The region of the cover 1920 above the upper slit 1924 may be used as an antenna. For example, the right portion on the right of the first connection part 1927 may be used as a third antenna 1943, and the left portion on the right thereof may be used as a fourth antenna 1944. The third antenna 1943 and the fourth antenna 1944 may each be electrically connected with the first substrate 1950. The third antenna 1943 and the fourth antenna 1944 may respectively receive a signal from the communication circuit through a third feeding point 1951 and a fourth feeding point 1952 placed on the first substrate 1950 and emit the received signal, and may respectively receive a radio signal from the outside and forward the received signal to the communication circuit through the third feeding point 1951 and the fourth feeding point 1952. The third antenna 1943 and the fourth antenna 1944 may be used as a diversity antenna for signal reception. The operating frequency of the third antenna 1943 may be higher than that of the fourth antenna 1944. For example, the third antenna 1943 may support 1.6 to 5 GHz and the fourth antenna 1944 may support 600 MHz to 2 GHz.

The first connection part 1927 and the second connection part 1928 may be placed on the other side with respect to the X-axis. The first antenna 1941 and the third antenna 1943 supporting similar frequencies are placed diagonally opposite to each other, and the second antenna 1942 and the fourth antenna 1944 supporting similar frequencies are placed diagonally opposite to each other. This antenna arrangement may increase isolation between antennas and decrease correlation in signal transmission and reception.

In the cover 1920, the central region 1922 between the slits may be electrically connected to the ground 1953 of the first substrate 1950. To prevent an electric shock, the central region 1922 may be connected to the ground 1953 through a capacitor. Use of the ground 1953 may enhance antenna performance and increase the noise blocking effect.

The height of the first substrate 1950 may be different from that of the second substrate 1960. The first substrate 1950 and the second substrate 1960 may be connected through a FPCB 1970. As the second substrate 1960 is placed lower than the first substrate 1950, the distance between the second substrate 1960 and the first antenna 1941 or second antenna 1942 along the Z-axis may be greater than that between the first substrate 1950 and the first antenna 1941 or second antenna 1942. Making the distance between the second substrate 1960 and the first antenna 1941 or second antenna 1942 longer may increase performance of the first antenna 1941 and the second antenna 1942. Circuits of the first substrate 1950 and the power supply module of the second substrate 1960 may be connected through a coaxial line.

Figure 20:
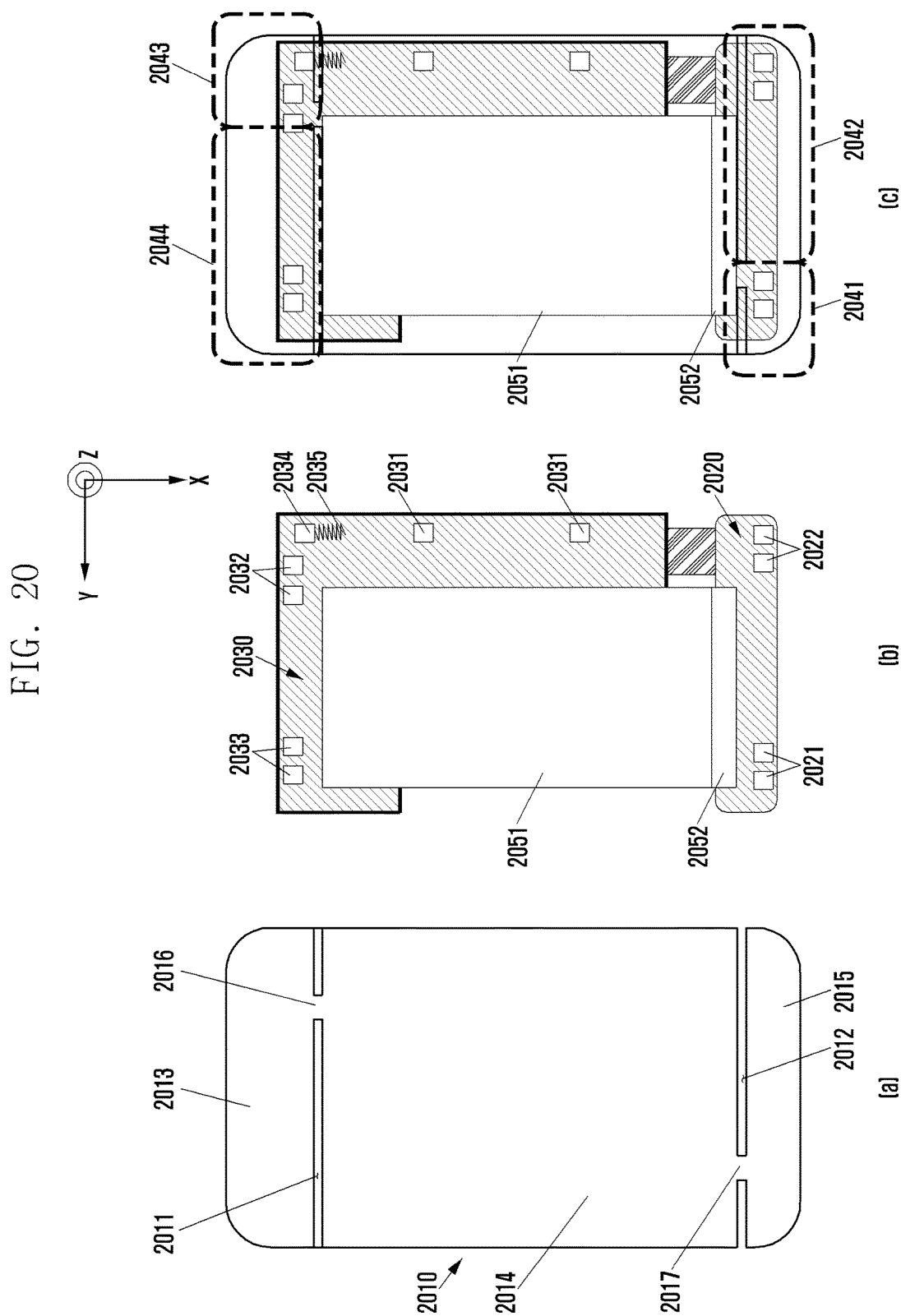
FIG. 20 is a diagram illustrating an electronic device having a solenoid-type loop antenna, according to an embodiment of the present disclosure.

FIG. 20 is a diagram illustrating an electronic device having a solenoid-type loop antenna, according to an embodiment of the present disclosure. Part (a) of FIG. 20 shows the rear face of the electronic device, part (b) of FIG. 20 shows internal components arranged below the rear face, and part (c) of FIG. 20 shows the rear face and internal components together.

Referring to part (a) of FIG. 20, a cover 2010 may constitute the rear face of the electronic device, and may be made of a conductive material. The cover 2010 is demarcated by an upper slit 2011 and a lower slit 2012 into an upper region 2013, a central region 2014, and a lower region 2015. The upper region 2013 and the central region 2014 are electrically connected through a first connection part 2016, and the central region 2014 and the lower region 2015 are electrically connected through a second connection part 2017.

Referring to parts (b) and (c) of FIG. 20, the left portion of the lower region 2015 on the left of the second connection part 2017 is electrically connected with a first feeding point 2021 formed on the second substrate 2020 placed below the lower region 2015 and may be used as a first antenna 2041, and the right portion thereof is electrically connected with a second feeding point 2022 formed on the second substrate 2020 and may be used as a second antenna 2042. The central region 2014 is electrically connected with a ground 2031 of the first substrate 2030. The right portion of the upper region 2013 on the right of the first connection part 2016 is electrically connected with a third feeding point 2032 formed on the first substrate 2030 placed below the upper region 2013 and may be used as a third antenna 2043, and the left portion thereof is electrically connected with a fourth feeding point 2033 formed on the first substrate 2030 and may be used as a fourth antenna 2044. In addition, the right portion on the right of the first connection part 2016 is electrically connected to a power feeding coil 2045 through a fifth feeding point 2034 formed on the first substrate 2030, and may act as a different antenna (e.g., NFC antenna). The upper end of a loop antenna 2051 (e.g., the loop antenna 1120 of FIG. 11) may be extended up to the upper slit 2011. Although the upper end of the loop antenna 2051 may be not extended up to the lower slit 2012, a metal plate 2052 may be placed between the upper end and the lower slit 2012. Hence, the magnetic flux generated by the loop antenna 2051 may spread to the lower slit 2012 through the metal plate 2052.

Figure 21:
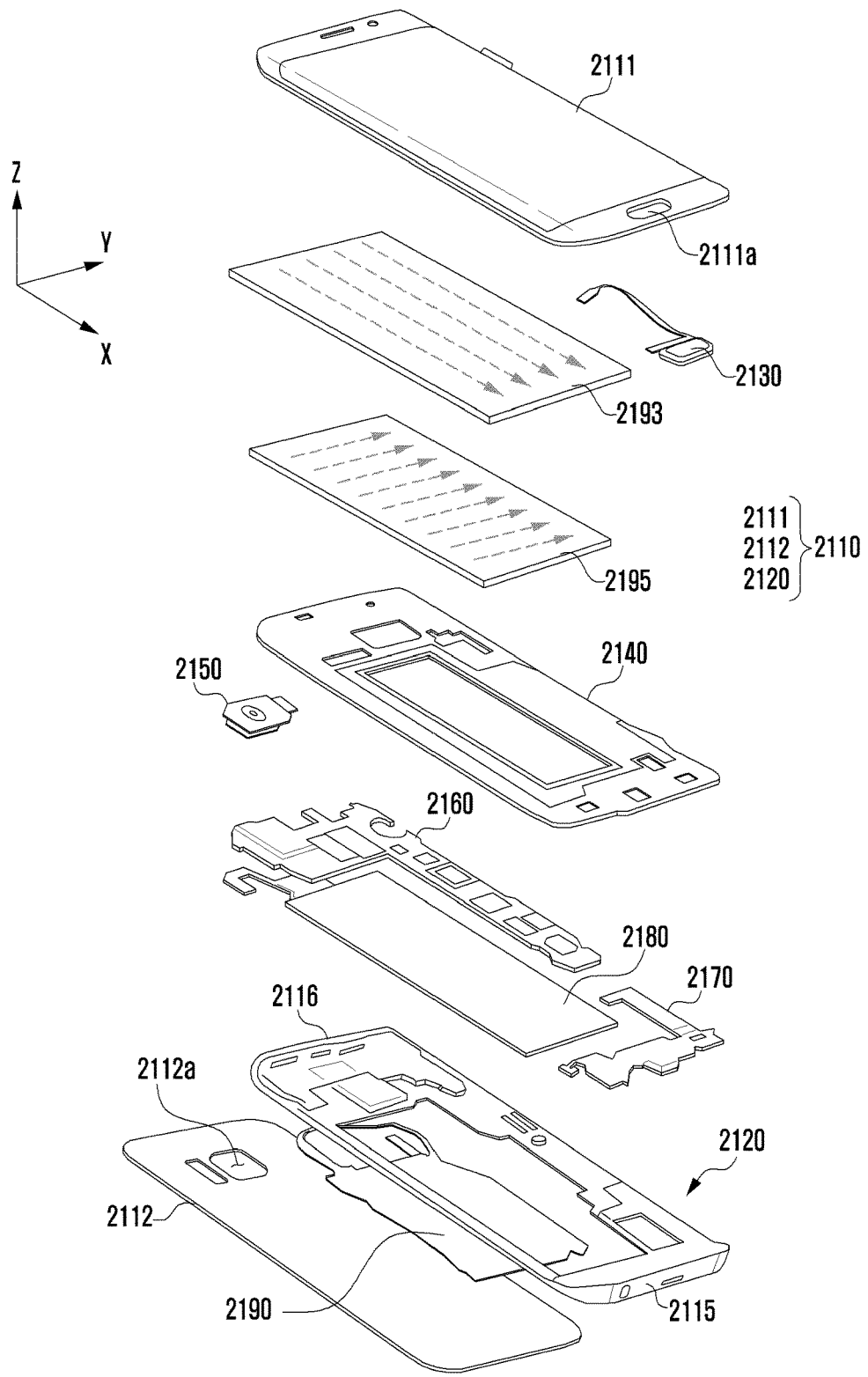
FIG. 21 is a diagram illustrating an exploded view of an electronic device, according to an embodiment of the present disclosure.

FIG. 21 is a diagram illustrating an exploded view of an electronic device, according to an embodiment of the present disclosure.

Referring to FIG. 21, a housing 2110 is composed of a front cover 2111, a rear cover 2112, and a side member 2120. Within the housing 2110, a bracket 2140 (for supporting a display 2193, a loop antenna 2195, a fingerprint sensor 2130, and the front cover 2111), a camera 2150, a first substrate 2160, a second substrate 2170, a battery 2180, and an antenna 2190 are arranged. The fingerprint sensor 2130 may be electrically connected to the first substrate 2160 and/or the second substrate 2170, and may recognize a fingerprint detected on the home key 2111a and generate and output fingerprint information. For example, the fingerprint sensor 2130 may output fingerprint data to a processor (e.g. application processor) mounted on the first substrate 2160. The camera 2150 may be mounted on the first substrate 2160 and be exposed through a hole 2112a formed on the rear cover 2112. The first substrate 2160 may be placed next to the upper side cover 2116 of the side member 2120 and may be electrically connected with the upper side cover 2116. The second substrate 2170 may be placed next to the lower side cover 2115 and may be electrically connected with the lower side cover 2115. The antenna 2190 may include multiple coil antennas for payment and may be electrically connected with the substrate (e.g., a communication module like the NFC control module 140 mounted on the first substrate 2160 or the second substrate 2170).

The display 2193 may include liquid crystals or organic light-emitting diodes (OLED), and signal lines arranged along the X-axis direction to drive them. The loop antenna 2195 may be attached to the bottom surface of the display 2193. The loop antenna 2195 may include a solenoid coil. Signal coupling may be caused when the current path of the solenoid coil is identical to the direction of the arranged signal lines. That is, when a current flows through the solenoid coil, electrical coupling may occur between the solenoid coil and the signal lines. Such signal coupling may cause a driving error in the display 2193. To prevent signal coupling, assuming that the configuration of the loop antenna 2195 is identical to that of, for example, the loop antenna 1120 of FIG. 11, the current direction in the solenoid coil of the loop antenna 2195 may be the Y-axis direction at a right angle to the X-axis direction of the signal lines arranged in the display 2193.

Figure 22:
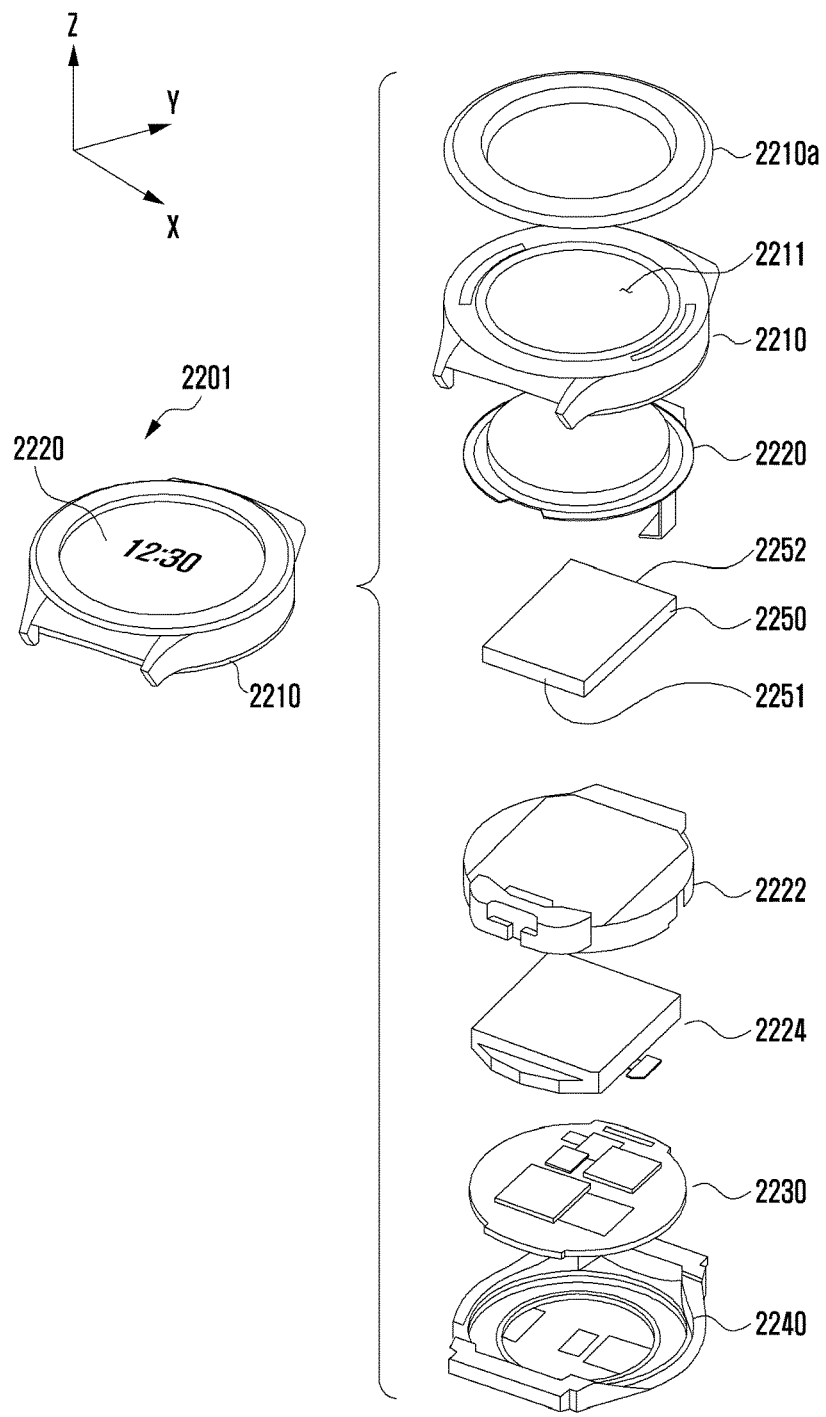
FIG. 22 is a diagram illustrating an exploded view of an electronic device, according to an embodiment of the present disclosure.

FIG. 22 is a diagram illustrating an exploded view of an electronic device, according to an embodiment of the present disclosure.

Referring to FIG. 22, an electronic device 2201 includes a housing 2210, a display 2220, a loop antenna 2250, a bracket 2222, a battery 2224, a substrate 2230, and a rear cover 2240.

The housing 2210 protects various components arranged therein (e.g., the display 2220, the battery 2224, the substrate 2230, and the loop antenna 2250). The housing 2210 includes a bezel wheel 2210a placed around an opening 2211 through which the display 2220 is exposed. The bezel wheel 2210a may prevent the border area of the display 2220 from being externally exposed and may generate user input by rotation.

The display 2220 may be in the form of a disk with a given width and may be used to output image or text data. When the display 2220 includes a touch panel, it may receive user touch input and forward the touch input to the processor mounted on the substrate 2230. The ground portion of the display 2220 (e.g., an FPCB, a shield layer, or a heat dissipation layer) may be connected with that of the substrate 2230 to maintain antenna performance. A ground pattern of a tail shape may be pulled out from the ground portion of the display 2220. The tail-shaped ground pattern may be seated in the bracket 2222 and may be electrically connected to one surface of the substrate 2230. Electrical connection between the ground portion of the display 2220 and the ground portion of the substrate 2230 may prevent the display 2220 from disturbing signal transmission and reception. The display 2220 may have a layered structure including a touch panel, display panel, adhesive layer, ground layer, and FPCB. The display 2220 may include signal lines to exchange data with the substrate 2230. In one embodiment, signal lines for the display panel (e.g. FPCB), touchscreen, and ground may protrude from the display 2220.

The display 2220 is externally exposed through the opening 2211, and the loop antenna 2230 is disposed below the display 2220. The loop antenna 2230 is electrically connected with the communication module (e.g. MST control module 130) mounted on the substrate 2230. When signal lines of the display 2193 are arranged along the X-axis direction, assuming that the configuration of the loop antenna 2250 is identical to that of the loop antenna 1120 of FIG. 11, the current direction in the solenoid coil of the loop antenna 2250 may be the Y-axis direction at a right angle to the X-axis direction of the arranged signal lines.

The bracket 2222 is used to mount or fix the display 2220, battery 2224, and substrate 2230. The bracket 2222 may be used to mount or fix signal lines interconnecting individual components. The bracket 2222 may be made of a nonconductive material (e.g., a plastic).

The battery 2224 may be mounted on the bracket 2222, and may be electrically connected with the substrate 2230. The battery 2224 may be charged by an external power source, and may supply power to the electronic device 2201.

The substrate 2230 is used to mount modules or chips needed to operate the electronic device 2201. The substrate 2230 may be used to mount the processor, memory, and communication module. The substrate 2230 may include a power feeding portion to supply power to the antenna radiator and a ground portion. The ground portion may be connected to the housing 2210. In this case, the housing 2210 may be used as an antenna radiator and may be electrically connected with an RF module of the substrate 2230. The ground portion of the substrate 2230 is connected with that of the display 2220 (e.g., an FPCB, a shield layer, or a heat dissipation layer). The ground portion of the substrate 2230 may also be connected with the housing 2210. The rear cover 2240 is coupled with the housing 2210 to thereby fix and protect internal constituents. The rear cover 2240 may be made of a nonmetallic or nonconductive material. Alternatively, the rear cover 2240 may be made of a conductive material, and may be electrically insulated from the housing 2210 through a separate insulation member. The rear cover 2240 may include at least one slit. For example, a first slit and a second slit may be formed respectively close to the opposite ends 2252 and 2251 of the loop antenna 2250 on the rear cover 2240.

Figure 23A:
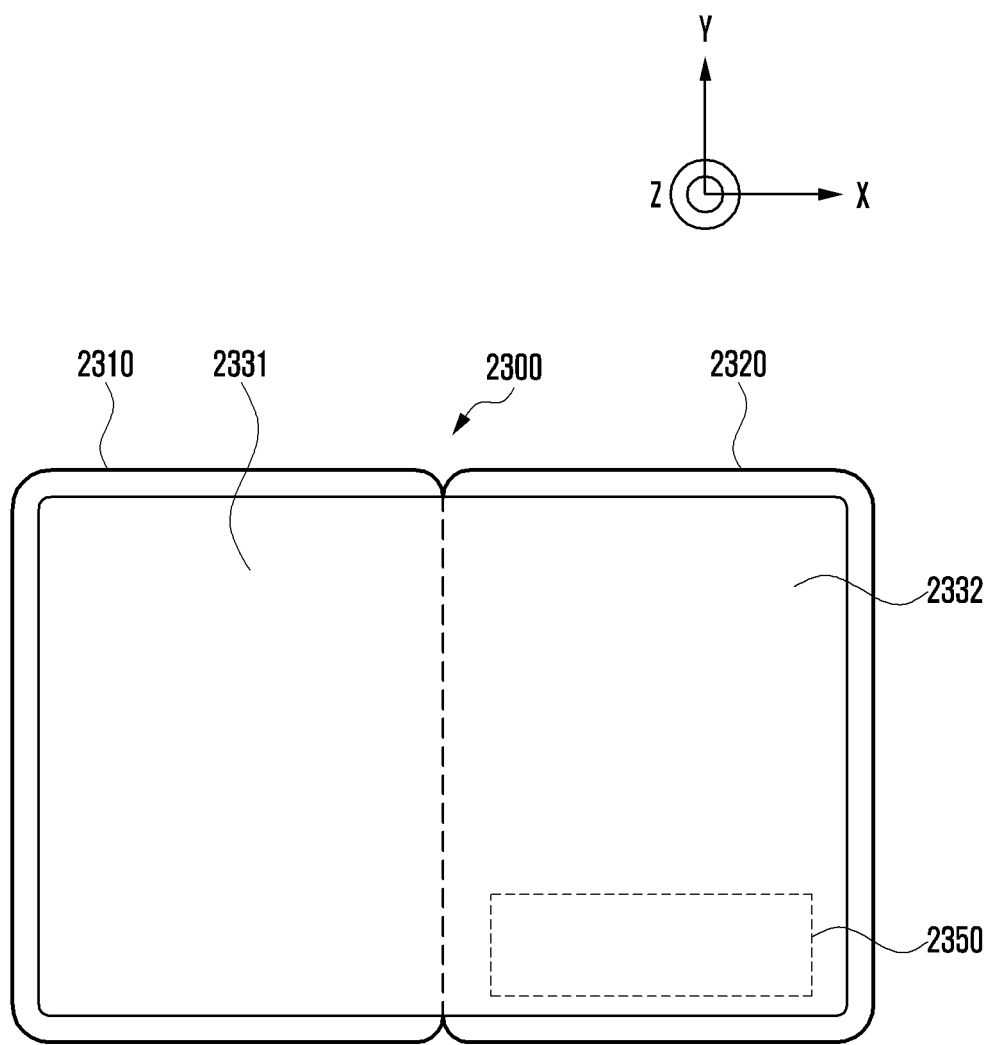
FIGS. 23A and 23B are diagrams illustrating an electronic device having dual displays, according to an embodiment of the present disclosure.
Figure 23B:
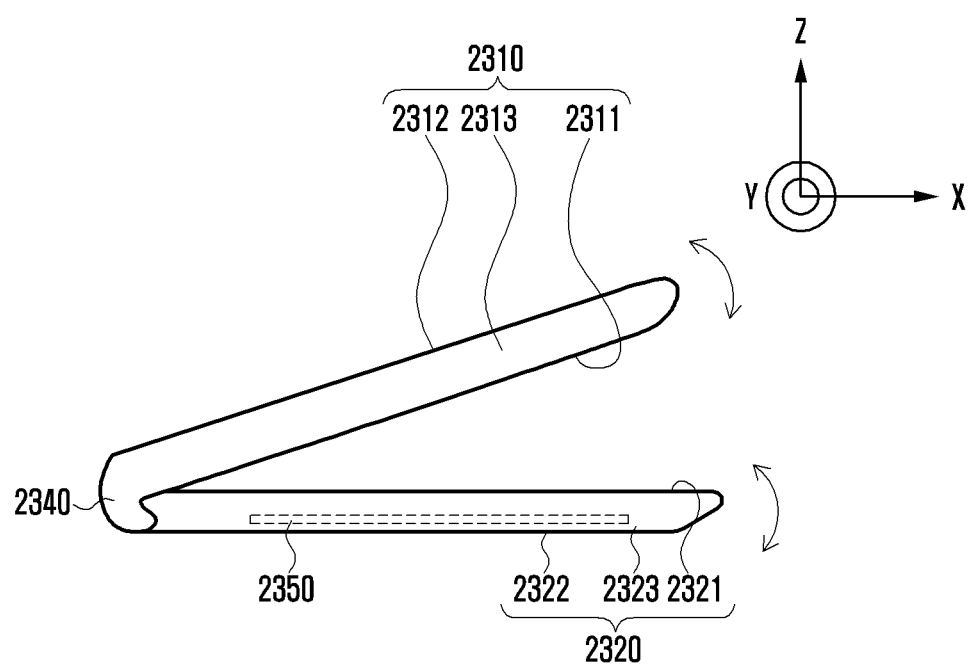

FIGS. 23A and 23B are diagrams illustrating an electronic device having dual displays, according to an embodiment of the present disclosure.

Referring to FIGS. 23A and 23B, an electronic device 2300 includes a first housing 2310 and a second housing 2320. The first housing 2310 includes a first surface 2311 to expose a first display 2331, a second surface 2312 in a direction opposite that of the first display 2331, and a first side member 2313 enclosing the space between the first surface 2311 and the second surface 2312. The second housing 2320 includes a third surface 2321 to expose a second display 2332, a fourth surface 2322 in a direction opposite that of the second display 2332, and a second side member 2323 enclosing the space between the third surface 2321 and the fourth surface 2322.

The first housing 2310 and the second housing 2320 may be rotated. For example, the electronic device 2300 includes a hinge member 2340 enabling rotation of the first housing 2310 and the second housing 2320. Hence, the electronic device 2300 may be spread so that the first display 2331 and the second display 2332 face the same direction as shown in FIG. 23A, or may be folded so that the first display 2331 and the second display 2332 face each other as shown in FIG. 23B. In another embodiment, when the housings and displays are implemented as flexible entities, the electronic device may be folded or spread without a hinge member.

The first housing 2310 or the second housing 2320 may include a loop antenna. For example, the second housing 2320 may include a loop antenna of flat type (e.g., the loop antenna 1020), a loop antenna of solenoid type (e.g., the loop antenna 1120 or the loop antenna 1220), multiple loop antennas of solenoid type (e.g., the loop antennas 1320 and 1330 or the loop antennas 1420 and 1430), or a combination of a flat-type loop antenna and a solenoid-type loop antenna (e.g., the first loop antenna 1520 and the second loop antenna 1530).

Figure 24:
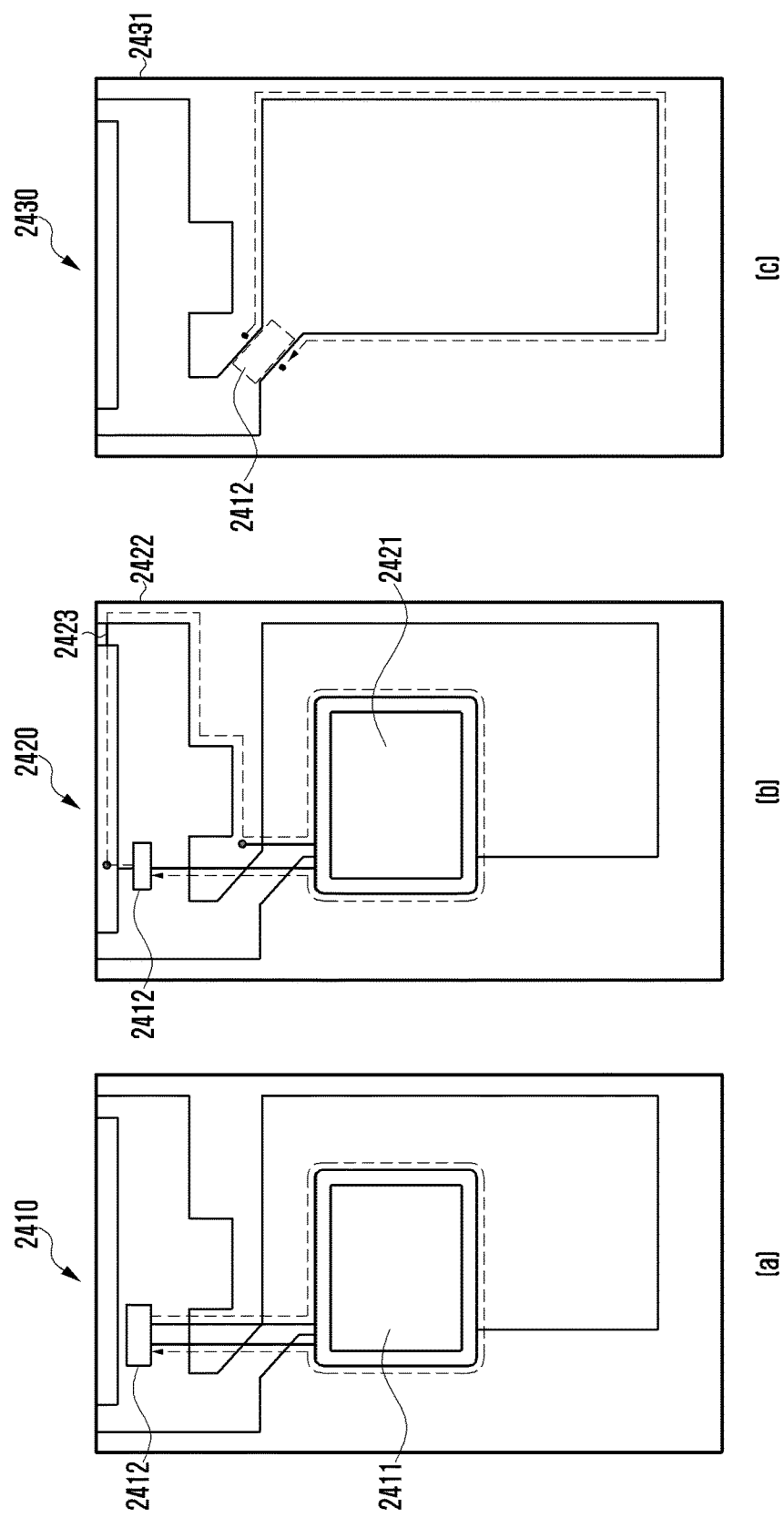
FIG. 24 is a diagram illustrating various loop antennas with different structures, according to an embodiment of the present disclosure.

FIG. 24 is a diagram illustrating various structures of loop antennas, according to an embodiment of the present disclosure. A loop antenna (e.g., a coil antenna) may be implemented as various forms for an electronic device (e.g., handheld electronic devices, a UE, and the like).

Referring to (a) of FIG. 24, a loop antenna 2410 is implemented in such a way that patterns are formed on an FPCB 2411. A path (or current path) indicted by dashed line is formed with the patterns on FPCB 2411 and is connected to an MST control module 2412 (e.g., the MST control module 820 shown in FIG. 8). The FPCB 2411 may further include a loop antenna for wireless charging and NFC, in addition to a loop antenna for MST.

Referring to (b) of FIG. 24, the loop antenna (e.g., a coil antenna 2420) is implemented in such a way as to connect to at least part of physical components and the pattern on the FPCB 2421. For example, the outer case (e.g., a cover) of the electronic device may be implemented in such a way that its part 2422 is made of conduction materials (e.g., metal).

When the conduction part 2422 is physically separated (electrically disconnected) from other parts, it is electrically connected to them via a linking component 2423. The linking component 2423 may be passive elements, such as inductors, capacitors, and the like, or a conduction material structure.

Referring to (c) of FIG. 24, the loop antenna (e.g., a coil antenna 2430) is implemented in such a way as to use a part 2431 of a physical structure of the electronic device. The part 2431 of a physical structure may include a slit to secure inductance required for communication. The part 2431 is connected to the MST control module 2412 via a current path formed near the slit.

According to various embodiments of the present invention, an electronic device may include: a housing having a first surface in a first direction, a second surface in a second direction opposite to the first direction, and a side member enclosing at least a portion of the space between the first surface and the second surface; a conductive pattern placed in the housing and having a first conductive coil whose axis is substantially perpendicular to the first direction or the second direction; a communication circuit placed in the housing, electrically connected with the first conductive coil, and configured to cause the first conductive coil to generate a magnetic flux; a display exposed through at least a portion of the first surface; and a processor placed in the housing and electrically connected with the communication circuit and the display.

The second surface may include a first region made of a conductive material and a second region made of a nonconductive material.

The first region may include one or more openings.

The second region may fill a first one of the openings.

When seen from the second surface, the first conductive coil may be largely placed under the first region.

The first conductive coil may be configured to include a first section placed near or on the second region and to cause the magnetic flux to pass through the second region.

The side member may be formed as a single entity together with the second surface.

The second surface may further include a third region made of a nonconductive material.

The third region may fill a second one of the openings.

The first conductive coil may be configured to include a second section placed near or on the third region and to cause the magnetic flux to pass through the third region. When seen from the second surface, the axis may be extended in a third direction from the first region to the second region.

The first conductive coil may be wound along the axis. When seen from the second surface, the second region and the third region may be at least partially enclosed by the first region. The second region and the third region may be arranged symmetrically with respect to a portion of the first region.

The electronic device may further include a flexible printed circuit board (FPCB). The conductive pattern may be mounted on the FPCB.

The FPCB may include a first layer, a second layer, and a middle layer between the first layer and the second layer.

The first layer may include a plurality of first conductive lines constituting a part of the first conductive coil.

The second layer may include a plurality of second conductive lines constituting another part of the first conductive coil.

The middle layer may include a plurality of conductive vias to electrically connect the first conductive lines and the second conductive lines.

The FPCB may include a core to increase the magnetic force generated by the first conductive coil.

The electronic device may further include an insulation layer formed between the conductive pattern and the first region.

The conductive pattern may further include a second conductive coil placed in the housing and having an axis substantially perpendicular to the first direction or the second direction.

The first conductive coil and the second conductive coil may be realized using a FPCB.

The FPCB may include a first layer, second layer, third layer, fourth layer, and fifth layer. The first conductive coil may be formed on the first layer and fifth layer, and the second conductive coil may be formed on the second layer and fourth layer.

One coil among the first conductive coil and the second conductive coil may be used for one of near field communication (NFC), magnetic secure transmission (MST) and wireless charging, and the other coil may be used for another one of NFC, MST and wireless charging.

The conductive region of the housing may be electrically connected with the first conductive coil to form a current path.

The direction of a current flowing through the first conductive coil may be perpendicular to the direction of signal lines arranged in the display.

According to various embodiments of the present invention, an electronic device may include: a housing having a first surface in a first direction, a second surface in a second direction opposite to the first direction, and a side member enclosing at least a portion of the space between the first surface and the second surface; a conductive pattern placed in the housing, and having a first conductive coil whose axis is substantially parallel with the first direction or the second direction and a second conductive coil whose axis is substantially perpendicular to the first direction or the second direction; a communication circuit placed in the housing, electrically connected with the first conductive coil and the second conductive coil, and configured to cause at least one of the first conductive coil and the second conductive coil to generate a magnetic flux; a display exposed through at least a portion of the first surface; and a processor placed in the housing and electrically connected with the communication circuit and the display.

When seen from the second surface, the first conductive coil may enclose the second conductive coil.

When seen from the second surface, the second conductive coil may be largely placed under the second surface.

The first conductive coil and the second conductive coil may emit a magnetic field signal carrying MST data.

One of the first conductive coil and the second conductive coil may emit a magnetic field signal carrying MST data, and the other may emit a magnetic field signal carrying NFC data.

The first conductive coil and the second conductive coil may be realized using a FPCB.

The FPCB may include a first layer, a second layer, and a middle layer between the first layer and the second layer. When seen from the second surface, the first conductive coil is placed on the first layer so as to enclose the second conductive coil. The first layer may include a plurality of conductive lines constituting a part of the second conductive coil. The second layer may include a plurality of conductive lines constituting another part of the second conductive coil. The middle layer may include a plurality of conductive vias to electrically connect the conductive lines of the first layer and the conductive lines of the second layer.

The middle layer may include a first shield layer to prevent a first magnetic field signal of the first conductive coil from affecting a second magnetic field signal of the second conductive coil. The second layer may include a second shield layer to prevent the second magnetic field signal from affecting the first magnetic field signal.

The first conductive coil may emit a magnetic field signal carrying NFC data, and the second conductive coil may emit a magnetic field signal carrying MST data.

Figure 25:
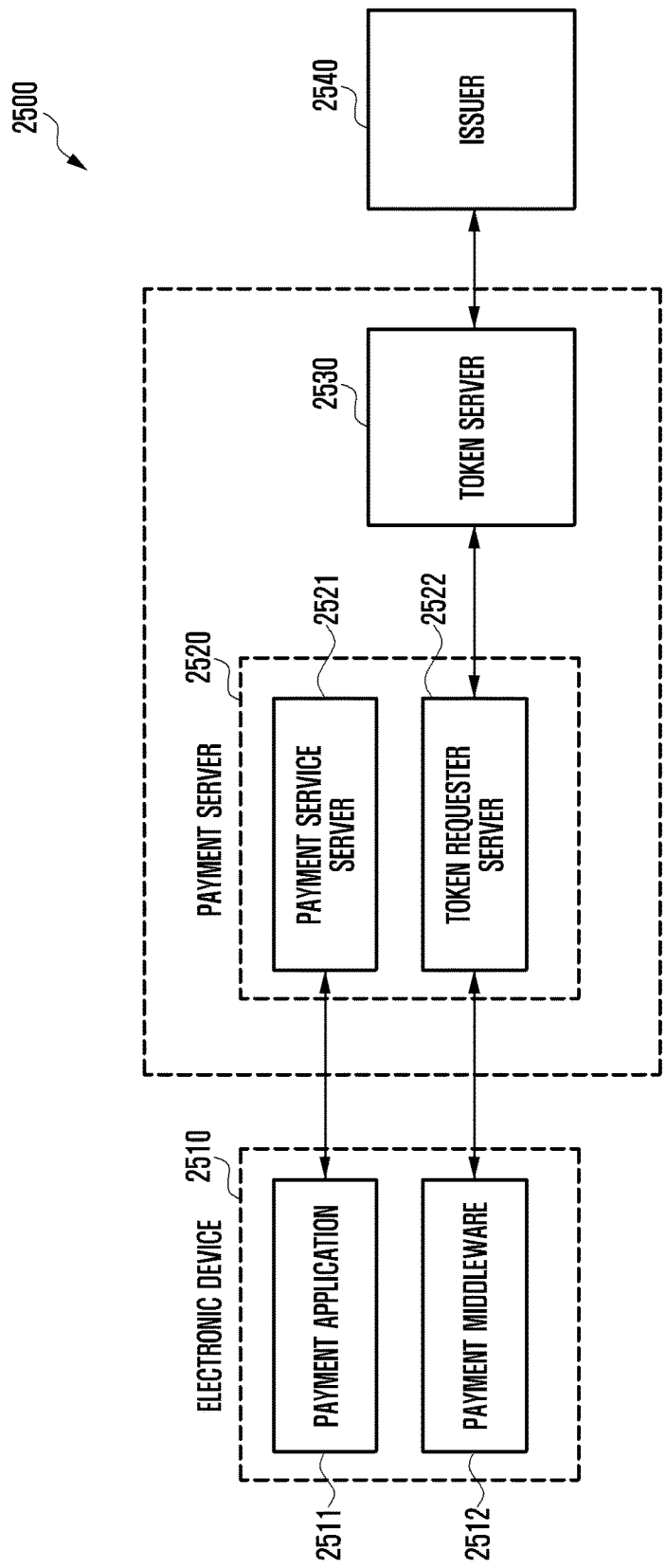
FIG. 25 is a diagram illustrating a payment system, according to an embodiment of the present disclosure.

FIG. 25 is a block diagram illustrating a payment system, according to an embodiment of the present disclosure.

Referring to FIG. 25, a payment system 2500 is capable of including an electronic device 2510 and/or a server. The electronic device 2510 is capable of including a payment application (wallet application) 2511 and/or payment middleware 2512. The server is capable of including a payment server 2520, a token server (token service provider (TSP)) 2530, and an issuer 2540. The payment server 2520 is capable of including a payment service server 2521 and/or a token requester server (token requester) 2522.

The payment application 2511 is capable of providing user interface (UI) or user experience (UX) related to payment. The payment-related UI may include wallet UI/UX. For example, the payment application 2511 may provide UI related to card registration, payment, transaction, and the like. The payment application 2511 may provide interface related to card registration using an OCR or external inputs (e.g., user inputs). The payment application 2511 may provide interface related to user authentication via identification & verification (ID&V).

The electronic device 2510 is capable of performing payment or transaction, using the payment application 2511. For example, the payment application 2511 may provide the user with a payment function by executing a preset application or via Simple Pay or Quick Pay omitting at least part of the functions of the application. The user of the electronic device 2510 runs the payment application 2511 to make a payment and is provided with information related to the payment function.

The payment middleware 2512 may include information related to card issuing companies. For example, the payment middleware 2512 may include a software development kit (SDK) of a card issuing company.

The payment server 2520 is capable of including a management server configured to perform electronic payment or mobile payment. The payment server 2520 is capable of receiving payment-related information from the electronic device 2510 and transmitting it to the outside or processing it.

The payment server 2520 is capable of transmitting information between the electronic device 2510 and the token server 2530, using the payment service server 2521 and/or the token requester server 2522. The payment service server 2521 is capable of including a payment server 2520 (e.g., Samsung payment server). The payment service server 2521 is capable of managing card information associated with a user's account or service accounts (e.g., Samsung account). The payment service server 2521 is capable of including an API server related to the payment application 2511. The payment service server 2521 is capable of providing an account managing module (e.g., account integration).

The token requester server 2522 is capable of providing interface for processing payment-related information. For example, the token requester server 2522 is capable of performing issuing, deleting or activating payment-related information (e.g., a token). The token requester server 2522 is capable of controlling information required for payment, while being functionally connected with the payment middleware 2512.

The payment application 2511 of the electronic device 2510 is functionally connected to the payment service server 2521 of the payment server 2520. For example, the payment application 2511 is capable of transmitting/receiving payment-related information to/from the payment server 2520. In an embodiment of the present disclosure, the payment middleware 2512 of the electronic device 2510 is functionally connected to the token requester server 2522 of the payment server 2520. For example, the payment middleware 2512 is capable of transmitting/receiving payment-related information to/from the token requester server 2522.

The token server 2530 is capable of issuing or managing payment-related information (e.g., token). For example, the token server 2530 is capable of controlling a life cycle of token, including creating, modifying, or deleting. The token server 2530 is capable of including a token managing server. In this case, the token server 2530 is capable of performing token-provisioning, authentication via ID&V, replenishment, management of life cycle, and integration of banking servers.

The payment server 2520 and/or the token server 2530 may be located in the same area or a similar area or in separated individual areas. For example, the payment server 2520 may be included in a first server and the token server 2530 may be included in a second server. Alternatively, the payment server 2520 and/or the token server 2530 may be implemented within one server (e.g., a first server or a second server), but distinguished from each other therein.

The issuer (banking sever) 2540 is capable of issuing cards. For example, the issuer 2540 is capable of including a card issuing server. The issuer 2540 is capable of creating payment-related information to be provided to users. The payment-related information created by the issuer 2540 may be stored in the electronic device 2510 by using the payment application 2511. The issuer 2540 is functionally connected to the token server 2530 and transmits/receives payment-related information thereto/therefrom.

The electronic device 2510 may also transmit/receive, to/from the payment server 2520, payment-related data, or track information (Track 1, Track 2, and Track 3), as binary values.

Figure 26:
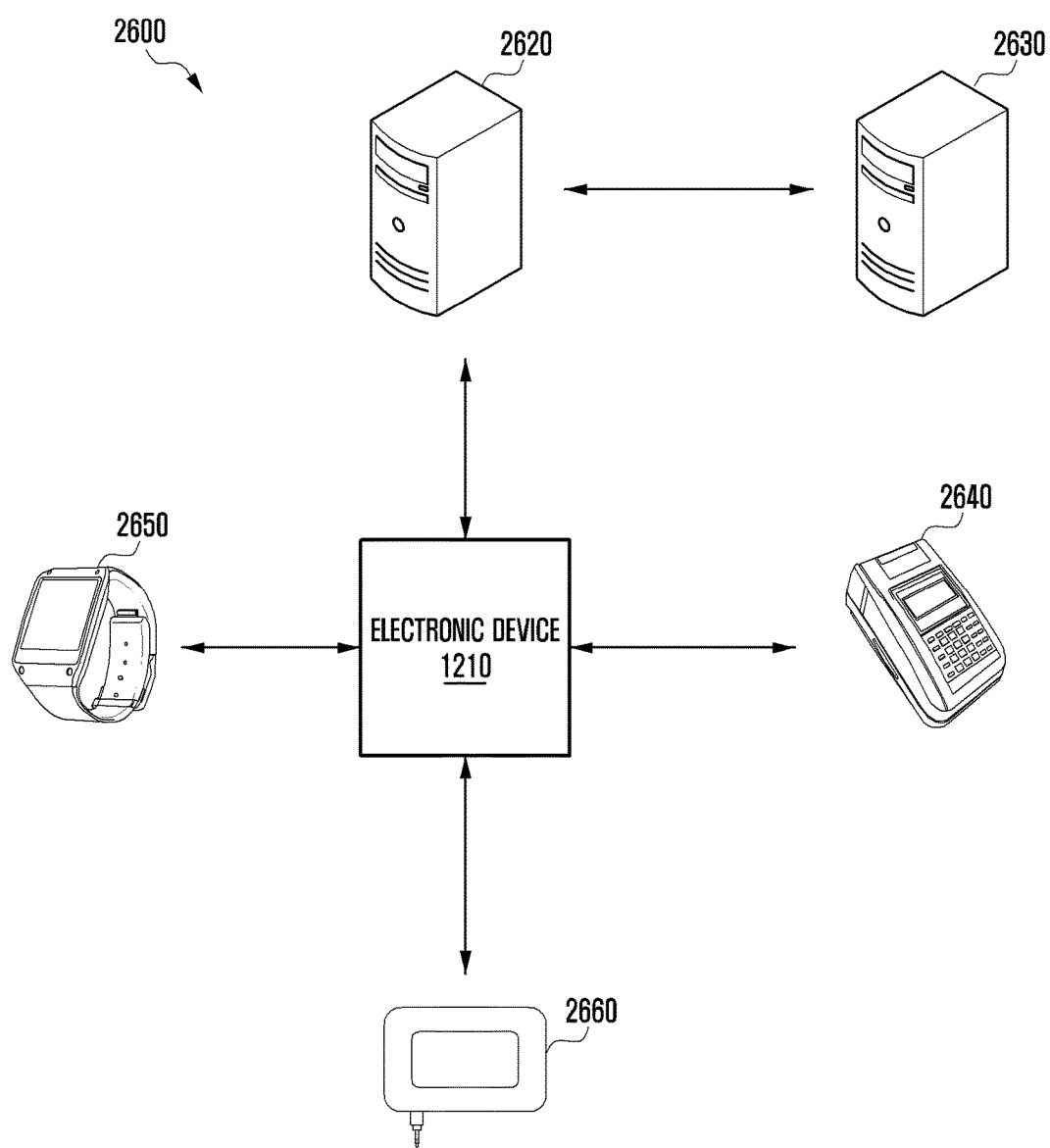
FIG. 26 is a block diagram illustrating a payment system, according to an embodiment of the present disclosure.

FIG. 26 is a diagram illustrating a network with a payment system, according to an embodiment of the present disclosure.

Referring to FIG. 26, a payment system 2600 is capable of including an electronic device 2610 (e.g., the electronic device 11 shown in FIG. 1A), a payment service server 2620, a TSP 2630 and a POS terminal 2640. The payment system 2600 may further include one or more electronic devices, e.g., electronic devices 2650, 2660, and the like. For example, the electronic device 2650 may be a wearable device (e.g., a smart watch) functionally connected (e.g., via communication) to the electronic device 2610. The electronic device 2660 may be an accessory (e.g., loop pay).

The electronic device 2610 is capable of performing a payment function. The electronic device 2610 is capable of registering a payment card therein or in the payment service server 2620 (e.g., a first external device). The payment service server 2620 is capable of managing information regarding a number of cards, e.g., the card registered by the electronic device 2610, another card registered by another electronic device 2650 of the user of the electronic device 2610, cards registered by other users' electronic devices, and the like. The payment service server 2620 is capable of obtaining a token corresponding to the registered card information from the TSP 2630 (e.g., a second external device), and transmitting it to the electronic device 2610.

The TSP 2630 is capable of issuing a token used in the payment process. A token refers to a value substituting a primary account number (PAN) as information regarding a card. A token may be created by using a bank identification number (BIN), and the like. The created token may be encoded by the TSP 2630. Alternatively, the created token may be transferred, without being encoded, to the payment service server 2620, and then encoded by the payment service server 2620. The encoded token is transmitted to the electronic device 2610 via the payment service server 2620. The electronic device 2610 decodes the encoded token. In an embodiment of the present disclosure, the token is created and encoded in the TSP 2630 and the processed token is transmitted to the electronic device 2610, not through the payment service server 2620. The payment service server 2620 may be equipped with a token creating function. In this case, the payment system 2600 may be implemented without the TSP 2630.

In a state where the electronic device 2610 is functionally connected to other electronic devices 2650 and 2660 via short-range wireless communication (e.g., BT or Wi-Fi), the electronic device 2610 is capable of making a payment using at least one of the other electronic devices 2650 and 2660. An example of the other electronic device 2650 (e.g., a third external device) is a wearable device (e.g., a smart watch). In this case, the electronic device 2610 is capable of making a payment, cooperating with the wearable device. For example, the electronic device 2610 may transmit a card image to the smart watch. The smart watch may transmit a payment command signal in response to the transmission of a card image to the electronic device 2610. The electronic device 2610 receives the payment command signal and emits an MST signal. An example of the other electronic device 2660 (e.g., a fourth external device) is an accessory (e.g., LoopPay™ fob). In this case, the electronic device 2610 is functionally connected to the accessory via the input/output interface (e.g., earphones).

Figure 27:
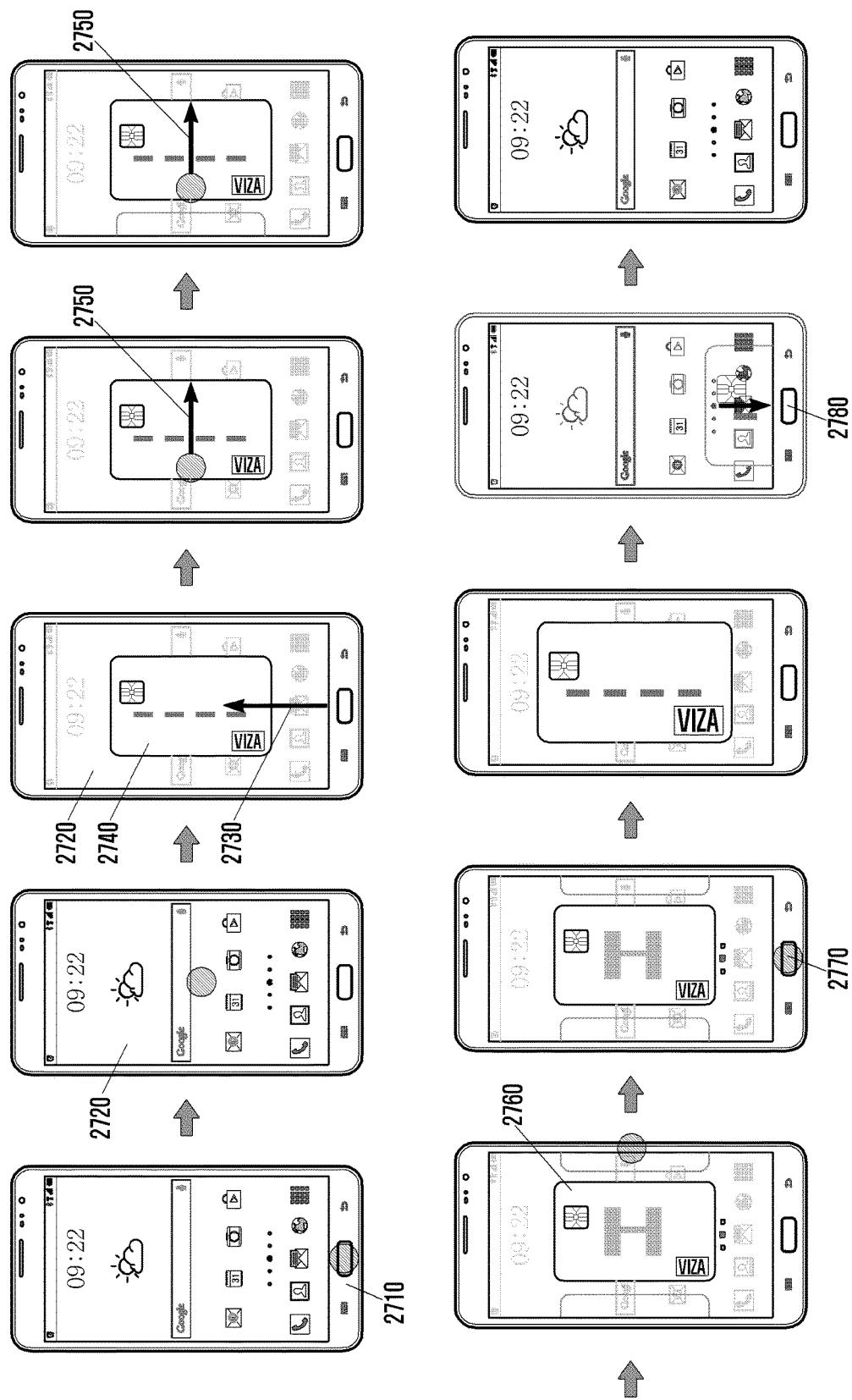
FIG. 27 is a diagram illustrating a user interface for payment in an electronic device, according to an embodiment of the present disclosure.

FIG. 27 is a diagram illustrating a method of interacting with a payment UI of an electronic device, according to an embodiment of the present disclosure.

Referring to FIG. 27, an electronic device 2710 (e.g., the electronic device 11 shown in FIG. 1A) receives user inputs and runs a payment application. For example, the electronic device 2710 may run a payment application (e.g., Samsung Pay) in response to a user input 2730 (e.g., a swipe on the bezel area 2610 toward a display 2720). Alternatively, the electronic device 2710 may show, on the display 2720, a card image 2740 corresponding to at least one of the cards registered therein, in response to a user input 2730.

The electronic device 2710 is capable of selecting one of a number of registered cards as a payment card to make a payment, in response to a user input. For example, the electronic device 2710 selects a card to make a payment in response to a user input 2750 (e.g., a side scrolling), and shows a corresponding card image 2760. The electronic device 2710 may request the user to make an authentication in order to make a payment using the selected card. The authentication may be performed using the user's biometric information. For example, the electronic device 2710 scans a user's fingerprint 2770 via a fingerprint detecting module in order to make a payment. When the user has been authenticated by the fingerprint detecting module, the electronic device 2710 may perform emission in a simple transmission sequence (e.g., transmitting an MST signal containing Track 2 information a certain number of times).

The user authentication may be re-performed in order to re-perform the payment process. For example, when the user authentication is terminated which is because a certain period of time has elapsed, the electronic device 2710 may alter the current method, transmitting the MST signal again. For example, the electronic device 2710 may alter an emission cycle or a pulse timing. Alternatively, the electronic device 2710 may alter information contained in an MST signal to information according to a complex transmission sequence. In an embodiment of the present disclosure, in order to re-perform a payment operation, the user may separate the electronic device 2710 from the terminal and then tag it thereto again. The user's tagging operation may be detected by various types of sensors installed on the electronic device 2710 (e.g., acceleration sensor 103, gyro sensor 105, proximity sensor, heart rate monitor (HRM) sensor, and the like). In response to the tagging operation, the electronic device 2710 alters an MST signal in at least one of the following an emission cycle, pulse timing and sequence, and emits the altered MST signal. Each time that the user performs a tagging operation, the electronic device 2710 alters the MST signal in at least one of the following, an emission cycle, pulse timing and sequence, and emits the altered MST signal.

When the user authentication has been completed, the electronic device 2710 is capable of simultaneously or sequentially transmitting NFC and MST signals. For example, a processor (e.g., the processor 150 of FIG. 1B) of the electronic device controls an NFC control module (e.g., 140 of FIG. 1B) and an MST control module (e.g., 130 of FIG. 1B) to activate an NFC module (e.g., 120 of FIG. 1B) (e.g., NFC module is set in polling mode) in order to detect a card reading apparatus, and simultaneously creates an MST signal via the MST module (e.g., 110 of FIG. 1B). The processor determines whether it receives a signal (e.g., a ping) from the card reading apparatus via the NFC module. When the processor ascertains that it receives the signal, it stops the operation of the MST module. The processor may provide information regarding a card to make a payment to the card reading apparatus (e.g., NFC reader) via the NFC module. On the other hand, when the processor ascertains that it has not received the signal, it controls the MST control module to create an MST signal containing payment information.

When payment has been completed, the user presses the button (e.g., a home button 2780) of the electronic device, thereby ending the payment application. Alternatively, when payment has been completed, the electronic device 2710 (UE) detects the payment completion and thus stops creating an MST signal. For example, when a card issuing company has ascertained that payment has been made, it informs the UE of the payment result via a network, so that the UE stops creating an MST signal. The result of payment may be transmitted to the UE, by a value added network (VAN), a POS terminal, and the like, in addition to a card issuing company.

Figure 28:
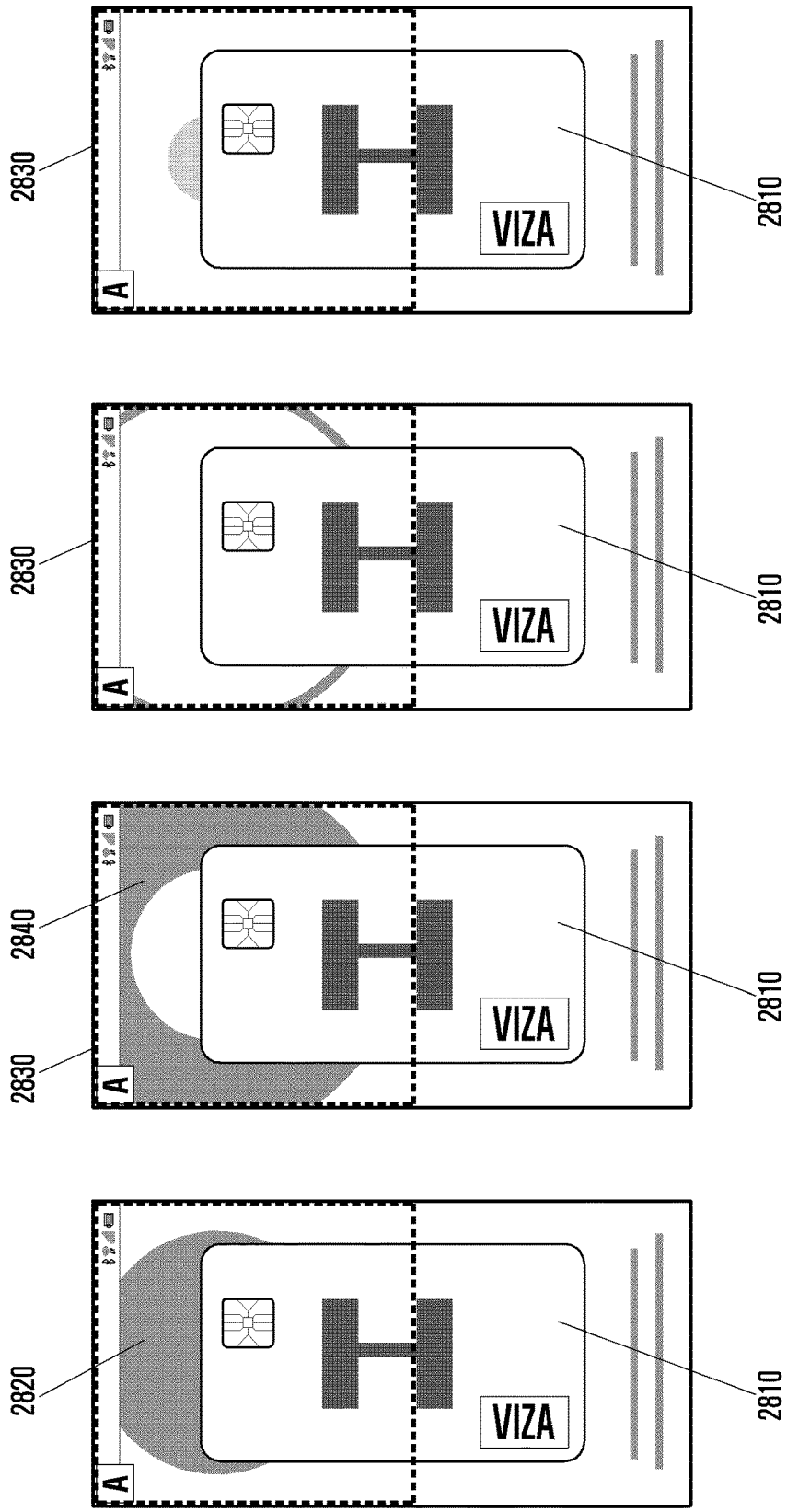
FIG. 28 is a diagram illustrating a user interface for payment in an electronic device, according to an embodiment of the present disclosure.

FIG. 28 is a diagram illustrating a method of interacting with a payment UI of an electronic device, according to an embodiment of the present disclosure.

Referring to FIG. 28, while payment is in progress after the user authentication is completed, the electronic device may display a state that payment is possible (or a state that payment information is in transmission to an external device from the electronic device). For example, an electronic device displays a part 2820 of a translucent circle behind a card image 2810 on the screen and shows an effect 2840 as the circle increases in size in a box 2830. The box 2830 may correspond to the location of a loop antenna emitting an MST signal. The use may recognize the location of the antenna, referring to the box 2830. The user may recognize that payment is ongoing, referring to the effect 2840 as the circle increases in size within the box 2830.

Figure 29:
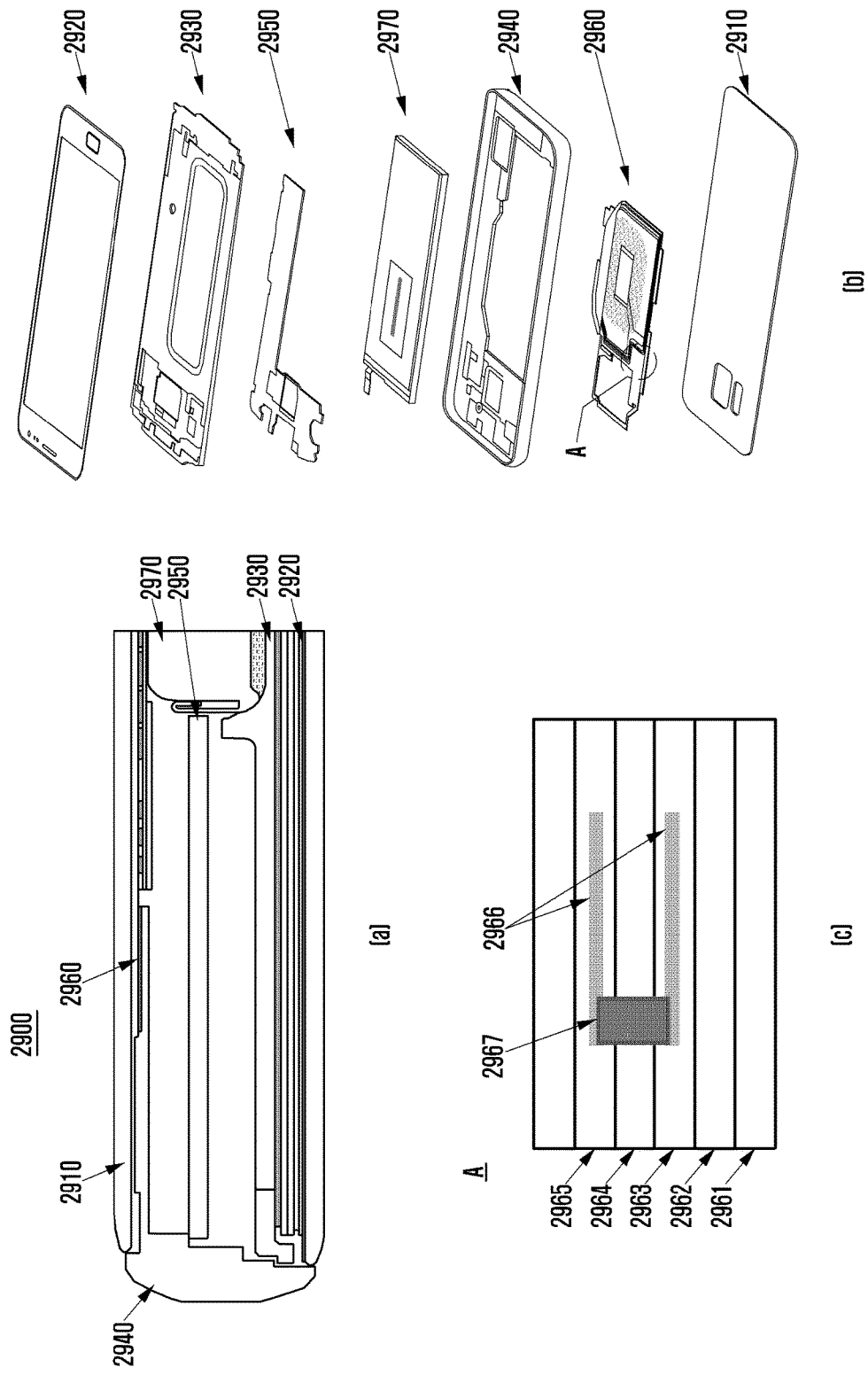
FIG. 29 is a diagram illustrating an electronic device having an antenna and an antenna structure thereof for magnetic payment, according to an embodiment of the present disclosure.

FIG. 29 is a diagram illustrating configurations of an electronic device with an antenna for magnetic payment and the antenna, according to an embodiment of the present disclosure.

Referring to (a) and (b) of FIG. 29, an electronic device 2900 includes an upper housing 2910, a lower housing 2920, and a side housing 2940, located to disclose at least part of the appearance of the electronic device 2900, and an internal support 2930 located inside the handheld electronic device. The side housing 2940 is made of a single material or a mixture of heterogeneous materials. The side housing 2940 may be arranged to support at least part of the upper housing 2910 and the lower housing 2920. The internal support 2930 is made of a single material or a mixture of heterogeneous materials. The internal support 2930 may be arranged to support at least part of the lower housing 2920. At least part of the upper housing 2910 and the lower housing 2920 may include the display area. For example, a display module (e.g., the display module 16 of FIG. 1A) may be disclosed through a part of the upper housing 2910. The upper housing 2910, side housing 2940 and the support 2930 form an enclosure. The enclosure is capable of including a PCB 2950 and a battery 2970.

The electronic device 2900 includes an antenna (e.g., a coil antenna) 2960 for magnetic payment. The antenna 2960 covers at least part of the side housing 2940 and the battery 2970. The antenna 2960 is connected to the PCB 2950 through an opening of the side housing 2940 to make a communication of data for payment with a communication module (e.g., MST control module 130 shown in FIG. 1B) or a processor (e.g., processor 150 shown in FIG. 1B) located on the PCB 2950. The side housings 2940 and the upper housing 2910 may be formed in such a way that part of the area to which the antenna 2970 is attached differs in height or thickness from the surrounding area.

The side housing 2940 may be formed in such a way that an area where a coil (e.g., a metal pattern) of the antenna 2960 is located is made of a material that differs from that of another area where the coil is not located. For example, the area where the coil of the antenna 2960 is located may include a non-conductive material (e.g., a plastic). The area where the coil of the antenna 2960 is not located may include a conductive material (e.g., a metal).

Referring to (c) of FIG. 29, the antenna 2960 is formed using an FPCB including multi-layers 2963-2965. At least one of the multi-layers 2963-2965 includes a chip via 2967 and wires 2966 forming an antenna coil. The antenna 2960 may be configured with a single coil. The antenna 2960 may also be configured with two or more coils that differ from each other. The antenna 2960 includes a layer 2961 for shielding noise. The shield layer 2961 may be formed with a material, such as graphite, and the like. The antenna 2960 further includes a magnetic body layer 2962 for increasing the intensity of magnetic field signals produced by the coil. The magnetic body layer 2962 may be formed with a permanent magnet, ferromagnetic material, and the like.

A fingerprint sensor for authenticating a payment card or the user may be included in a home key on the front side, a key on the side, or a key on the back of the electronic device. Alternatively, the fingerprint sensor may be included in at least part of the display panel.

Figure 30A:
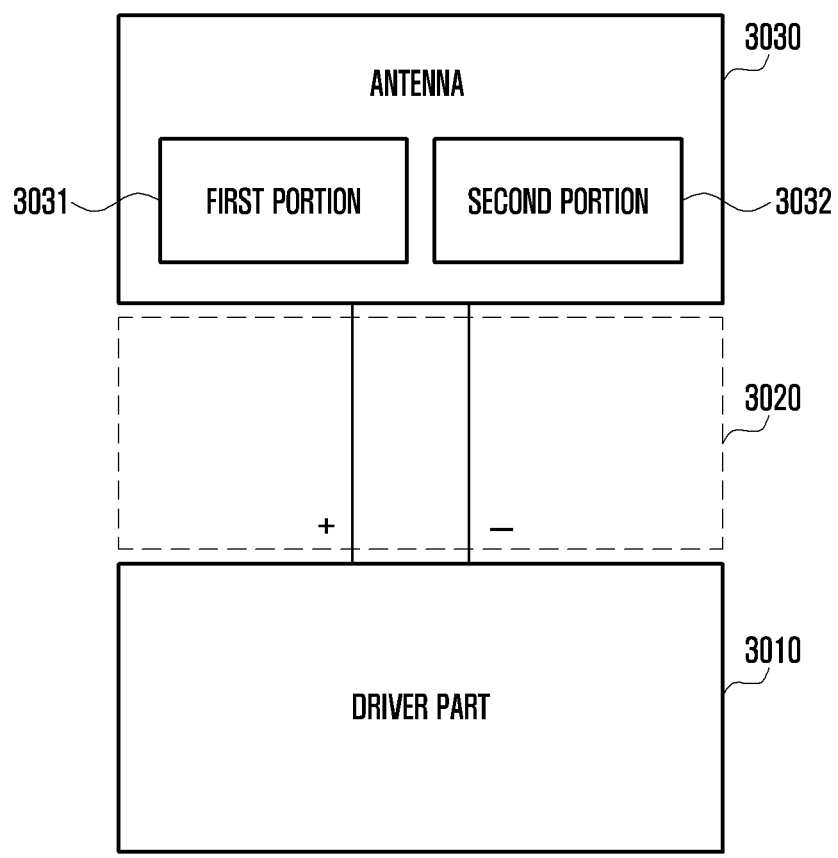
FIGS. 30A and 30B are diagrams illustrating a configuration of the MST module with one antenna, according to an embodiment of the present disclosure.
Figure 30B:
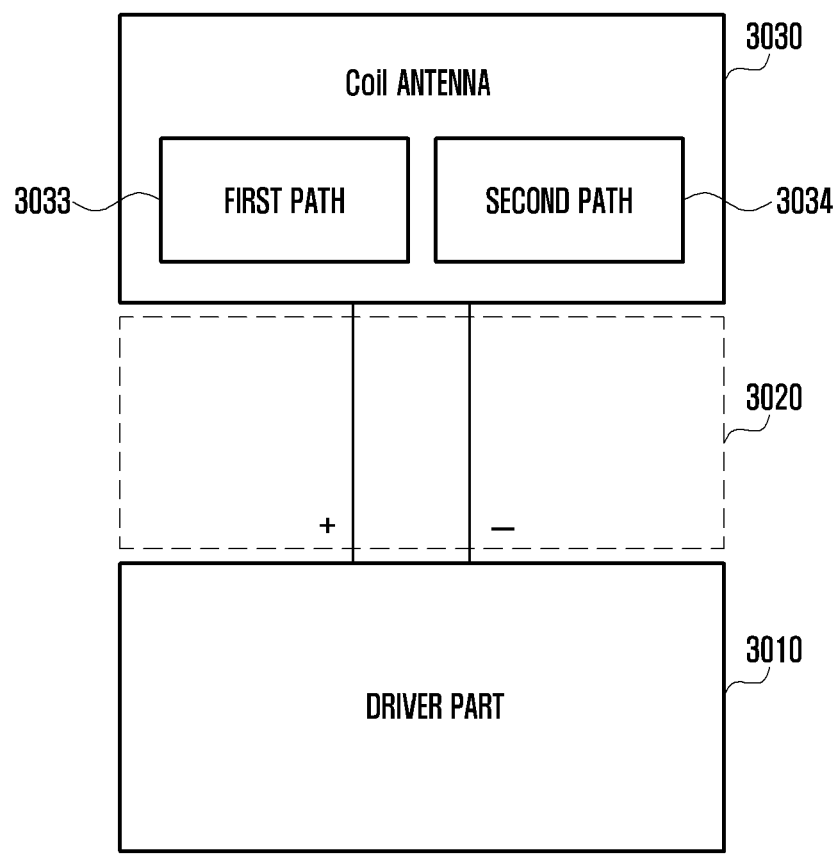

FIGS. 30A and 30B are diagrams illustrating a configuration of the MST module with one antenna, according to an embodiment of the present disclosure.

Referring to FIGS. 30A and 30B, the MST module (e.g., the MST module 110) includes a driver part 3010, a connection part 3020, and an antenna 3030. The connection part 3020 may draw a current from the driver part 3010 and feed the current to the antenna 3030. The antenna 3030 may generate a magnetic field according to the fed current and emit a magnetic field signal with a given frequency (MST signal) to the outside. For example, the antenna 3030 may receive sequences as shown in FIG. 7 from the driver part 3010 via the connection part 3020, convert the sequences into RF signals, and transmit the RF signals in order.

The antenna 3030 may be designed to generate a magnetic field whose strength varies by part. For example, as shown in FIG. 30A, when a current is fed to the antenna 3030, a first portion 3031 and a second portion 3032 may generate magnetic fields with different strengths. The first portion 3031 and the second portion 3032 may be composed of coil antennas of the same type. For example, the first portion 3031 and the second portion 3032 may be composed of loop antennas of flat type (e.g., the antenna 1020) or loop antennas of solenoid type (e.g., the antenna 1120). The first portion 3031 and the second portion 3032 may be composed of coil antennas of different types. For example, one of the first portion 3031 and the second portion 3032 may be composed of a loop antenna of flat type 1020, and the other may be composed of a loop antenna of solenoid type 1120.

The antenna 3030 may be designed to generate different current paths by part. For example, as shown in FIG. 30B, when a current is fed to the antenna 3030, the antenna 3030 may generate a first path 3033 in a first part and a second path 3036 in a second part. Here, the first part and the second part may be composed of coil antennas of the same type. For example, the first part and the second part may be composed of loop antennas of flat type 1020 or loop antennas of solenoid type 1120. The first part and the second part may be composed of coil antennas of different types. For example, one of the first part and the second part may be composed of a loop antenna of flat type, and the other may be composed of a loop antenna of solenoid type.

Figure 31A:
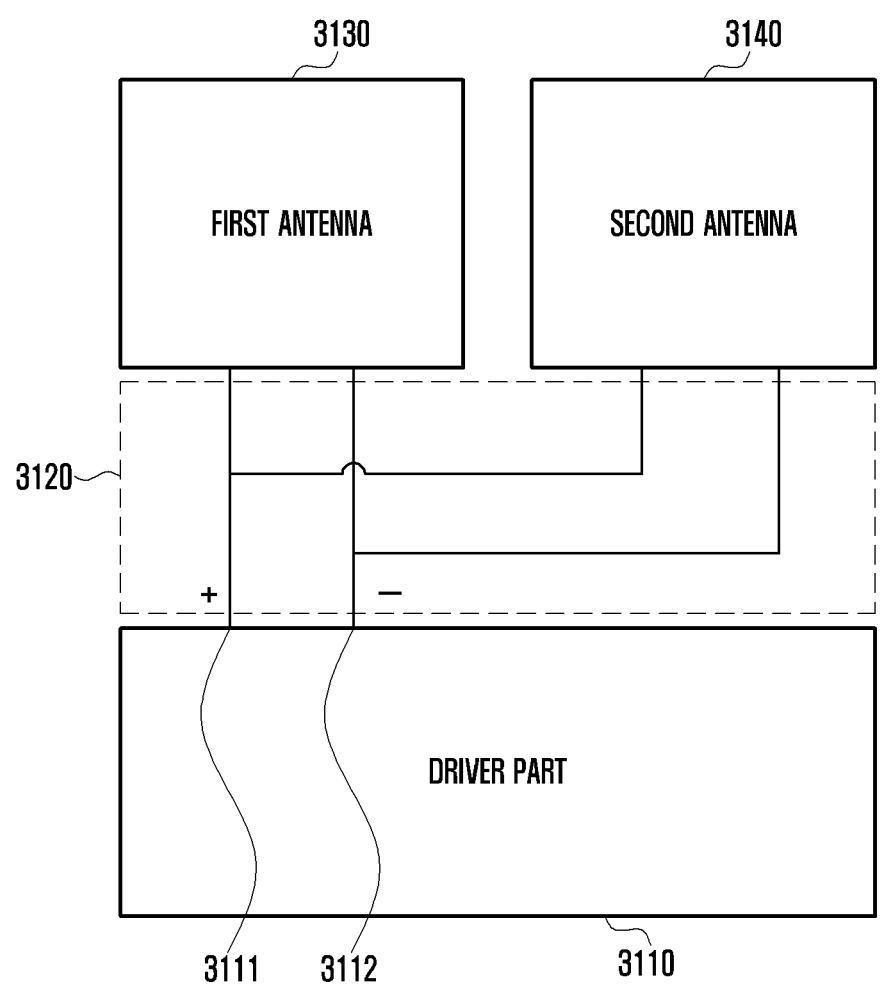
FIGS. 31A and 31B are diagrams illustrating a configuration of the MST module with two loop antennas, according to an embodiment of the present disclosure.
Figure 31B:
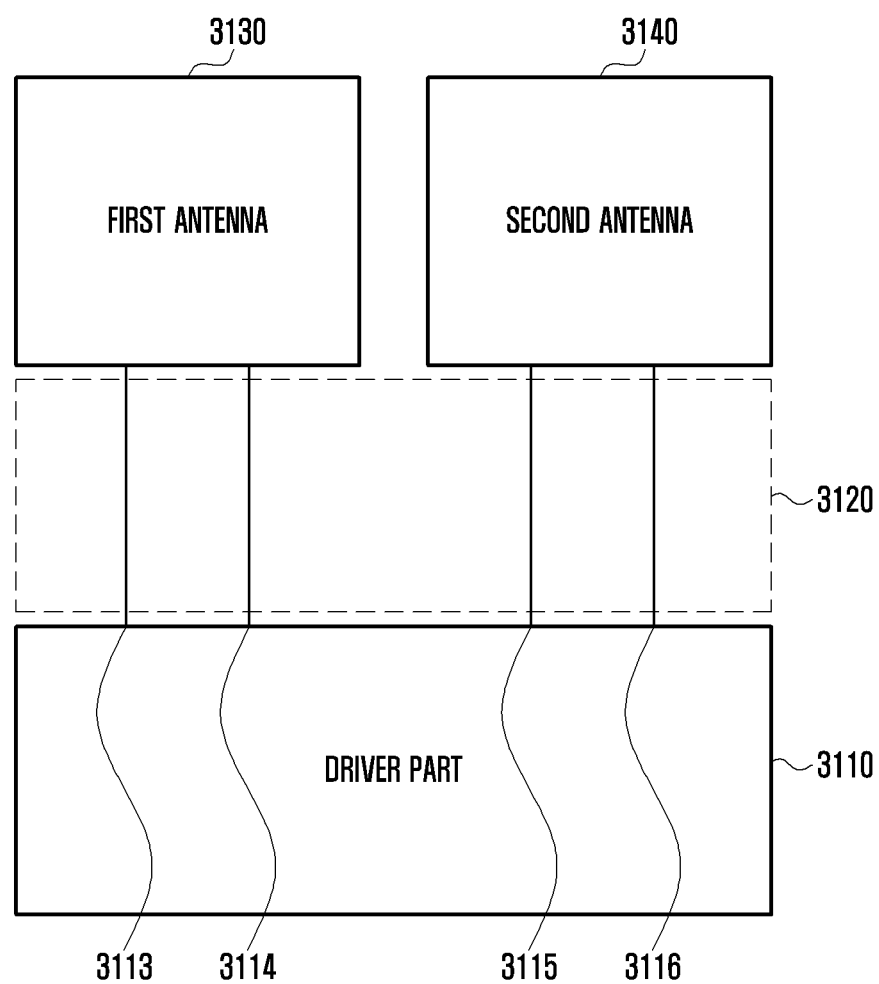

FIGS. 31A and 31B are diagrams illustrating a configuration of the MST module with two loop antennas, according to an embodiment of the present disclosure.

Referring to FIGS. 31A and 31B, the MST module (e.g. the MST module 110) includes a driver part 3110, a connection part 3120, a first antenna 3130, and a second antenna 3140. The first antenna 3130 and the second antenna 3140 may be of different types. For example, one of the two antennas may be an antenna of flat type (e.g., the first loop antenna 1020), and the other may be an antenna of solenoid type (e.g., the second loop antenna 1120). When the MST module includes a solenoid-type antenna, the MST module may be protected by a housing having at least a portion made of a nonconductive material (e.g., the housing with the cover 1113).

In an embodiment of the present disclosure, the first antenna 3130 and the second antenna 3140 may transmit the same MST signal. Referring to FIG. 31A, the driving part 3110 forms a first electrode 3111 and a second electrode 3112. The linking part 3120 electrically connects the first electrode 3111 to the first antenna 3130 and the second antenna 3140, and the second electrode 3112 to the first antenna 3130 and the second antenna 3140. The first antenna 3130 and the second antenna 3140 receive electric current from the first electrode 3111 or the second electrode 3112 via the linking part 3120, produce magnetic fields by the received current, and emit magnetic field signals (MST signals) of particular frequencies, respectively. For example, the first antenna 3130 and the second antenna 3140 receive sequences shown in FIG. 7 from the driving part 3110 via the linking part 3120, coverts the sequences into RF signals, and sequentially emits the RF signals to the outside The first antenna 3130 and the second antenna 3140 may transmit different MST signals, respectively. Referring to FIG. 31B, the driving part 3110 forms a pair of electrodes, a third electrode 3113 and a fourth electrode 3114, and another pair of electrodes, a fifth electrode 3115 and a sixth electrode 3116. The linking part 3120 electrically connects the third electrode 3113 and fourth electrode 3114 to the first antenna 3130, and the fifth electrode 3115 and sixth electrode 3115 to the second antenna 3140. The first antenna 3130 receives current from the third electrode 3113 or the fourth electrode 3114 via the linking part 3120, produces a magnetic field by the received current, and emits an RF signal of a particular frequency to the outside. Similarly, the second antenna 3140 receives current from the fifth electrode 3115 or the sixth electrode 3115 via the linking part 3120, produces a magnetic field by the received current, and emits an MST signal of another frequency to the outside. For example, the sequences shown in FIG. 7 may be emitted in the following order the first simple transmission sequence 710 by the first antenna 3130, the first complex transmission sequence 720 by the second antenna 3140, the second simple transmission sequence 730 by the first antenna 3130, and the second complex transmission sequence 740 by the second antenna 3140. Alternatively, the sequences shown in FIG. 7 may be emitted in the following order: the first simple transmission sequence 710 and the second complex transmission sequence 720 sequentially by the first antenna 3130, and the second simple transmission sequence 730 and the second complex transmission sequence 740 sequentially by the second antenna 3140.

Figure 32:
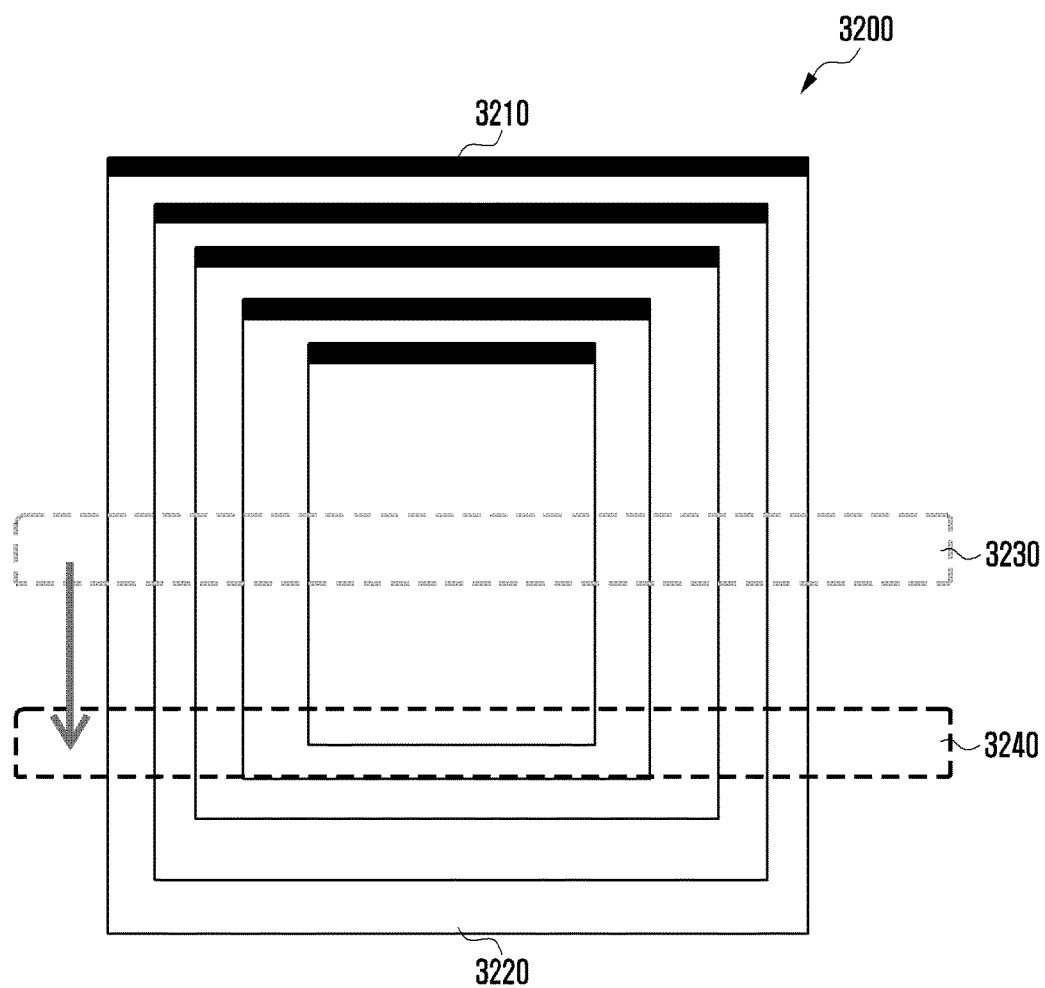
FIG. 32 is a diagram illustrating a schematic view of a loop antenna, according to an embodiment of the present disclosure.

FIG. 32 is a diagram illustrating a loop antenna, according to an embodiment of the present disclosure.

Figure 42:
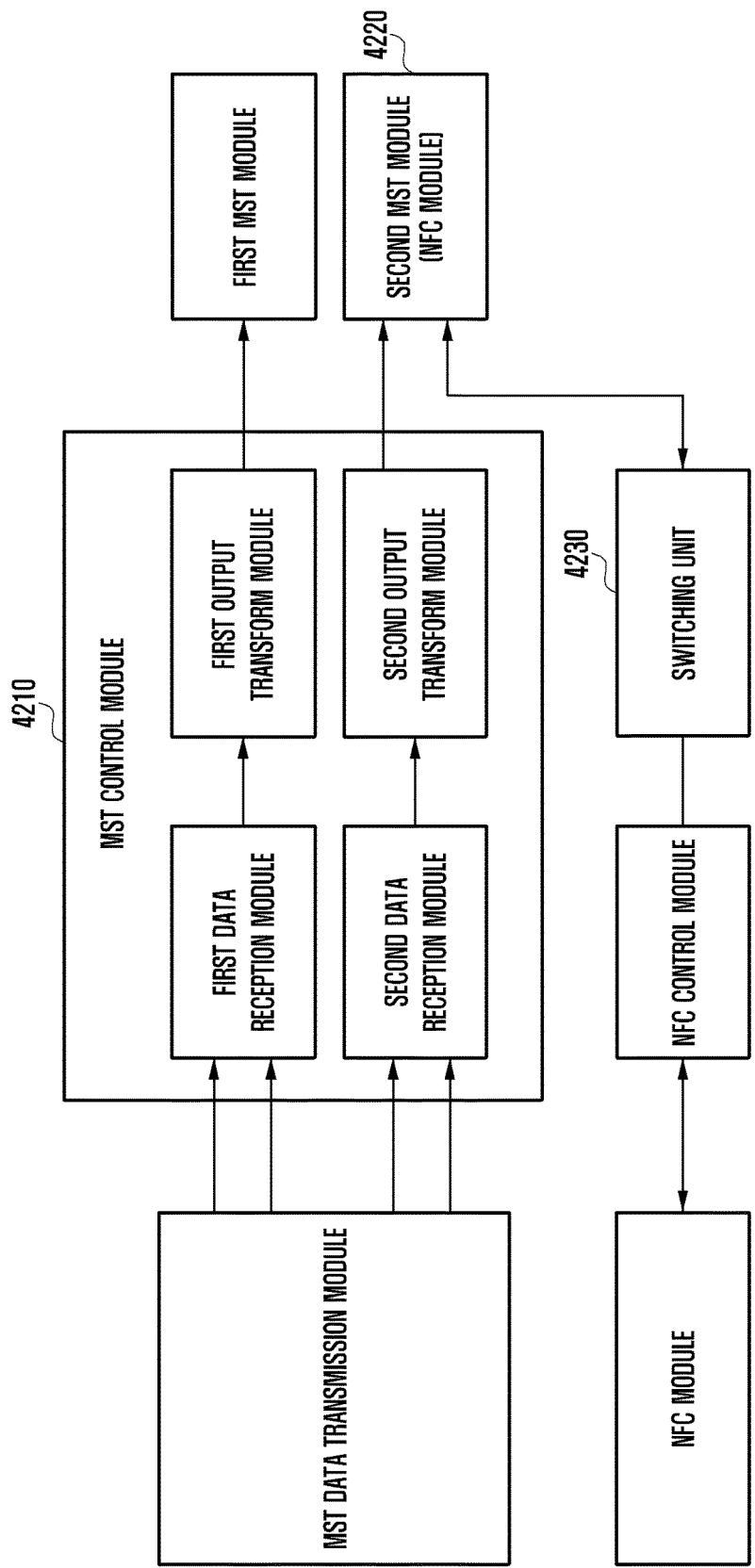

Referring to FIG. 32, a loop antenna 3200 may be designed to produce different intensities of magnetic fields from one part to another. This indicates that the null point of the loop antenna 3200 may be formed in different locations according to the parts in the electronic device. For example, as shown in FIG. 32, the antenna pattern (e.g., coil) of a first part 3210 is implemented to have a width greater than the antenna pattern of second part 3220. In this case, the first part 3210, through which current flows, has a smaller electrical resistance than the second part 3220. Therefore, the first part 3210 produces a higher intensity of magnetic field than the second part 3220 does. In this case, a null point of the loop antenna 3200 may be formed in a bottom portion 3240 of the electronic device, not in a center portion 3230. For example, when the width of the antenna pattern of the first part 3210 is identical in size to that of the antenna pattern of the second part 3220, the null point may be formed in the center portion 3230 of the electronic device. When the width of the antenna pattern of the first part 3210 is greater than that of the antenna pattern of the second part 3220, the null point may be formed in the bottom portion 3240 of the electronic device. For example, as shown in FIG. 42, while payment is in progress, the electronic device (e.g., the electronic device 100 as shown in FIG. 1B) displays an MST recognition range (e.g., an area between the center and the top of the electronic device, corresponding to the box 4230) on the screen, and this allows the user to easily recognize the MST recognition range and move the electronic device near the reader. Therefore, the loop antenna system makes the electronic device improve the MST recognition rate.

FIGS. 33A to 33G are diagrams illustrating structures of loop antennas, according to embodiments of the present disclosure.

Figure 33A:
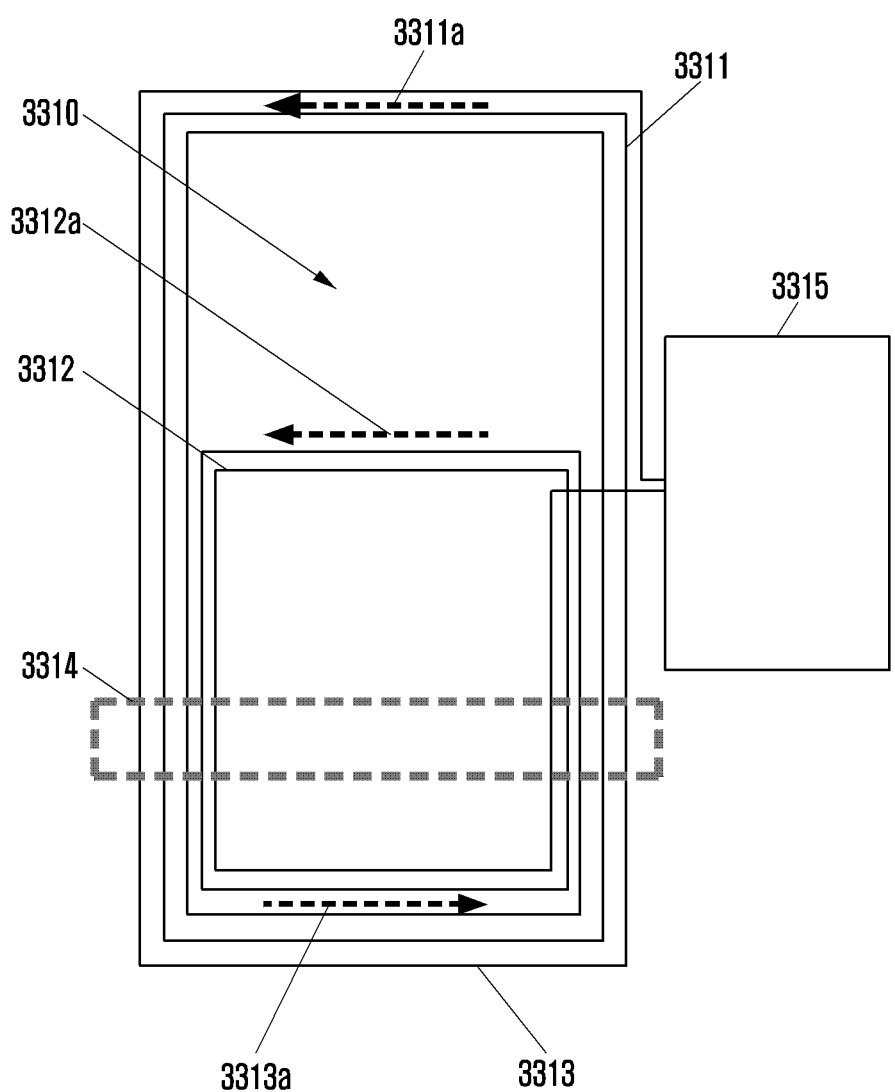
FIGS. 33A to 33G are diagrams illustrating schematic structures of a loop antenna, according to an embodiment of the present disclosure.

Referring to FIGS. 33A to 33G, as shown in FIG. 33A, a loop antenna 3310 is designed in such a way that a first path 3311 is formed in the top of the electronic device (e.g., smartphone), a second path 3312 is in the center, and the third path 3313 is in the bottom. In addition, the direction of a current 3311a flowing in the first path 3311 is identical to that of a current 3312a flowing in the second path 3312. In this case, the current direction 3311a of the first path 3311 is opposite the direction of a current 3313a flowing in the third path 3313. When the loop antenna 3310 produces a magnetic field by current from a communication module 3315 (e.g., the MST module 110 shown in FIG. 1B), the intensity of the magnetic field in the center and bottom is greater than in the bottom, and thus a null point 3314 is formed near the bottom of the electronic device.

Figure 33B:
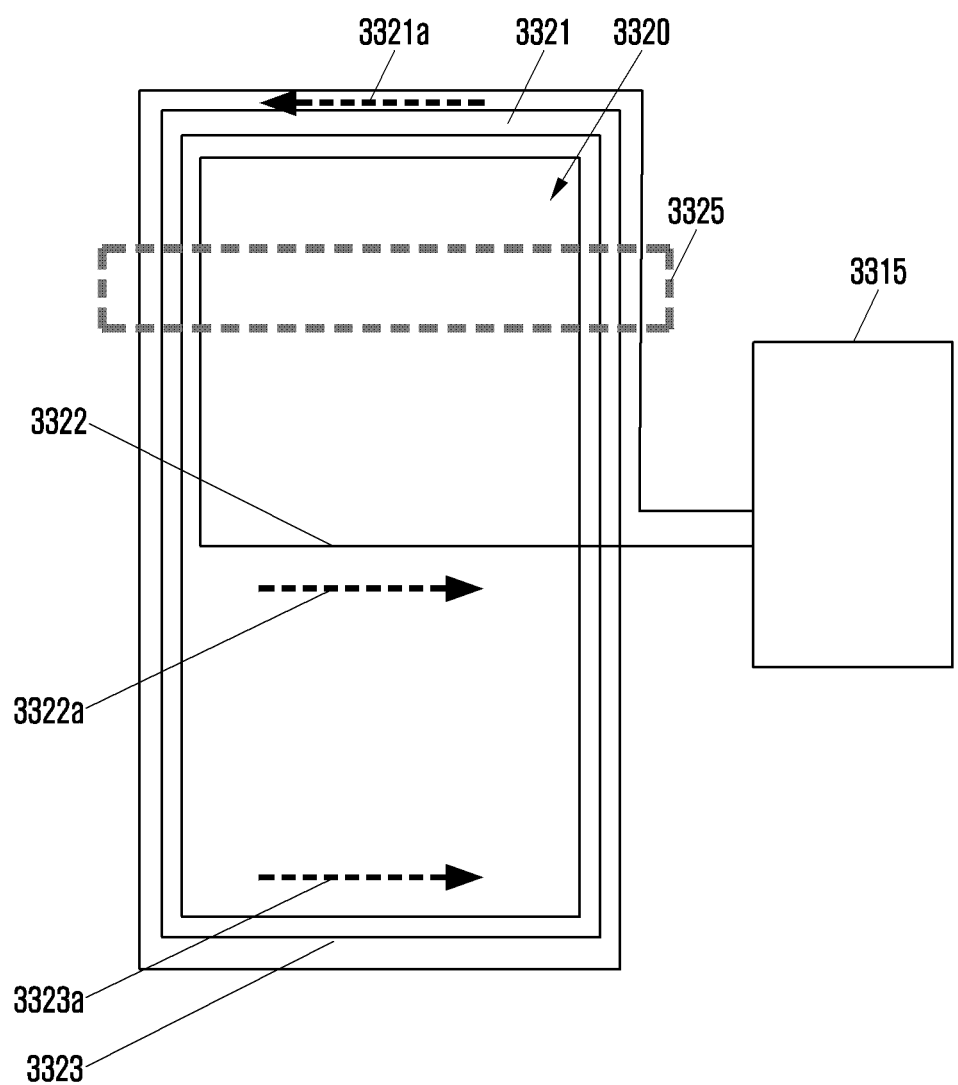

Referring to FIG. 33B, a loop antenna 3320 is designed in such a way that the direction of a current 3323a flowing in a third path 3323 is identical to that of a current 3322a flowing in a second path 3322. In this case, the current direction 3323a and the current direction 3322a are opposite to the direction of a current 3321a flowing a first path 3321. Therefore, a null point 3325 is formed near the top of the electronic device.

Figure 33C:
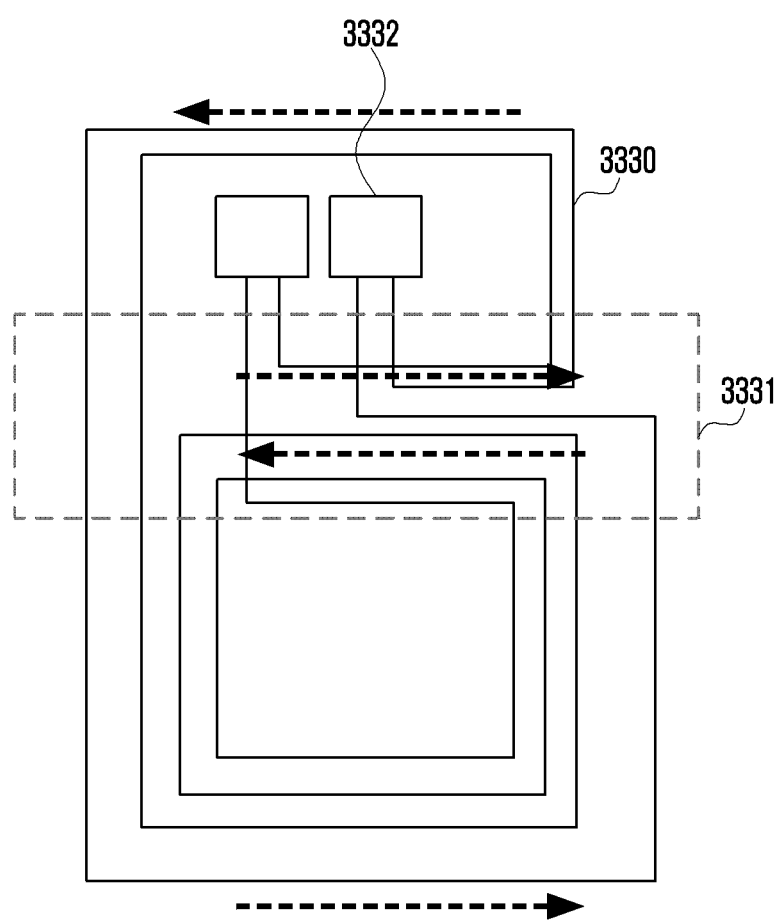

Referring to FIG. 33C, the paths of a loop antenna 3330 connected to a communication module 3332 (e.g., the MST module) are shaped as the letter 'B' (i.e., the flow of electric current flows in the paths like the letter 'B'), where currents flowing in the paths in a center portion 3331 are in the opposite directions to each other. Therefore, a center portion 3331 is a null point. The loop antenna 3330, shaped as the letter 'B,' results in an effect distributing the null point to both sides (the top and bottom), compared with the loop antenna 3200 shown in FIG. 32.

Figure 33D:
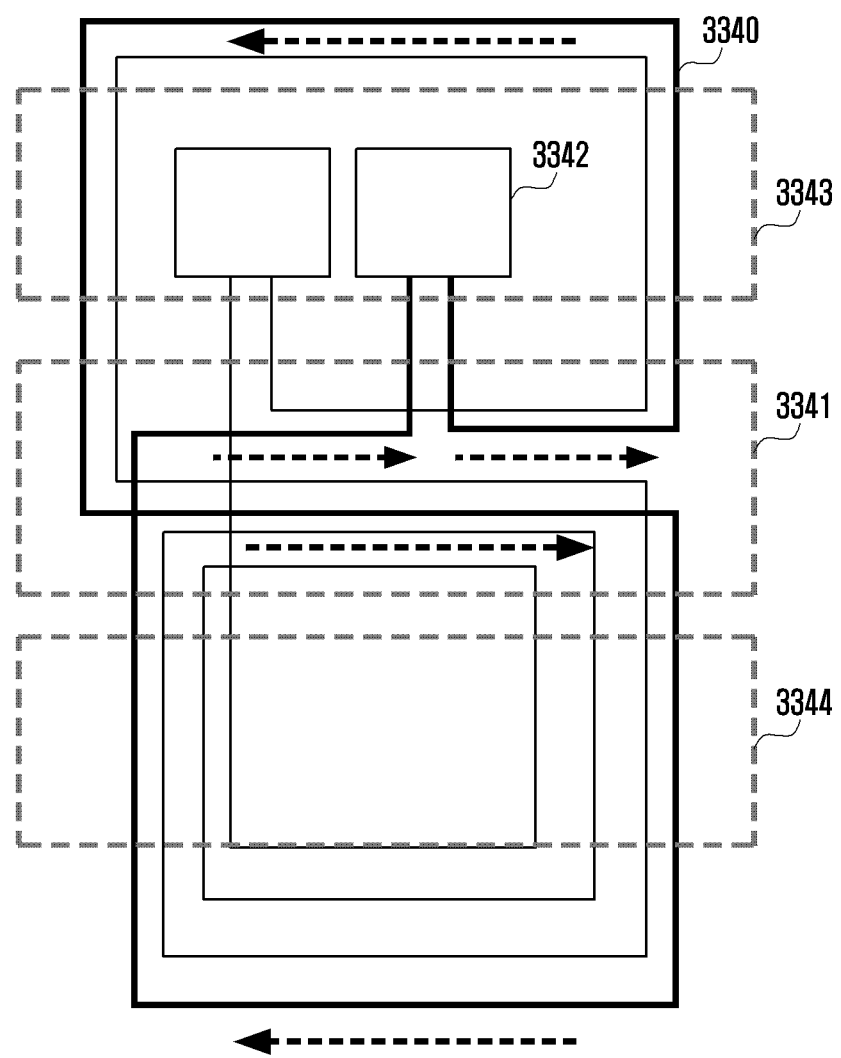

Referring to FIG. 33D, the paths of a loop antenna 3340 connected to a communication module 3342 (e.g., MST module) are shaped in a figure '8,' where currents flowing in the paths in a center portion 3341 are in the same direction. Therefore, the intensity of magnetic field is the largest in the center portion 3341. The null points are formed in a top portion 3343 and a bottom portion 3344.

Figure 33E:
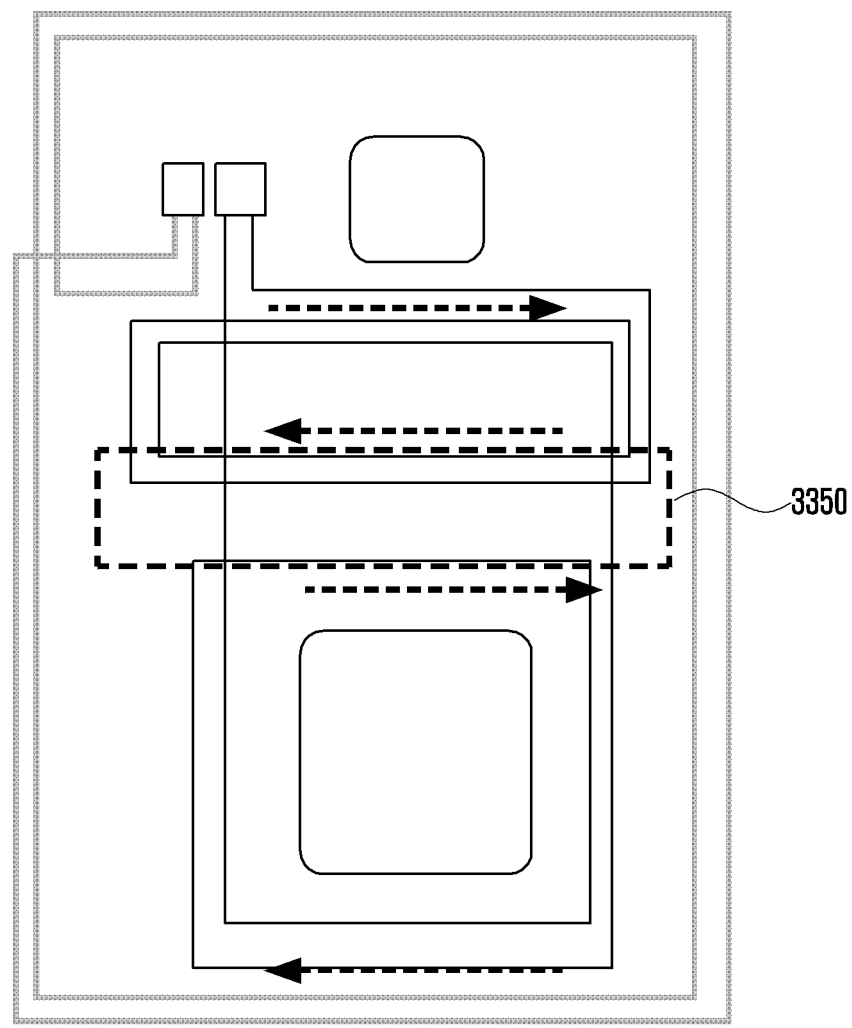
Figure 33F:
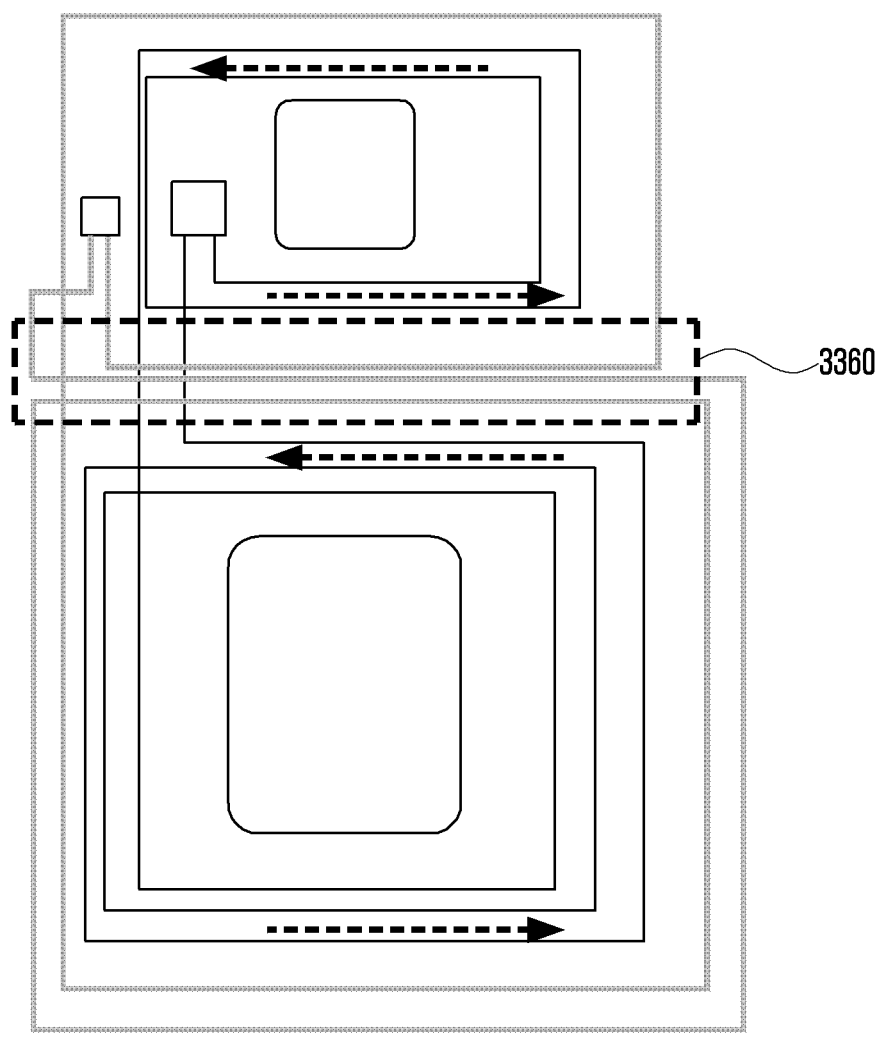
Figure 33G:
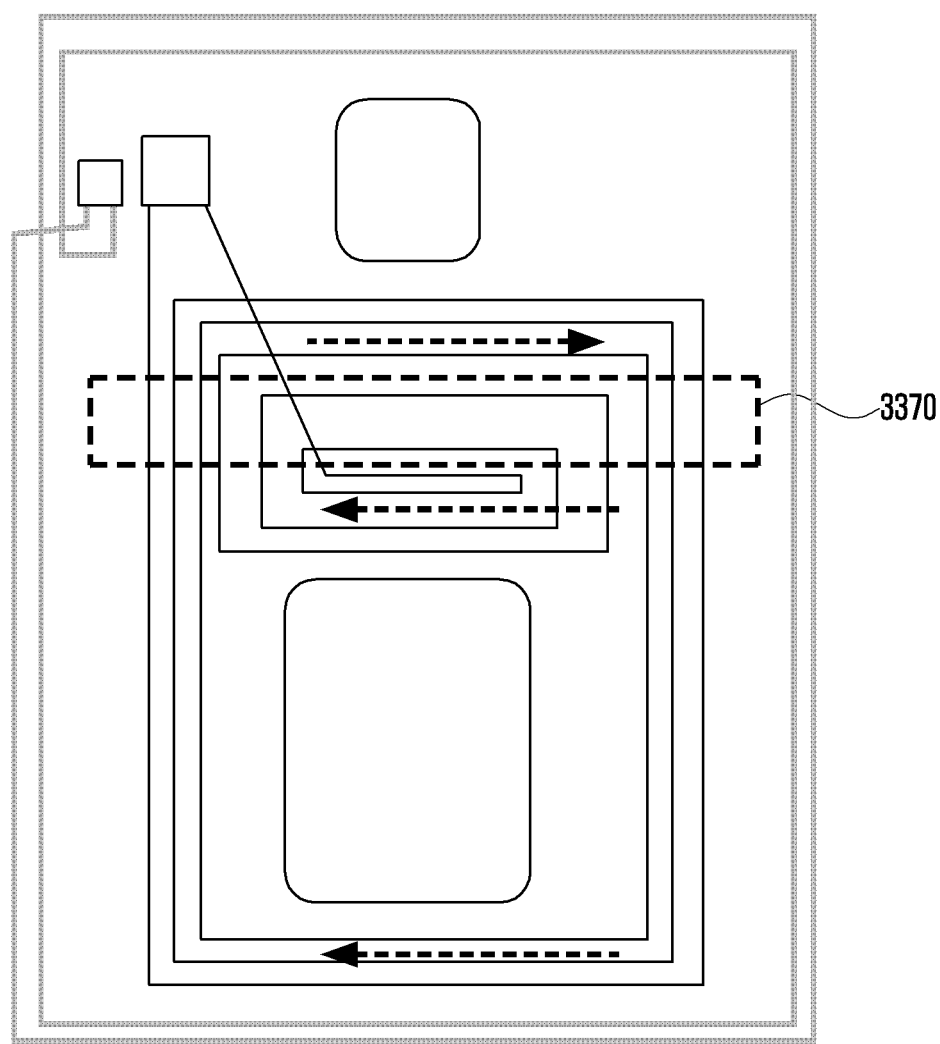

In addition, the loop antenna may be designed to have various shapes of paths, e.g., paths shaped as the letter 'B,' as shown in FIGS. 33E to 33G. In the drawings, the arrows represent the direction of current and portions 3350, 3360, and 3370, where the directions of current are opposite to each other, are null points. As described above referring to FIGS. 33A to 33G, the null points of the loop antennas vary according to the locations of paths (current paths) and the directions of current. Therefore, when an antenna is designed to increase an MST recognition rate, the locations of null points need to be considered.

Figure 34A:
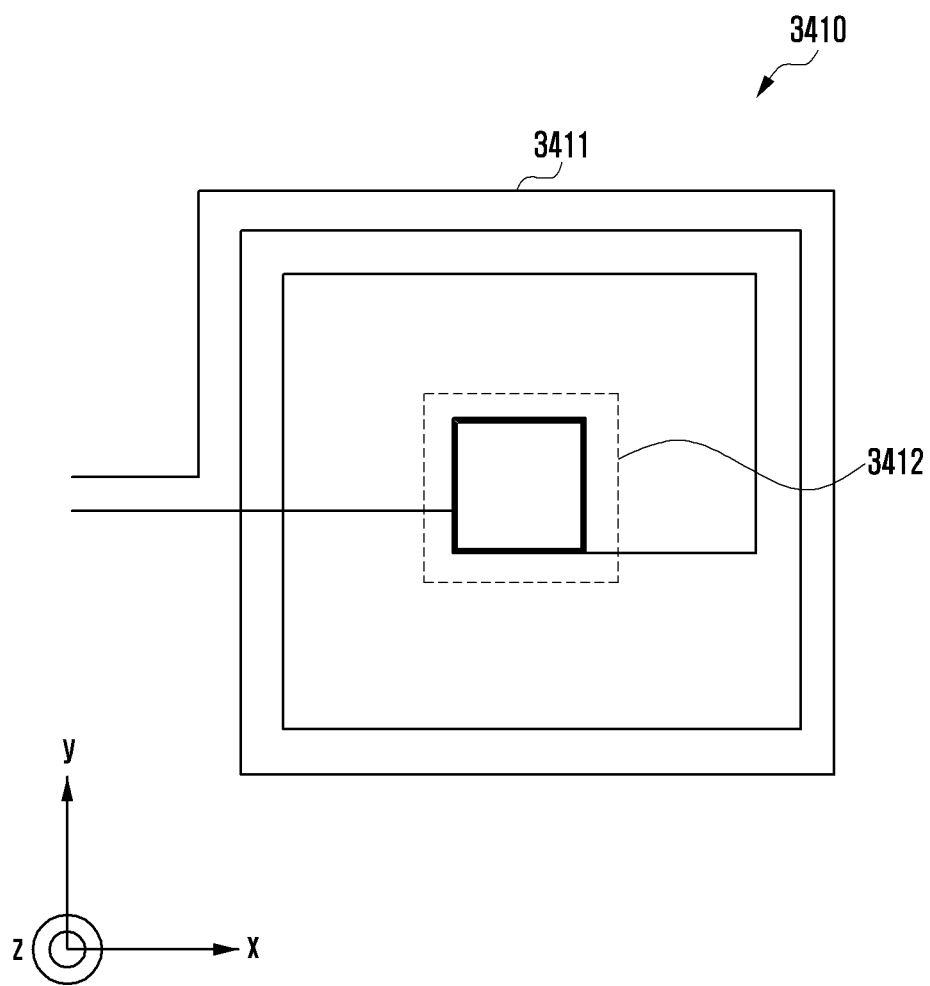
FIGS. 34A and 34B are diagrams illustrating schematic structures of a loop antenna, according to an embodiment of the present disclosure.
Figure 34B:
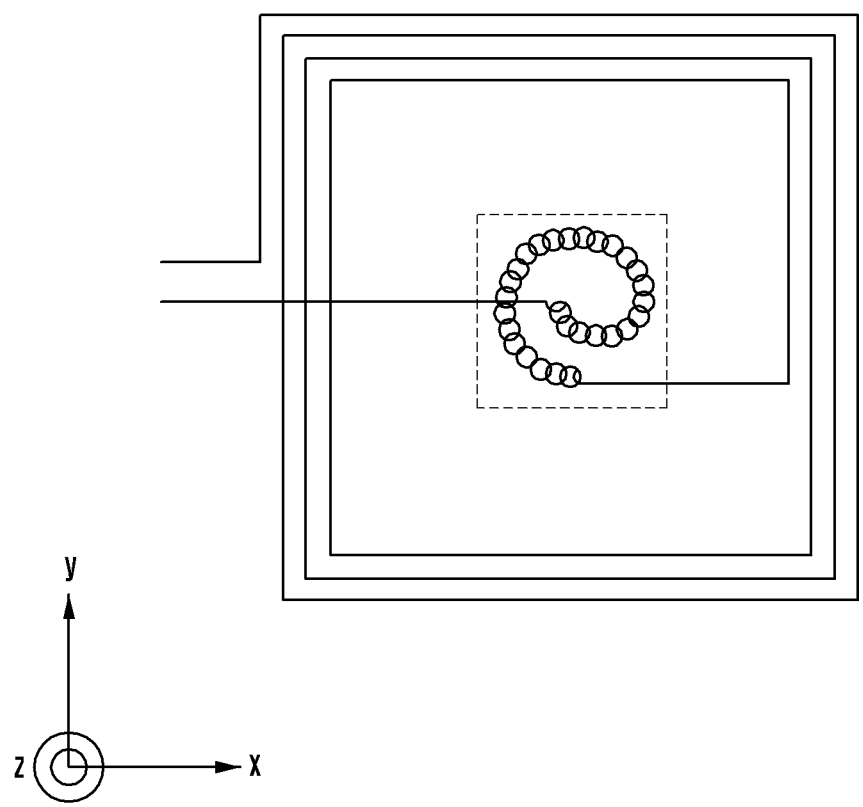

FIGS. 34A and 34B are diagrams illustrating structures of loop antennas, according to an embodiment of the present disclosure.

Referring to FIGS. 34A and 34B, a loop antenna 3410 shown in FIG. 34A may be applied to the antenna 1630 shown in FIG. 16B. The loop antenna 3410 is implemented in such a way that a first path 3411, forming the outer portion, is a flat type of coil and a second path 3412, forming the inner portion, is a solenoid coil. For example, the flat coil may be a coil that is wound without overlapping on the X-Y plane. The solenoid coil may be a coil that is wound with respect to the Z-axis a number of times. As shown in FIG. 34B, the solenoid coil may be a coil that is wound on an axis perpendicular to the Z-axis a number of times. As the number of turns of a coil arranged in each section and the area where the coil is arranged vary, the null point moves from the center portion of the loop antenna to the outer side, thereby emitting a relatively large amount of magnetic flux from the second path 3412.

Figure 35A:
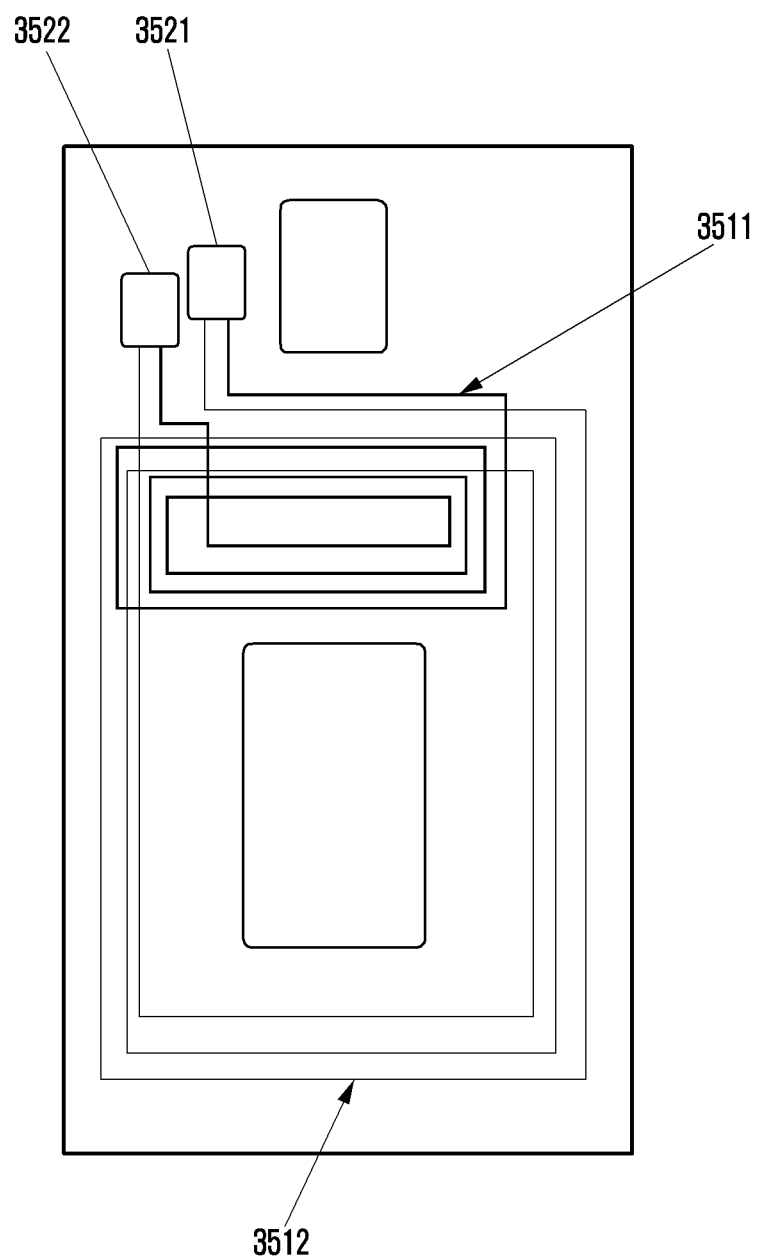
FIGS. 35A and 35B are diagrams illustrating use of multiple loop antennas, according to an embodiment of the present disclosure.
Figure 35B:
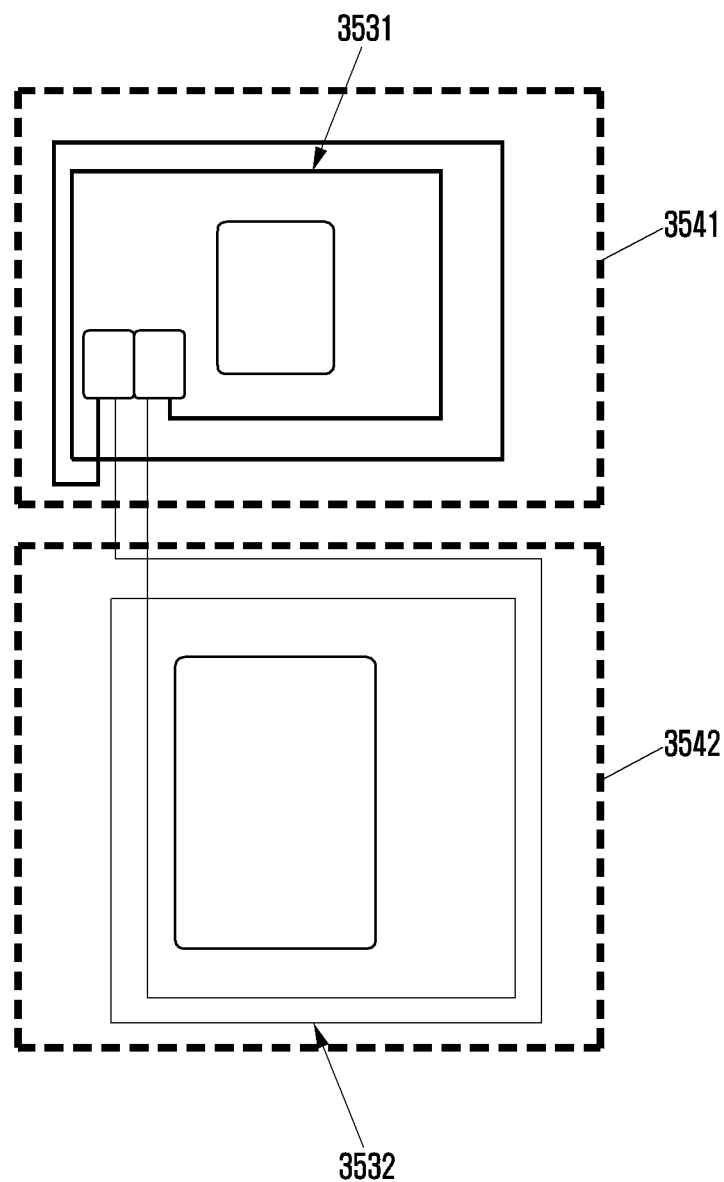

FIGS. 35A and 35B are diagrams illustrating structures of a number of loop antennas, according to embodiments of the present disclosure.

Referring to FIGS. 35A and 35B, a number of loop antennas, e.g., first and second antennas 3511 and 3512, are connected to the same output part of an MST control module. The first and second antennas 3511 and 3512 may transmit the same signal at the same time. For example, as shown FIG. 35A, one end of each of the first and second antennas 3511 and 3512 is connected to a first electrode 3521, and the other end of each of the first and second antennas 3511 and 3512 is connected to a second electrode 3522. The first and second antennas 3511 and 3512 may be configured on the different layers of the FPCB. For example, with respect to the Z-axis, the first and second antennas 3511 and 3512 are formed on the bottom and top layers of the FPCB, respectively. Alternatively, the loop antennas may also be formed on the same layer. For example, as shown in FIG. 35B, first and second antennas 3531 and 3532 may be formed on the top and bottom portions 3541 and 3542 of the X-Y plane, respectively.

Figure 36A:
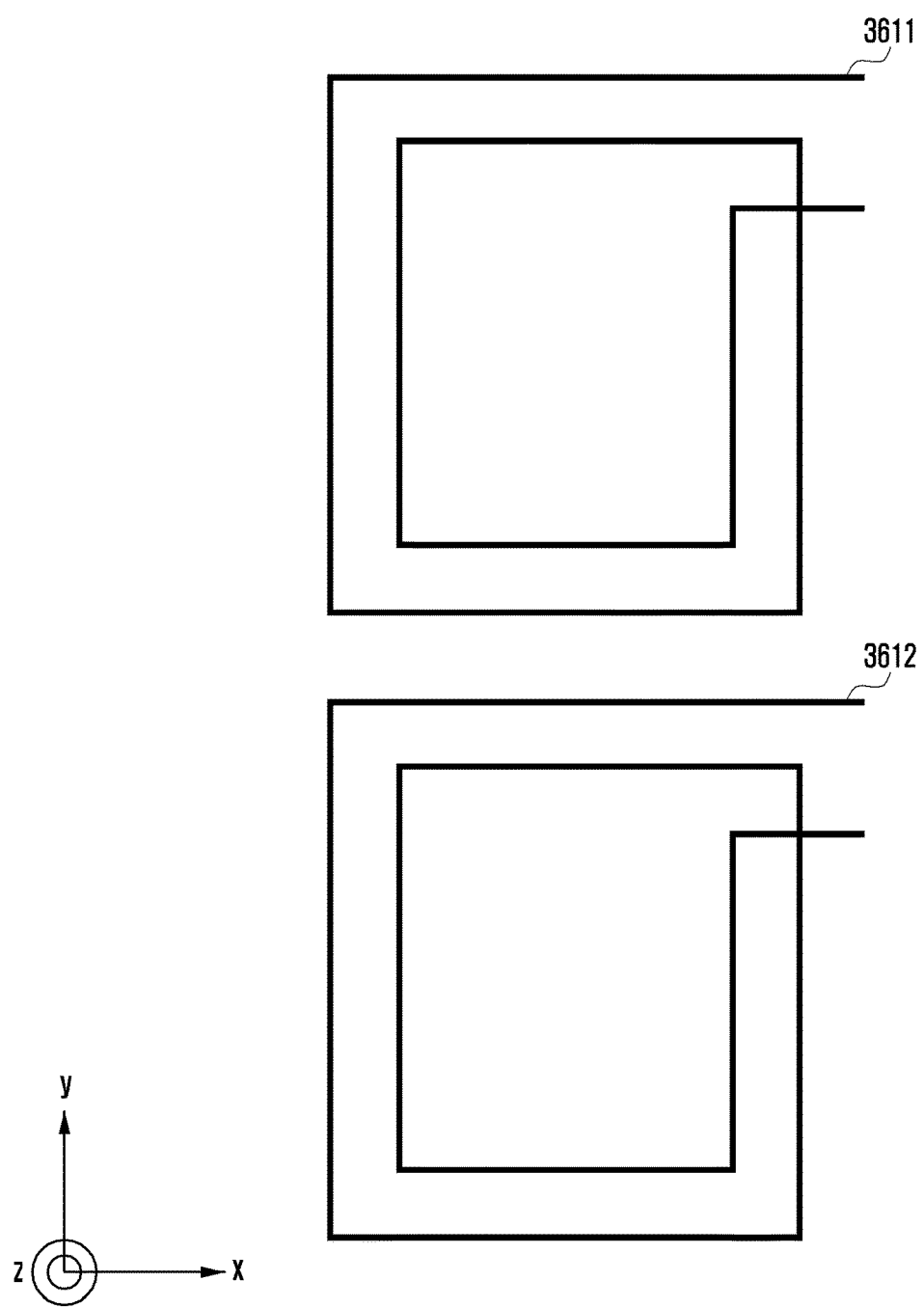
FIGS. 36A and 36B are diagrams illustrating use of multiple coil antennas, according to an embodiment of the present disclosure.
Figure 36B:
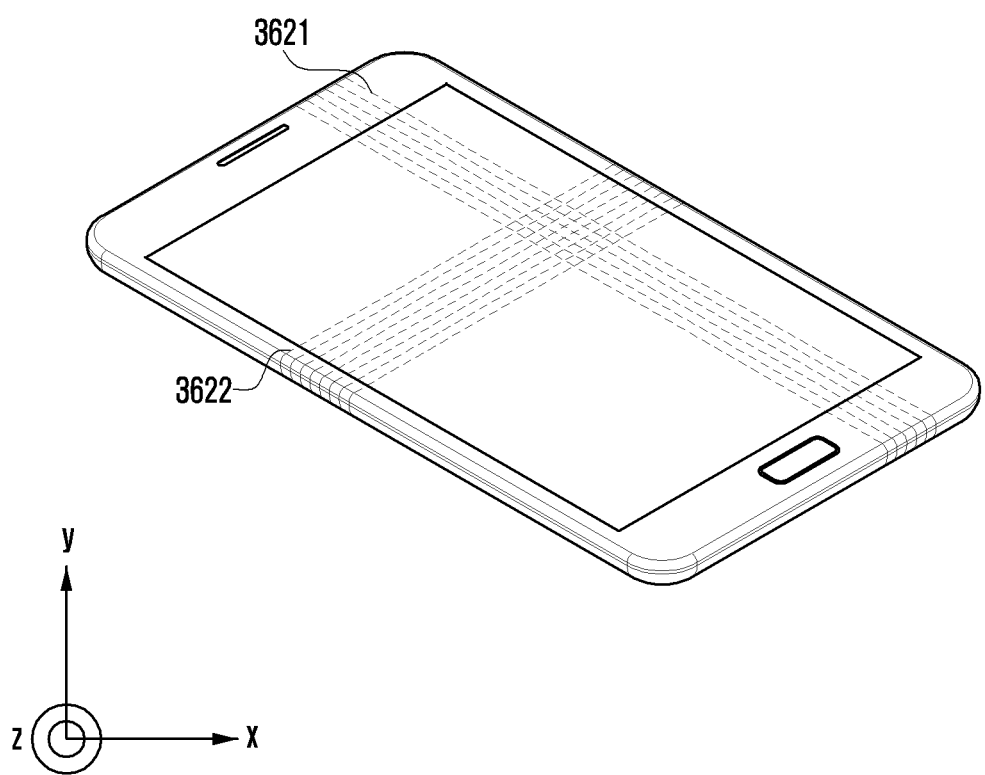

FIGS. 36A and 36B are diagrams illustrating structures of a number of coil antennas, according to an embodiment of the present disclosure.

Referring to FIG. 36A, a number of coil antennas, e.g., first and second antennas 3611 and 3612, are formed on the same plane (e.g., X-Y plane). A loop antenna for MST (or MST loop antenna) may be implemented as various forms to improve the recognition of magnetic field emitted to an external device (e.g., POS terminal). For example, the paths of the coil antenna may be implemented as a shape of the letter 'B' shown in FIG. 33C or the figure '8' shown in FIG. 33D. The coil antenna may be implemented in such a way that, when the electronic device moves close to the POS terminal, the paths (current paths) are maximally formed, which are perpendicular to the direction along which a magnetic card is swiped over the POS terminal. The first and second antennas 3611 and 3612 may transmit different MST signals. For example, the first antenna 3611, e.g., the first antenna 4530 shown in FIG. 45B, may emit part of the sequences shown in FIG. 7. Similarly, the second antenna 3612, e.g., the second antenna 4540 shown in FIG. 45B, may emit another part of the sequences shown in FIG. 7.

Referring to FIG. 36B, the coil antennas may be formed on different planes with respect to different axes. For example, first and second coil antennas 3621 and 3622 may form loops with respect to X- and Y-axes, respectively. The first and second coil antennas 3621 and 3622 may place a shielding material therebetween, thereby preventing interference therebetween.

The first or second coil antenna 3621 or 3622 may be an FPCB antenna. The multi-layers of an FPCB are connected with patterns, thereby forming layered loops.

The first or second coil antenna 3621 or 3622 may form a loop winding at least part of the housing of the electronic device. The coil antenna may be implemented in such a way that one part is located under the front display of the electronic device and the other part is located under the back of the electronic device. The coil antenna may be implemented with an FPCB or to use at least part of the outer body of the electronic device.

Figure 37:
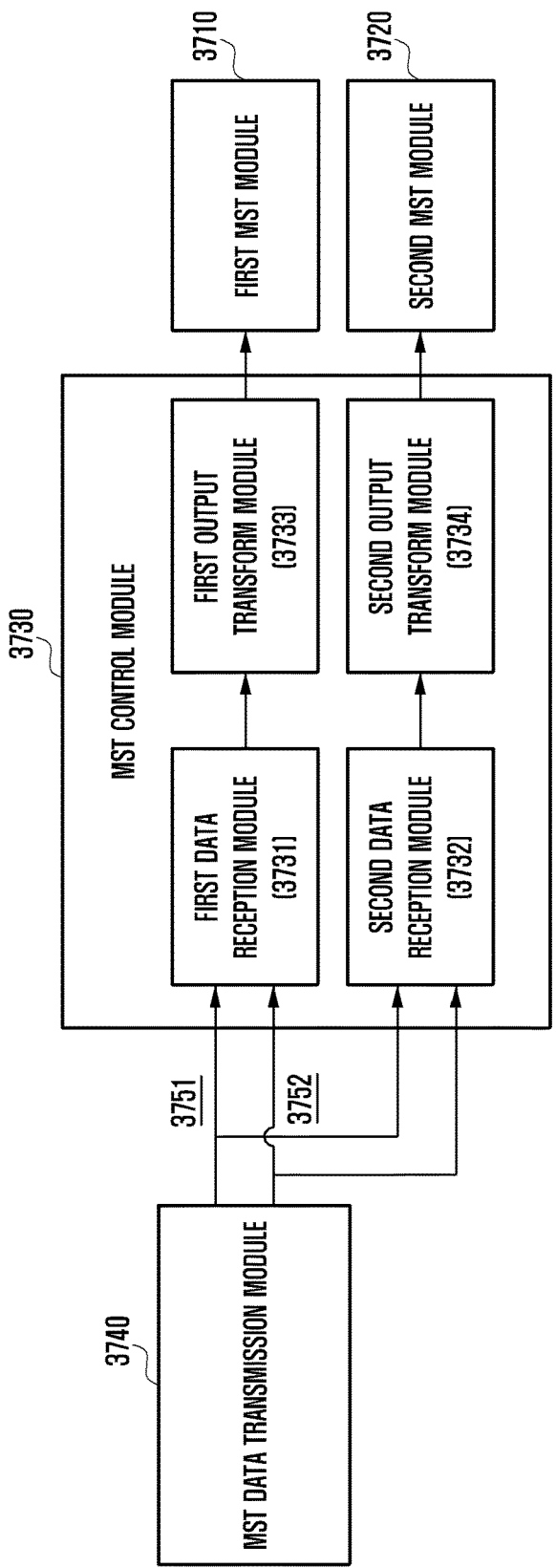
FIGS. 37 to 39 are hardware block diagrams of an electronic device with multiple MST modules, according to an embodiment of the present disclosure.
Figure 38:
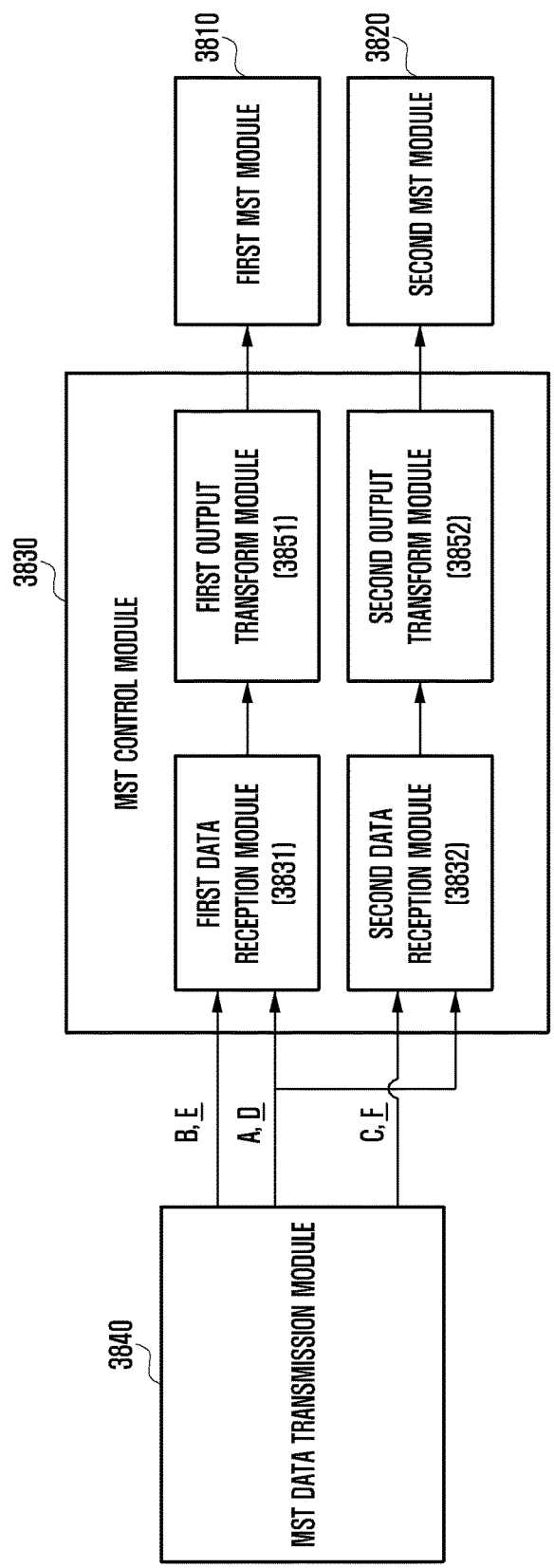
Figure 39:
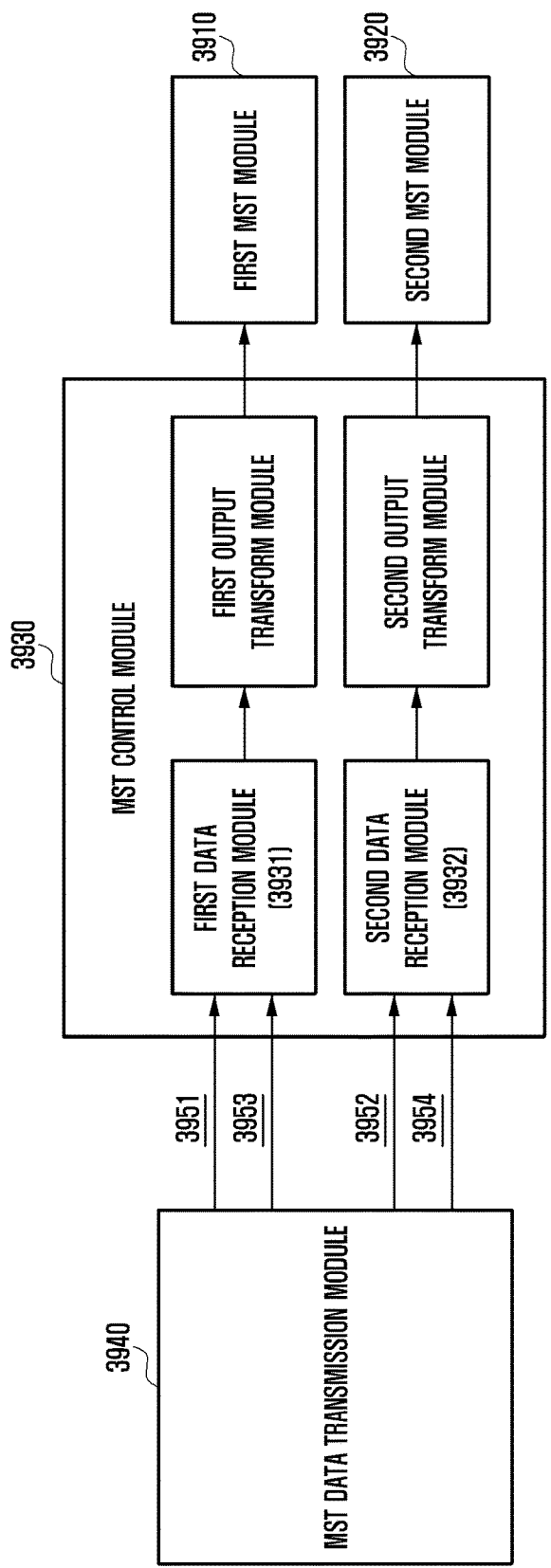

FIGS. 37, 38, and 39 are block diagrams illustrating electronic devices including a number of MST modules, according to embodiments of the present disclosure.

Referring to FIG. 37, first and second MST modules 3710 and 3720 are capable of transmitting the same data to an external device. The first MST module is capable of including a coil antenna that differs in type from that of the second MST module 3720. The first and second MST modules 3710 and 3720 are located apart from each other. The first and second MST modules 3710 and 3720 may receive different levels of voltage or different amount of current, respectively. An MST control module 3730 includes first and second data reception modules 3731 and 3732 which are capable of receiving at least one identical signal from an MST data transmission module 3740. For example, an MST data transmission module 3740 may transmit an MST signal 3751 containing the same payment information (e.g., data shown in FIGS. 45A and 45B) to first and second data reception modules 3731 and 3732 of the MST control module 3730. In addition, the MST data transmission module 3740 may transmit a control signal 3752 for activating the first and second MST modules 3710 and 3720 to the first and second data reception modules 3731 and 3732. The MST control module 3730 receives the control signal 3752 and controls the first and second MST modules 3710 and 3720 to emit the MST signal 3751 to the outside. The first data reception module 3731 and a first output transform module may be formed into a signal module. The second data reception module 3732 and a second output transform module may be formed into a signal module.

Referring to FIG. 38, an MST data transmission module 3840 transmits an MST signal A containing the same payment information (e.g., sequences shown in FIG. 7) to first and second data reception modules 3831 and 3832. An MST data transmission module 3840 also transmits control signals B and C to first and second data reception modules 3831 and 3832 to independently control first and second MST modules 3810 and 3820, respectively. The first and second MST modules 3810 and 3820 are activated sequentially according to the individual control signals and emit part of the individual MST signals. For example, the first MST module 3810 is first activated and transmits sequences sequentially (e.g., in order of a sequence 710 and a sequence 720). The second MST module 3820 is activated and transmits sequences sequentially (e.g., in order of a sequence 730 and a sequence 740.

The first and second MST modules 3810 are 3820 may be alternately activated and emit MST signals to an external device (e.g., a POS terminal). For example, the first MST module 3810 is first activated to emit a sequence (e.g., the sequence 710) and then the second MST module 3820 is activated to emit a sequence (e.g., the sequence 720). The first MST module 3810 is activated again to emit a sequence (e.g., the sequence 730) and then the second MST module 3820 is activated again to emit a sequence (e.g., the sequence 740).

The first and second MST modules 3810 and 3820 may be selectively activated according to the state of the UE. For example, when the UE activates short-range wireless communication (e.g., NFC communication) using a loop antenna near the first MST module 3810 or when the UE activates cellular network wireless communication using an adjacent antenna, the MST control module 3830 activates the second MST module 3820 to emit an MST signal. For example, when the UE activates the first MST module 3810 and/or the second MST module 3820 and emits an MST signal using the activated module to an external device (e.g., a POS terminal), the external device may not recognize the MST signal. In this case, the user may move the UE so that it can be recognized by the external device (e.g., the user may move the UE off the POS terminal and then tag it thereto). The UE enables a sensor to detect this operation, thereby simultaneously activating the first and second MST modules 3810 and 3820. For example, UE may activate the second MST module 3820 (e.g., the second coil antenna 3622 shown in FIG. 36B) when the screen is displayed in portrait mode and the first MST module 3810 (e.g., the first coil antenna 3621 shown in FIG. 36B) when the screen is displayed in landscape mode.

An MST data transmission module 3840 transmits a control signal D for activating first and second MST modules 3810 and 3820 to first and second data reception modules 3831 and 3832. The MST data transmission module 3840 transmits MST signals E and F containing different payment information to the first and second data reception modules 3831 and 3832, respectively. For example, the MST data transmission module 3840 may transmit MST signals containing Track 1 information and Track 2 information to the first and second data reception modules 3831 and 3832, respectively. The MST signal containing Track 1 information is transmitted to the first MST module 3810 via a first output transform module 3851. The first MST module 3810 emits the received MST signal. Similarly, the MST signal containing Track 2 information is transmitted to the second MST module 3820 via a second output transform module 3852. The second MST module 3820 emits the received MST signal. The first data reception module 3831 and the first output transform module 3851 may be formed into a signal module. The second data reception module 3832 and the second output transform module 3852 may be formed into a signal module.

Referring to FIG. 39, an MST data transmission module 3940 is capable of transmitting MST signals 3951 and 3952 containing the different payment information the first and second data reception modules 3931 and 3932 of an MST control module 3930, respectively. For example, the MST data transmission module 3940 may transmit the sequences 710 and 720 to the first data reception module 3931 and the sequences 730 and 740 to the second data reception module 3932. In addition, the MST data transmission module 3940 transmit different control signals 3953 and 3954 to the MST control module 3930 to independently control first and second MST modules 3910 and 3920. For example, after receiving the control signals 3953 and 3954, the MST control module 3930 controls the first MST module 3910 to sequentially emit the sequences 710 and 720 to the outside, and then the second MST module 3920 to sequentially emit the sequences 730 and 740 to the outside. The first data reception module 3931 and a first output transform module may be formed into a signal module. The second data reception module 3932 and a second output transform module may be formed into a signal module.

Figure 40:
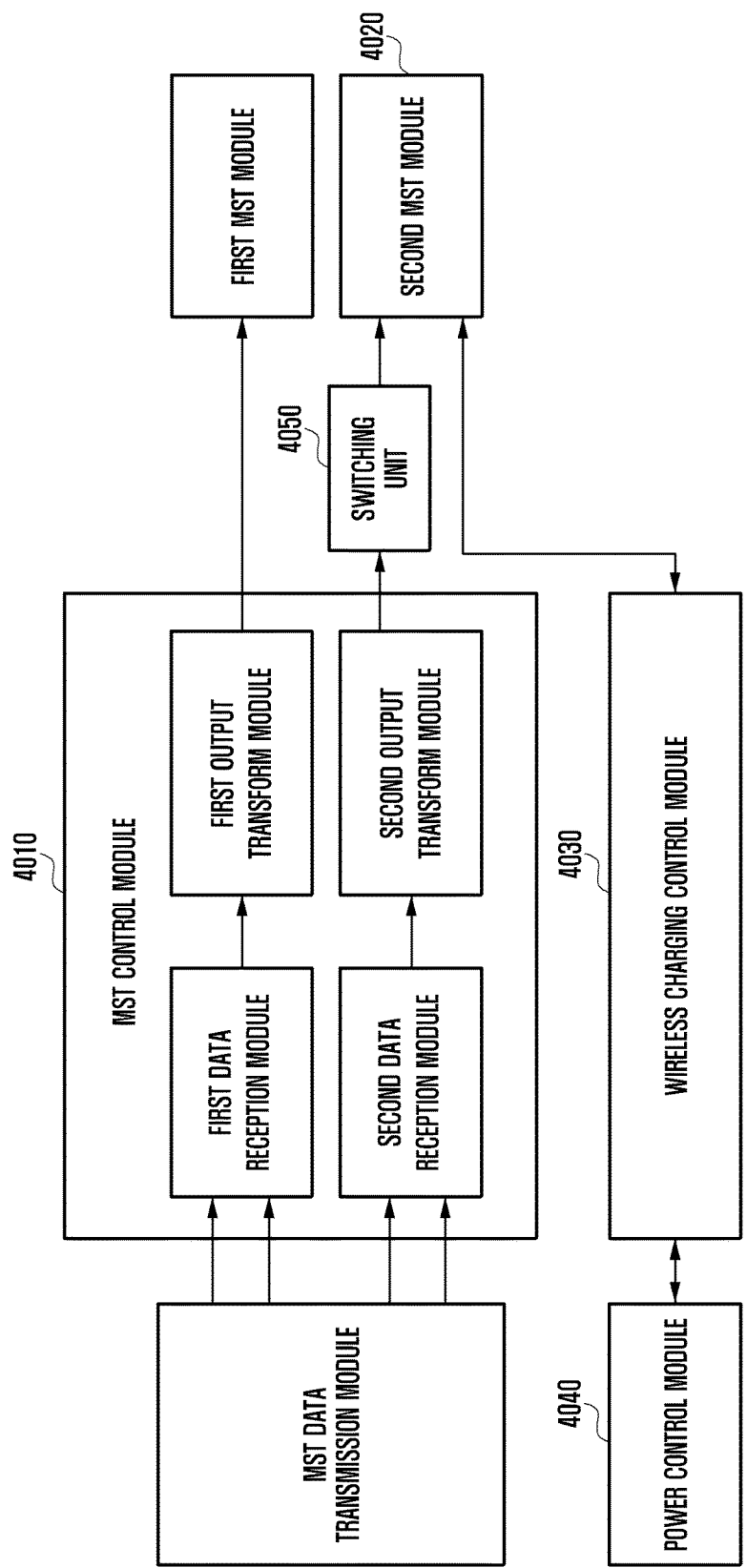
FIGS. 40 to 42 are hardware block diagrams of an electronic device having at least one of multiple MST modules that is commonly usable for wireless short-range communication, according to an embodiment of the present disclosure.
Figure 41:
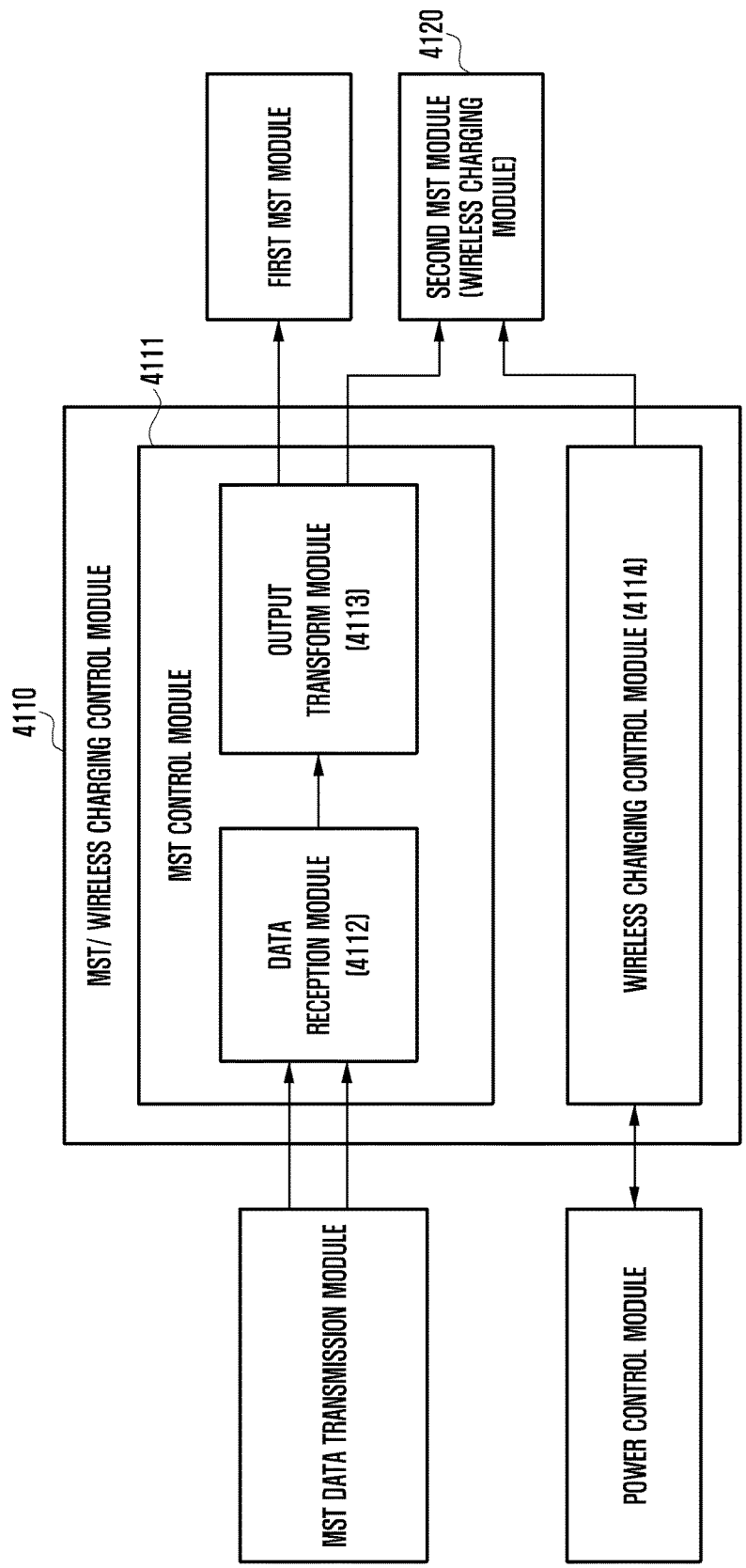

FIGS. 40, 41, and 42 are block diagrams illustrating electronic devices capable of sharing at least one of a number of MST modules with another short-range wireless communication, according to an embodiment of the present disclosure.

Referring to FIG. 40, an MST control module 4010 includes a switching unit 4050. The switching unit 4050 interrupts (opens) the connection between a second MST module 4020 and the MST control module 4010 so that the second MST module 4020 is connected to a wireless charging control module 4030 and serves as a wireless charging module (or a wireless charging coil antenna). The wireless charging control module 4030 is capable of further including an alternate current (AC)/direct current (DC) converter, a rectifier, and the like. A power control module 4040 may be included in the electronic device. The second MST module 4020 may include a coil antenna of an inductance of approximately 10 µH.

Referring to FIG. 41, the electronic device is capable of using at least one of a number of MST modules, e.g., a second MST module 4120, as a resonant coil antenna for wireless charging. An MST/wireless charging control module 4110 is capable of including an MST control module 4111 and a wireless charging control module 4114. The MST control module 4111 includes a data reception module 4112 and an output transform module 4113.

Referring to FIG. 42, the electronic device is capable of using at least one of a number of MST modules, e.g., a second MST module 4220, as an NFC coil antenna. When the second MST module 4220 is used as an NFC coil antenna, the electronic device may further include a switching unit 4230 to adjust the number of turns or an inductance in the coil antenna. When the electronic device uses at least one of the MST modules, e.g., the second MST module 4220, as an MST module for other short-range wireless communication (e.g., NFC communication), an MST control module 4210 may further include a switch for disconnecting from the MST module for other short-range wireless communication, i.e., the second MST module 4220.

Figure 43:
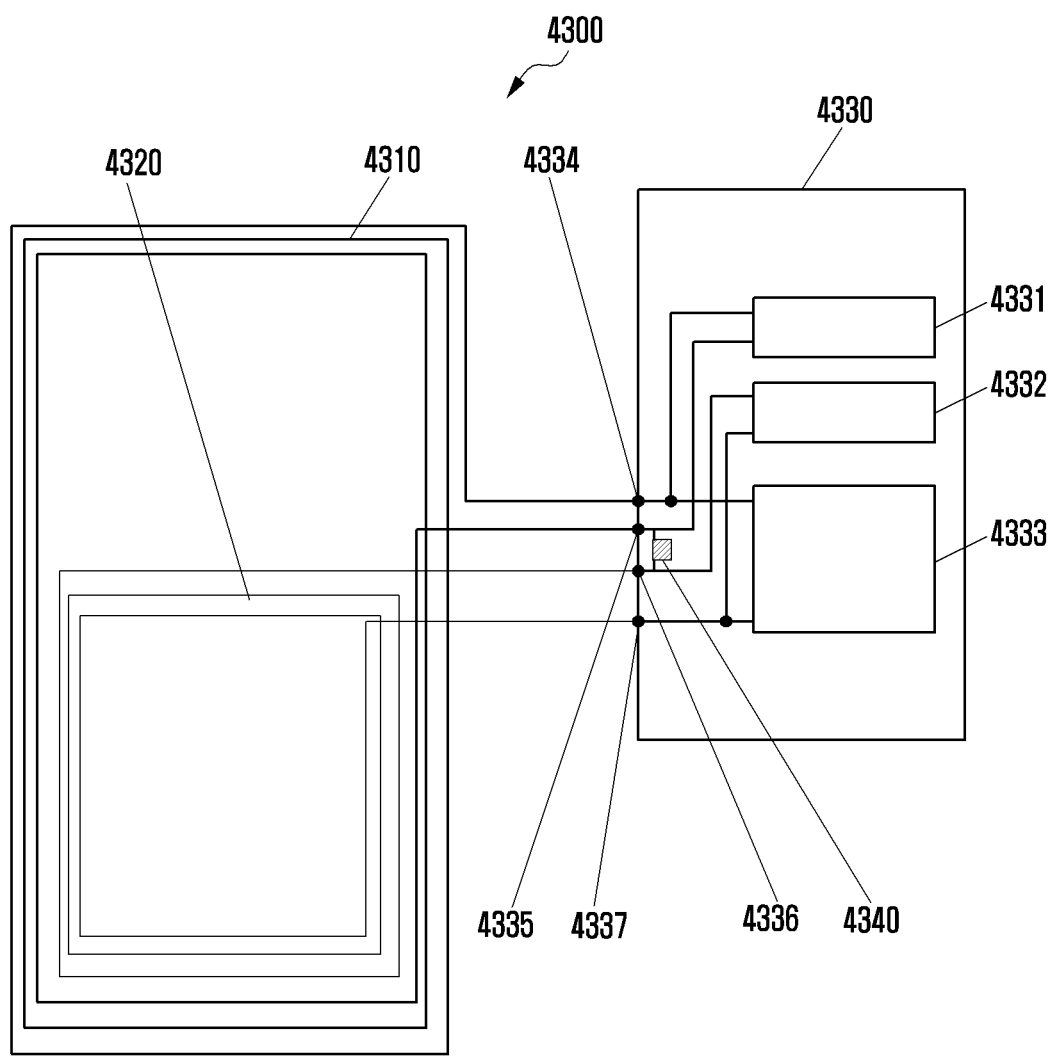
FIG. 43 is a schematic diagram of an antenna device, according to an embodiment of the present disclosure.

FIG. 43 is a diagram illustrating an antenna device, according to an embodiment of the present disclosure.

Referring to FIG. 43, an antenna device 4300 is installed to an electronic device. The antenna device 4300 includes first and second loop antennas 4310 and 4320, a communication module 4330, and a switch 4340. The communication module 4330 includes first, second, and third communication modules 4331, 4332, and 4333, and four contacts 4334-4337.

The first communication module 4331 is electrically connected to the first loop antenna 4310 via the first and second contacts 4334 and 4335, and performs transmission/reception of electromagnetic waves for short-range wireless communication. For example, the first communication module 4331 is a resonance charging module, e.g., alliance for wireless power (A4WP), and receives electromagnetic waves for charging via the first loop antenna 4310.

The second communication module 4332 is electrically connected to the second loop antenna 4320 via the third and fourth contacts 4336 and 4337, and performs transmission/reception of electromagnetic waves for short-range wireless communication. For example, the second communication module 4332 serves as an NFC module.

The third communication module 4333 is electrically connected to the first and second loop antennas 4310 and 4320 via the contacts 4334-4337 and the switch 4340, and performs transmission/reception of electromagnetic waves for short-range wireless communication (e.g., wireless power consortium (WPC) or MST). For example, when the switch 4340 is turned on, electric current flows along the following path the third communication module 4333, the first contact 4334, the first loop antenna 4310, the second contact 4335, the switch 4340, the third contact 4336, the second loop antenna 4320, the fourth contact 4337 and the third communication module 4333. For example, the first loop antenna 4310 and the second loop antenna 4320 form a path by the switch 4340. Therefore, the third communication module 4333 performs transmission/reception of electromagnetic waves via the path.

The operation of the switch 4330 (turning on/off) is controlled by the communication module 4340 or a control module (e.g., an application processor (AP)) of the electronic device. Although the embodiment shown in FIG. 43 is implemented in such a way that the switch 4330 is included in the communication module 4330, it should be understood that the present disclosure is not limited thereto. For example, the switch 4330 may be installed at any location only if it can connect the first and second loop antennas 4310 and 4320 to each other. Alternatively, the location where the switch 4330 will be installed may be determined, considering the length of a path, the number of turns in a path, an inductance of a path, and the like, so that a particular frequency of the third communication module 4333 can be selected as a resonance frequency.

Figure 44:
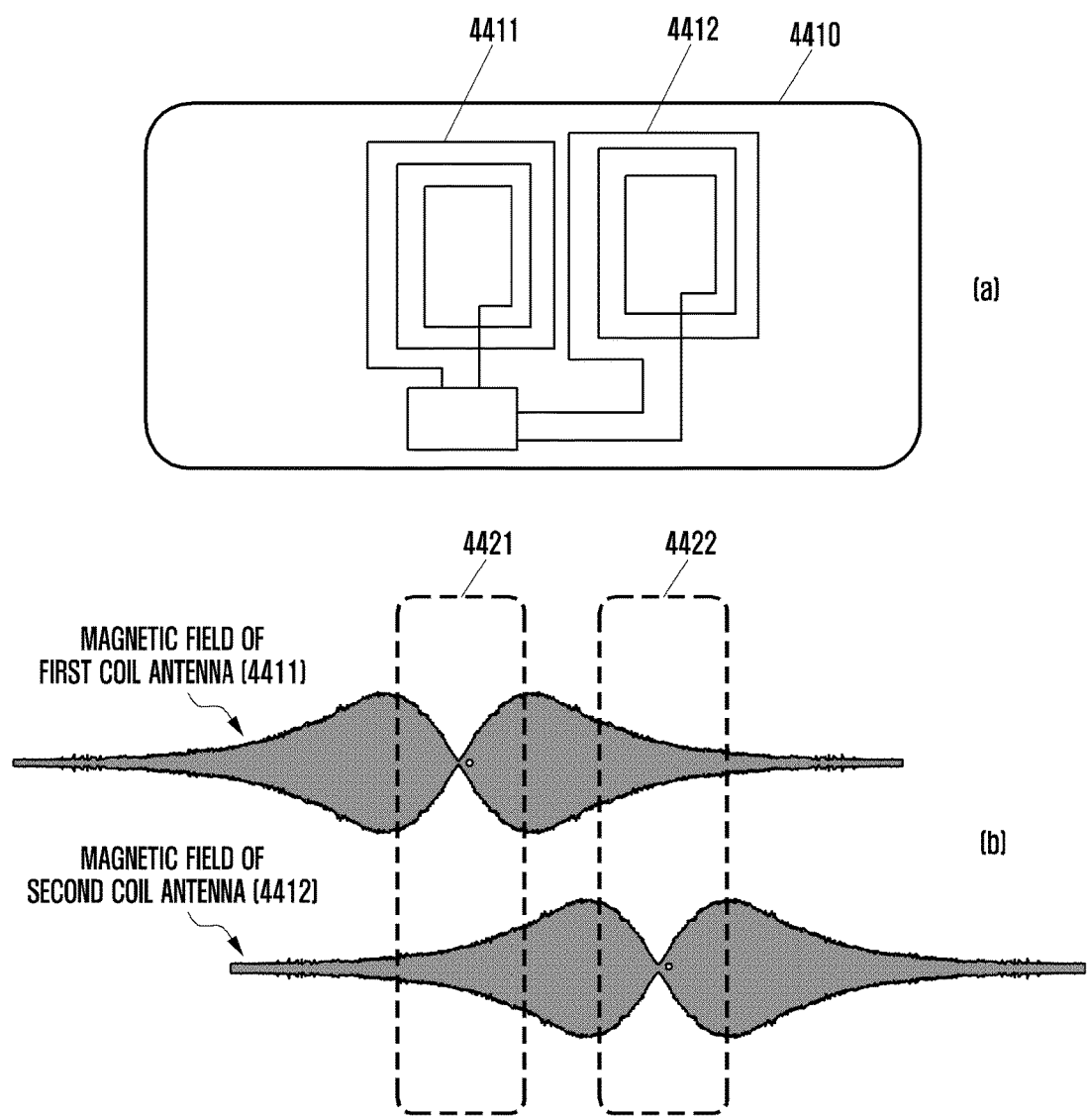
FIG. 44 is a diagram illustrating use of multiple coil antennas in an electronic device, and showing magnetic field strengths of the coil antennas and their shadow areas, according to an embodiment of the present disclosure.

FIG. 44 is a diagram illustrating a number of coil antennas in an electronic device, and showing a null point and an intensity of magnetic field produced in a number of coil antennas, according to an embodiment of the present disclosure.

Referring to (a) of FIG. 44, an electronic device 4410 is capable of including first and second coil antennas 4411 and 4412. The first and second coil antennas 4411 and 4412 produce magnetic fields according to received current.

The top diagram of (b) of FIG. 44 shows the intensity of magnetic fields and the null point, produced by and occurring due to the first coil antenna 4411 (or are recognized by an external device, e.g., a POS terminal). The bottom diagram of (b) of FIG. 44 shows the intensity of magnetic fields and the null point, produced by and occurring due to the second coil antenna 4412.

Referring to (b) of FIG. 44, a first null point 4421 that occurred due to the first coil antenna 4411 and a second null point 4422 due to the second coil antenna 4412 may not overlap with each other. The first and second coil antennas 4411 and 4412 may perform transmission of MST signals periodically or alternately. For example, the first and second coil antennas 4411 and 4412 may transmit an MST signals to the outside 16 times in total (i.e., eight times each antenna), where one time is one second. Therefore, the null points occur periodically and alternately, e.g., from the first null point 4421 to the second null point 4422 or vice versa. When an external device (e.g., a POS terminal) is located in the first null point 4421, it may not receive payment information from the first coil antenna 4411. Although the external device receives payment information, it may not recognize the received payment information. In this case, the POS terminal receives an MST signal containing payment information from the second coil antenna 4412 and makes a payment. As described above, the electronic device 4410 is capable of driving a number of coil antennas so that the null point occurs alternately or sequentially, thereby increasing the success rate of payment.

Figure 45A:
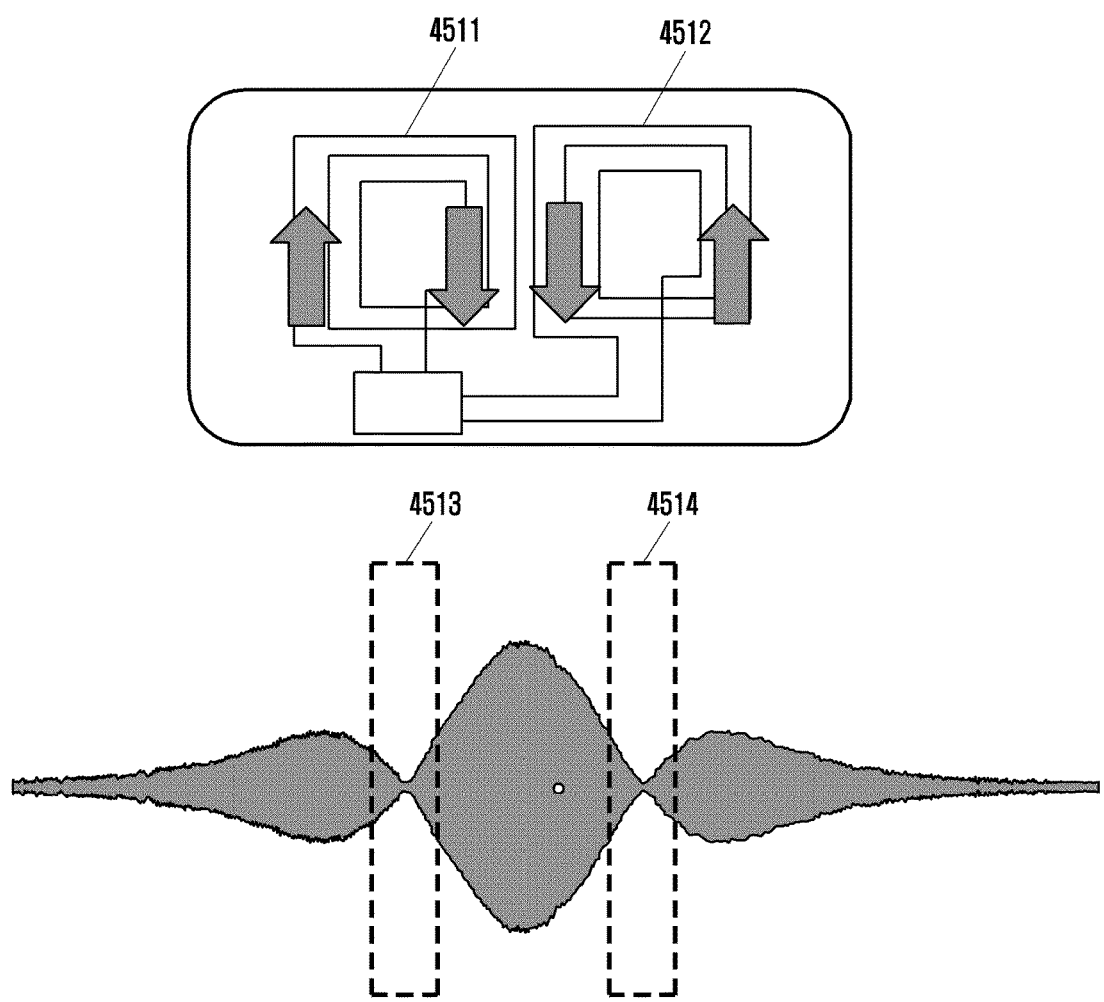
FIGS. 45A and 45B are diagrams illustrating use of multiple coil antennas in an electronic device, and showing magnetic field strengths of the coil antennas and their shadow areas, according to an embodiment of the present disclosure.
Figure 45B:
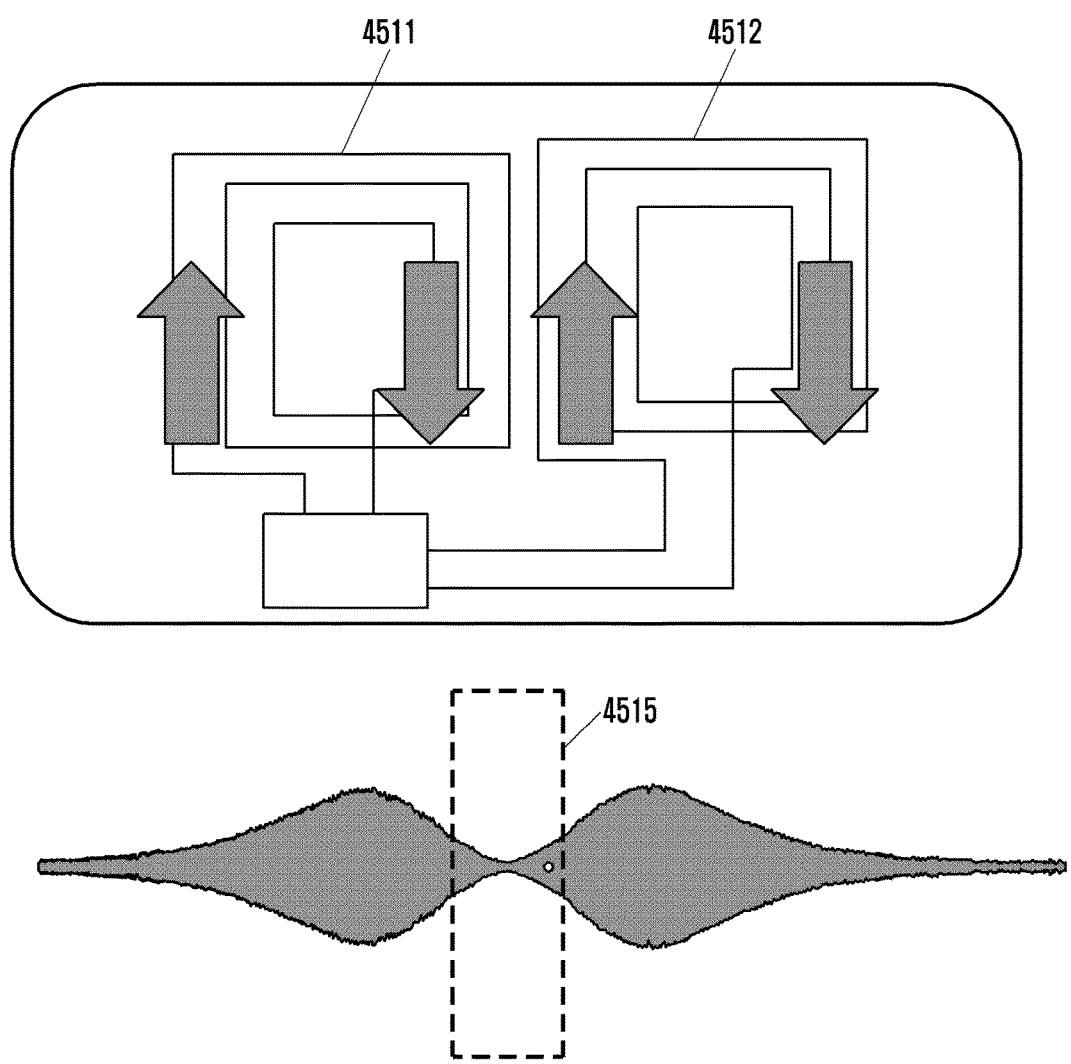

FIG. 45A is a diagram illustrating a number of coil antennas in an electronic device, according to an embodiment of the present disclosure. FIG. 45B is a diagram illustrating a null point and an intensity of magnetic field created in a number of coil antennas, according to an embodiment of the present disclosure.

Referring to FIGS. 45A and 45B, first and second coil antennas 4511 and 4512 are capable of simultaneously operating to emit MST signals. As shown in FIGS. 45A and 45B, first and second coil antennas 4511 and 4512 are installed to the left and right areas of an electronic device (e.g., a smartphone), respectively.

Referring to FIG. 45A, the first and second coil antennas 4511 and 4512 may receive current simultaneously, while the directions of current flow are opposite to each other. For example, the first coil antenna 4511 forms a path in the clockwise direction, while the second coil antenna 4512 forms a path in the counterclockwise direction. In this case, the directions of current are same at the center portion, which results in the largest intensity of magnetic fields. This condition also causes null points around the center portion, e.g., two null points 4513 and 4514 at both sides of the center portion.

Referring to FIG. 45B, the directions of current flow in the first and second coil antennas 4511 and 4512 are the same. In this case, the directions of current are opposite to each other at the center portion, which results in the smallest intensity of magnetic fields. This condition also causes a null point 4515 at the area between the two antennas, i.e., the center portion.

As described above, as the electronic device with a number of coil antennas simultaneously operates its coil antennas, while varying the directions of current flow therein (e.g., the directions of current are same or opposite), it can also vary the null points periodically. For example, the electronic device simultaneously operates a number of coil antenna, varying the directions of current flow therein, so that the null points are created alternately, thereby increasing the success rate of payment.

The electronic device is capable of operating a number of coil antennas sequentially as described above in FIGS. 44A and 44B. Alternatively, the electronic device is capable of operating a number of coil antennas simultaneously, varying the directions of current, as described above in FIGS. 45A and 45B. Alternatively, the electronic device is capable of operating a number of coil antennas using both the operating methods described above. Therefore, the electronic device is capable of varying the null point using the operating methods, thereby increasing the success rate of payment.

Figure 46:
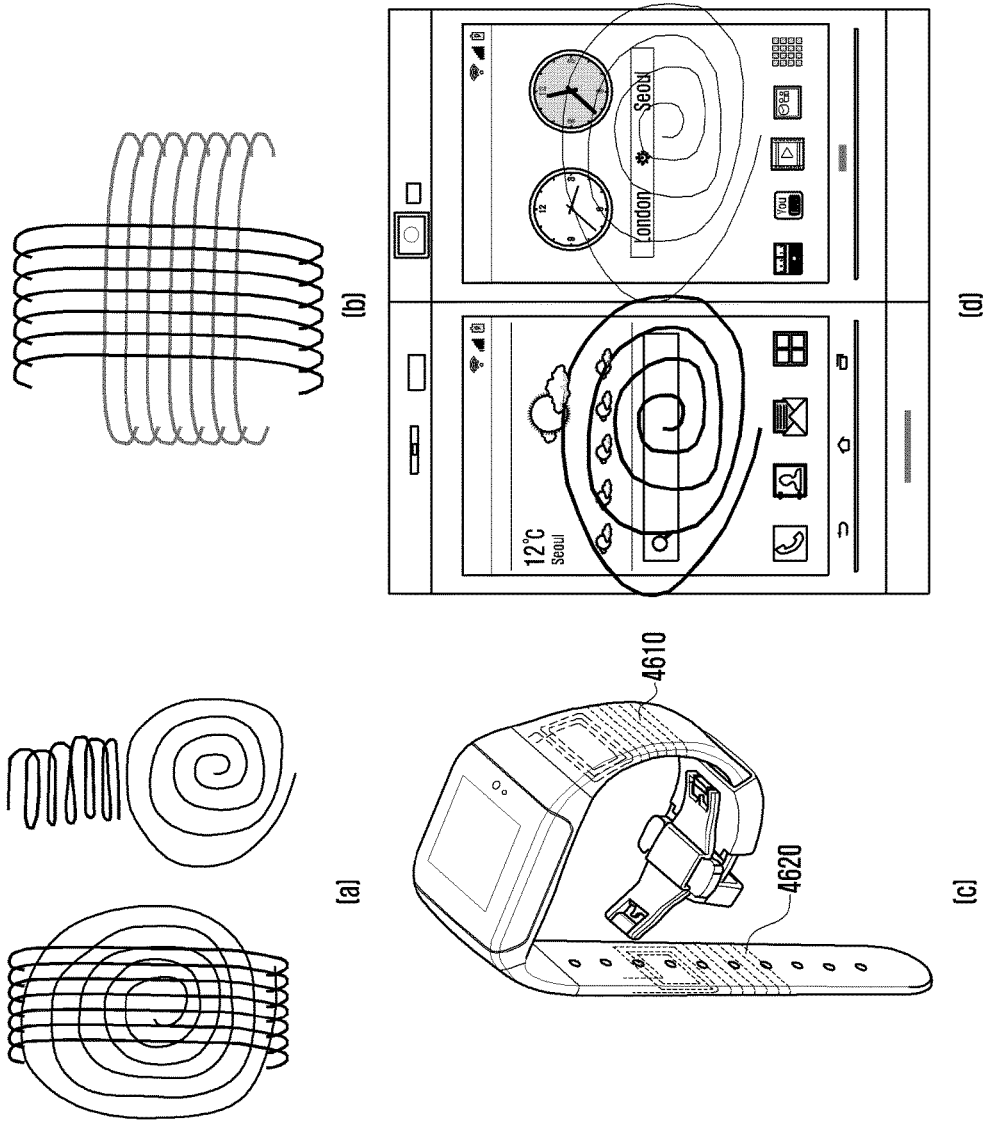
FIG. 46 is a diagram illustrating utilization of multiple coil antennas, according to an embodiment of the present disclosure.

FIGS. 46 are diagrams illustrating a method of using a number of coil antennas, according to an embodiment of the present disclosure.

Referring to (a) to (d) of FIG. 46, a number of coil antennas for electronic devices according to the present disclosure may be implemented in various forms, such as a flat coil antenna and a solenoid antenna, as shown in (a) of FIG. 46, and a form of antennas shown in (b) of FIG. 46, which is similar to that of FIG. 36B. When a number of coil antennas are employed by a wearable device (e.g., a smart watch), they may be implemented, as shown in (c) of FIG. 46, in such a way that first and second coil antennas 4610 and 4620 are installed to first and second watch straps, respectively. Alternatively, a number of coil antennas may be installed to the a smart watch in such a way that at least one of them is installed to at least one watch strap. As shown in (d) of FIG. 46, when an electronic device is configured to include two or more displays, for example, LCDs, they may include separate coil antennas under the LCD backs, respectively.

The electronic device with a number of coil antennas may operate all of them simultaneously or parts of them according to a specific time. The coil antennas may be enabled selectively according to an angle, a motion, and the like, of the electronic device (e.g., tagging information), with respect to an external device. The electronic device may show a well-recognized area via the output device.

FIGS. 47A to 47C are diagrams illustrating formats of data recorded in tracks of magnetic cards, according to embodiments of the present disclosure.

Referring to FIGS. 47A to 47C, magnetic cards store data according to Track 1, Track 2 and Track 3. A card reading apparatus may include a header and a coil configured to read data from magnetic stripe tracks of a magnetic card. The track of a magnetic card (i.e., a magnetic black line) is swiped over the header of the rail of a card reading apparatus (a card reader), the lines of magnetic force passing through the coil connected to the header change. The change in the lines of magnetic force induces current in the card reading apparatus. The card reading apparatus is capable of reading and processing data recorded in the card track from the induced current.

The electronic device may include a module for storing data recoded in tracks of a magnetic card and performing magnetic communication, e.g., an MST module. The MST module is capable of transmitting magnetic field signals carrying the recorded data of tracks to a card reading apparatus via the antenna. After receiving the magnetic field signals, the card reading apparatus induces the same current as the magnetic card is swiped over the header of the card reading apparatus. For example, as the user places the electronic device near the card reading apparatus or touches the card reading apparatus with the electronic device, thereby making payment for charges.

Figure 48A:
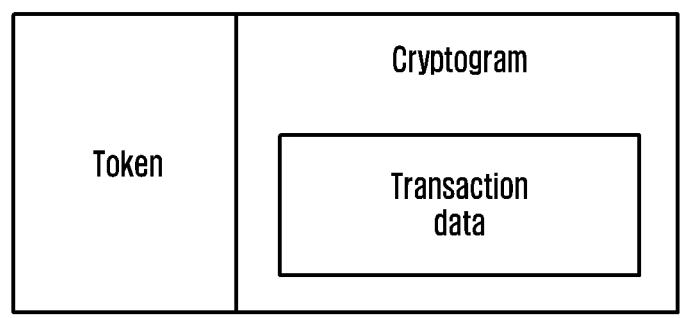
FIGS. 48A and 48B are diagrams illustrating a scheme for data transmission, according to an embodiment of the present disclosure.
Figure 48A:
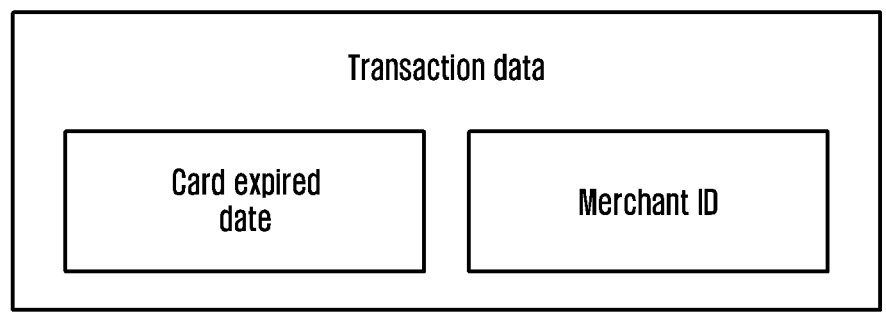
Figure 48B:
Figure 48B:
Figure 48B:

FIGS. 48A and 48B are diagrams illustrating data transmission methods, according to embodiments of the present disclosure.

Referring to FIGS. 48A and 48B, the data carried by an MST signal from the MST module may be transmitted via tokens as shown in FIG. 48A. In order to make a payment using tokens, at least part of the data of Track 1, 2, or 3, instead of Track 1, Track 2, or Track 3, is substituted with a token or cryptogram. As shown in FIG. 48B, PANs of Track 1, Track 2 and Track 3 are substituted with Tokens. ADDITIONAL DATA and DISCRETIONARY DATA of Track 1 and Track 2 and USE AND SECURITY DATA and ADDITIONAL DATA of Track3 are substituted with cryptograms. The substituted values are converted to bits and then the converted bits are carried by MST signals to a card reading apparatus. When using the data format of tracks, the card reading apparatus may transmit the token information to a corresponding card issuing company, without processing the track data. The token may contain an identifier (ID) for identifying a card. Alternatively, the token may contain information for identifying a card issuing company. Transaction data may contain expiration date of a card, merchant ID, information created by combining parts of transaction-related information with each other, and the like.

The electronic device includes a first cover configuring the front side of the electronic device, a second cover configuring the back side of the electronic device, a memory contained in a hollow area formed between the first and second covers, a display at least part of which is contained in the hollow area and which is disclosed through the first cover, a processor that is contained in the hollow area and is electrically connected to the memory, and at least one loop antenna which is contained in the hollow area and electrically connected to the processor. The memory stores instructions that enable the processor to store data corresponding to Track 1, Track 2, and Track 3 of a magnetic card in the memory, and emit a magnetic field signal containing data corresponding to at least two of the Track 1, Track 2 and Track 3, for one cycle, via the at least one loop antenna.

The instructions enable the processor to emit a magnetic field signal containing reversal data, created as the binary numbers of the data corresponding to the Track 1 or Track 2 are arranged in reverse order, for one cycle.

The instructions enable the processor to emit a first magnetic field signal containing data corresponding to one of the Track 1, Track 2 and Track 3, periodically, a number of times, and then a second magnetic field signal containing reversal data, created as the binary numbers of the data for the first magnetic field signal and another data corresponding to one of the other tracks are arranged in reverse order, periodically a number of times.

The instructions enable the processor to emit the second magnetic field signal at the same cycle as the first magnetic field signal.

After emitting the second magnetic field signal, periodically, a number of times, the instructions enable the processor to emit a third magnetic field signal containing the data, periodically, a number of times, and a fourth magnetic field signal containing the reversal data and the data, periodically, a number of times.

The instructions enable the processor to emit the third magnetic field signal at a longer cycle than the processor emits the first magnetic field signal.

The instructions enable the processor to emit the fourth magnetic field signal at a longer cycle than the processor emits the second magnetic field signal.

The instructions enable the processor to emit the fourth magnetic field signal at the same cycle as the third magnetic field signal.

The instructions enable the processor to emit a magnetic field signal containing data, created as part of data corresponding to tracks is substituted by a token, for one cycle.

The instructions enable the processor to determine to emit the magnetic field signal, according to at least part of inputs received by the display and/or at least one sensor.

The sensor includes a fingerprint sensor.

The instructions enable the processor to emit the same magnetic field signal via a number of loop antennas.

The instructions enable the processor to sequentially select a number of loop antennas and emit the same magnetic field signal in selected order of loop antennas.

The instructions enable the processor to emit magnetic field signals of other tracks via a number of loop antennas.

The instructions enable the processor to stop the emission of the magnetic field signal in response to a user input and/or a signal created by at least one sensor.

The electronic device includes a housing including a first side and a second side facing the direction opposite to the first side, a UI (e.g., the display module 160) disclosed through the first side, a memory in the housing, a processor that is contained in the housing and is electrically connected to the memory and the UI, and at least one conductive pattern (e.g., loop antenna) which is contained in the housing or formed as part of the housing and is electrically connected to the processor. The memory temporarily stores first payment information in a first format and second payment information in a second format. For example, the memory may temporarily store information regarding at least two of Track 1, Track 2, Track 3, and a token. The memory stores instructions which enable the processor to create a number of signal sequences using the first payment information and/or second payment information, and magnetically emit the signal sequences to the outside, via the conductive pattern. At least one of the signal sequences includes pulses representing the entirety of the first payment information and/or the second payment information.

The instructions enable the processor to emit the signal sequences to the outside in response to a user's single input (e.g., the user's fingerprint 1370) received by the UI.

At least one signal sequence includes pulses sequentially representing the entirety of the first payment information and the second payment information.

The signal sequences include a first signal containing pulses of a first pulse cycle, and a second signal containing pulses of a second pulse cycle that differs from the first pulse cycle.

The signal sequences include a first signal, a second signal created after a first time interval from the first signal, and a third signal created after a second time interval, which differs from the first time interval, from the second signal.

At least one of the signal sequences includes pulses representing information in the reverse order to the entirety of the first payment information and the second payment information.

The memory temporarily stores third payment information in a third format. The memory stores instructions which enable the processor to create a number of signal sequences using at least one of the first payment information, the second payment information and the third payment information, and magnetically emit the signal sequences to the outside, via the conductive pattern. At least one of the signal sequences includes pulses representing the entirety of at least one of the first payment information, the second payment information and the third payment information.

Figure 49:
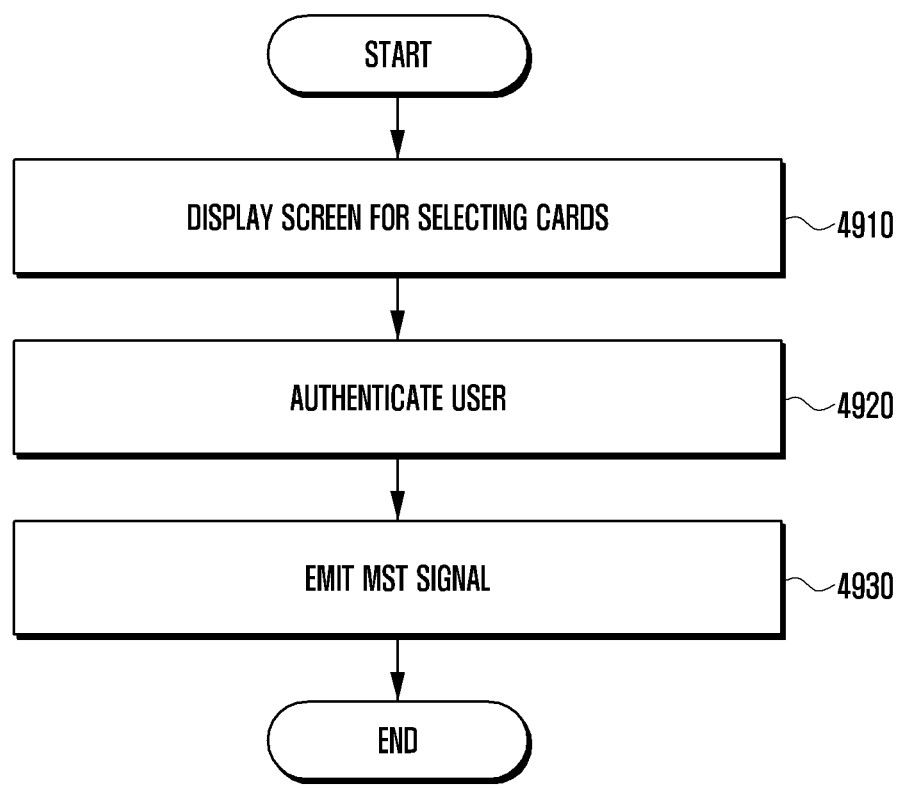
FIG. 49 is a flowchart illustrating a payment method, according to an embodiment of the present disclosure.

FIG. 49 is a flowchart illustrating a payment method, according to an embodiment of the present disclosure.

Referring to FIG. 49, an electronic device displays a card selection screen, in step 4910. For example, the electronic device executes a payment application in response to user inputs and displays an image corresponding to a card to be used for payment.

The electronic device performs user authentication, in step 4920. For example, the electronic device authenticates a user in such a way as to, obtain a user's fingerprint via a biometric sensor 107, determines whether the obtained fingerprint matches a stored fingerprint, and authenticates the user when the obtained fingerprint matches a stored fingerprint. It should be understood that the user authentication of the electronic device may also be implemented with other methods, such as iris recognition by a camera, electrocardiogram (ECG) pattern recognition by an ECG sensor, as well as fingerprint recognition, or a combination thereof.

When user authentication has been completed, the electronic device emits an MST signal corresponding to the selected card image, in step 4930. When the electronic device satisfies a preset condition to stop the creation of signals, it stops the emission of the MST signal. Examples of when an electronic device satisfies a condition to stop the creation of signals are cases in which the electronic device has received a payment complete message from a payment server, the electronic device recognizes that a preset period of time has elapsed since an MST signal started to be created, the electronic device recognizes that UE (or the electronic device) is moving, the electronic device detects a sound indicating that payment has been completed via the microphone, the electronic device receives a user input for terminating a payment procedure, and the like.

When user authentication has been completed, an electronic device is capable of creating sequences in various combination. For example, the electronic device may create sequences 16 times in total for 20 seconds by combining a simple transmission sequence with a complex transmission sequence. The electronic device programs the most efficient sequence combination, cycle, pulse timing, and the like, via a field test, according to countries or regions, and emits MST signals based on the programed results. The electronic device identifies a country or a region using a country code, GPS information, and the like, and performs a payment process, using MST, based on the programed information corresponding to the identified country or region.

When user authentication has been completed, an electronic device is capable of emitting a simple transmission sequence (e.g., an MST signal containing Track 2 information a number times). When user authentication has been completed again after a period of time has elapsed, the electronic device may re-emit an MST signal in another method that differs from the previous method. For example, the electronic device may vary cycle, pulse timing, and the like. The electronic device may also vary information included in the MST signal to information according to a complex transmission sequence.

When payment by a simple transmission sequence has failed, the user will take the electronic device off a reader and then tags it thereto again. In this case, the electronic device may recognize the reader via the sensor (e.g., the acceleration sensor 103, the gyro sensor 105, a proximity sensor, an HRM sensor, and the like). According to the tagging operation, the electronic device may alter an MST signal in at least one of the following an emission cycle, pulse timing and sequence, and then emits the altered MST signal.

When user authentication has been completed, an electronic device alters at least one of the following an emission cycle, pulse timing and sequence, each time the user taps the electronic device against a reader, and then emits an MST signal.

An electronic device determines the remaining battery capacity or the temperature of the battery. When the electronic device ascertains that the battery power is being consumed rapidly or the battery is being heated up by internal process, it may emit a simple transmission sequence.

An electronic device alters at least one of an emission cycle, pulse timing and sequence, according to cellular communication, and emits an MST signal. For example, when the electronic device is implemented to service GSM, it may adjust an emission cycle of an MST signal so that the MST signals cannot be affected by the TDMA cycle.

An electronic device receives characteristics of a POS terminal, related to, e.g., tracks, emission cycle, and the like, from a beacon terminal installed in a store, and adjusts at least one of an emission cycle, pulse timing and sequence, based on the receives values.

A method of operating an electronic device includes displaying objects related to a card to make a payment, performing user authentication in response to a payment request of a user, and after completing the user authentication, controlling a magnetic field communication module to emit a magnetic field signal containing data corresponding to two or more of Track 1, Track 2 and Track 3 of the card, for one cycle.

The method further includes controlling a magnetic field communication module to emit a magnetic field signal containing reversal data, created as the binary numbers of the data corresponding to the Track 1 or Track 2 are arranged in reverse order, for one cycle.

The method further includes controlling a magnetic field communication module to emit a first magnetic field signal containing data corresponding to one of the Track 1, Track 2 and Track 3, periodically, a number of times, and then a second magnetic field signal containing reversal data, created as the binary numbers of the data for the first magnetic field signal and another data corresponding to one of the other tracks are arranged in reverse order, periodically a number of times.

Figure 50:
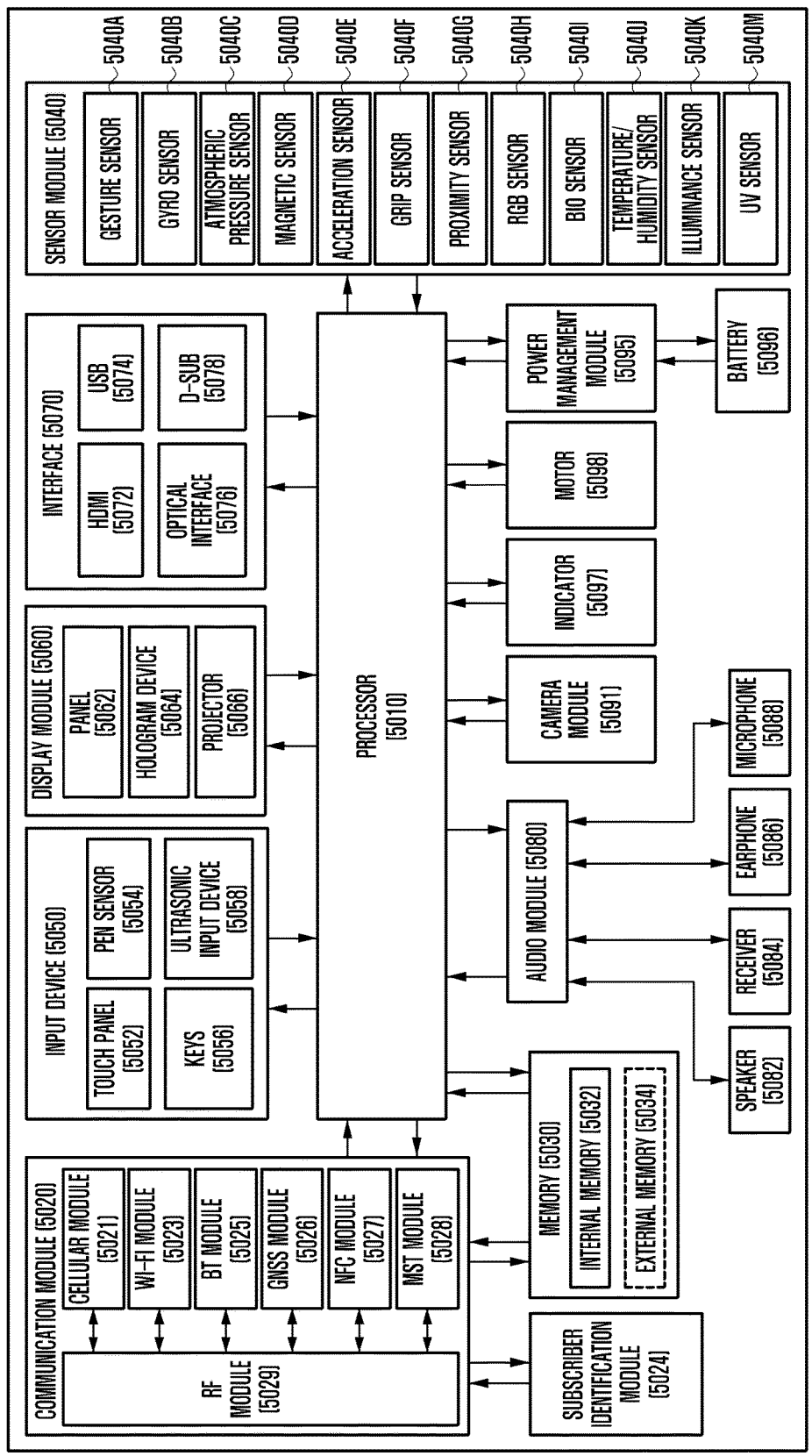
FIG. 50 is a block diagram illustrating an electronic device, according to an embodiment of the present disclosure.

FIG. 50 is a block diagram illustrating a configuration of an electronic device, according to an embodiment of the present disclosure.

Referring to FIG. 50, an electronic device 5001 is capable of including part or all of the components in the electronic device 10 of FIGS. 1A and 1B. The electronic device 5001 includes one or more processors 5010 (e.g., APs), a communication module 5020, a subscriber identification module (SIM) 5024, a memory 5030, a sensor module 5040, an input device 5050, a display 5060, an interface 5070, an audio module 5080, a camera module 5091, a power management module 5095, a battery 5096, an indicator 5097, and a motor 5098.

The processor 5010 is capable of driving, for example, an OS or an application program to control a plurality of hardware or software components connected to the processor 5010, processing various data, and performing operations. The processor 5010 may be implemented as, for example, a system on chip (SoC). The processor 5010 may further include a graphics processing unit (GPU) and/or an image signal processor (ISP). The processor 5010 may also include at least part of the components shown in FIG. 50, e.g., a cellular module 5021. The processor 5010 is capable of loading commands or data received from at least one of other components (e.g., a non-volatile memory) on a volatile memory, processing the loaded commands or data. The processor 5010 is capable of storing various data in a non-volatile memory.

The communication module 5020 may include the same or similar configurations as the communication interface 17 of FIGS. 1A and 1B. For example, the communication module 5020 includes the cellular module 5021, a Wi-Fi module 5023, a BT module 5025, a GNSS module 5026 (e.g., a GPS module, GLONASS module, BeiDou module or Galileo module), an NFC module 5027, an MST module 5028, and an RF module 5029.

The cellular module 5021 is capable of providing a voice call, a video call, an SMS service, an internet service, and the like, through a communication network, for example. According to an embodiment of the present disclosure, the cellular module 5021 is capable of identifying and authenticating the electronic device 5001 in a communication network by using theSIM 5024 (e.g., a SIM card). The cellular module 5021 is capable of performing at least part of the functions provided by the processor 5010. The cellular module 5021 is also capable of including a communication processor (CP).

Each of the Wi-Fi module 5023, the BT module 5025, the GNSS module 5026, and the NFC module 5027 is capable of including a processor for processing data transmitted or received through the corresponding module. The MST module 5028 is capable of including a processor for processing data transmitted or received through the corresponding module. At least part of the cellular module 5021, the Wi-Fi module 5023, the BT module 5025, the GNSS module 5026, the NFC module 5027, and the MST module 5028 (e.g., two or more modules) may be included in one integrated circuit (IC) or one IC package.

The RF module 5029 is capable of transmission/reception of communication signals, e.g., RF signals. The RF module 5029 is capable of including a transceiver, a power amp module (PAM), a frequency filter, a low noise amplifier (LNA), an antenna, and the like. At least one of the following modules: the cellular module 5021, the Wi-Fi module 5023, the BT module 5025, the GNSS module 5026, the NFC module 5027, and the MST module 5028 is capable of transmission/reception of RF signals through a separate RF module.

The SIM 5024 is capable of including a card including a SIM and/or an embodied SIM. The SIM 5024 is also capable of containing unique identification information, e.g., IC card ID (ICCID), or subscriber information, e.g., international mobile subscriber identity (IMSI).

The memory 5030 (e.g., the memory 103 of FIGS. 1A and 1B) includes at least one of a built-in memory 5032 and an external memory 5034. The built-in memory 5032 is capable of including at least one of the following: a volatile memory, e.g., a dynamic random access memory (RAM) (DRAM), a static RAM (SRAM), a synchronous DRAM (SDRAM), and the like, and a non-volatile memory, e.g., a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, and the like), a hard drive, a solid state drive (SSD), and the like.

The external memory 5034 is also capable of including a flash drive, e.g., a compact flash (CF), a secure digital (SD), a micro-SD, a mini-SD, an extreme digital (xD), a multimedia card (MMC), a memory stick, and the like. The external memory 5034 is capable of being connected to the electronic device 5001, functionally and/or physically, through various interfaces.

The memory 5030 is capable of storing payment information and a payment application serving as one of the application programs 104D. The payment information may refer to credit card numbers and personal identification numbers (PINs), corresponding to a credit card. The payment information may also include user authentication information, e.g., fingerprints, facial features, voice information, and the like.

When the payment application is executed by the processor 5010, it may enable the processor 5010 to perform an interaction with the user to make payment (e.g., displaying a screen to select a card (or a card image) and obtaining information (e.g., a card number) corresponding to a selected card (e.g., a pre-specified card) from payment information), and an operation to control magnetic field communication (e.g., transmitting the card information to an external device (e.g., a card reading apparatus) through the NFC module 5027 or the MST module 5028).

The sensor module 5040 is capable of measuring/detecting a physical quantity or an operation state of the electronic device 5001, and converting the measured or detected information into an electronic signal. The sensor module 5040 includes at least one of a gesture sensor 5040A, a gyro sensor 5040B, an atmospheric pressure sensor 5040C, a magnetic sensor 5040D, an acceleration sensor 5040E, a grip sensor 5040F, a proximity sensor 5040G, a color sensor 5040H (e.g., a red, green and blue (RGB) sensor), a biometric sensor 5040I, a temperature/humidity sensor 5040J, an illuminance sensor 5040K, and an ultraviolet (UV) sensor 5040M. Additionally or alternatively, the sensor module 5040 is capable of further including an E-nose sensor, an electromyography (EMG) sensor, an electroencephalogram (EEG) sensor, an ECG sensor, an infrared (IR) sensor, an iris sensor and/or a fingerprint sensor. The sensor module 5040 is capable of further including a control circuit for controlling one or more sensors included therein. In some embodiments of the present disclosure, the electronic device 5001 includes a processor, configured as part of the processor 5010 or a separate component, for controlling the sensor module 5040. In this case, while the processor 5010 is operating in sleep mode, the processor is capable of controlling the sensor module 5040.

The input device 5050 includes at least one of a touch panel 5052, a (digital) pen sensor 5054, a key 5056, or an ultrasonic input unit 5058. The touch panel 5052 may be implemented with at least one of the following: a capacitive touch system, a resistive touch system, an IR touch system, and an ultrasonic touch system. The touch panel 5052 may further include a control circuit. The touch panel 5052 may also further include a tactile layer to provide a tactile response to the user.

The (digital) pen sensor 5054 may be implemented with a part of the touch panel or with a separate recognition sheet. The key 5056 may include a physical button, an optical key, or a keypad. The ultrasonic input unit 5058 is capable of detecting ultrasonic waves, created in an input tool, through a microphone 5088, and identifying data corresponding to the detected ultrasonic waves.

The display 5060 (e.g., the display 106 of FIGS. 1A and 1B) includes at least one of a panel 5062, a hologram unit 5064, and a projector 5066. The panel 5062 may include the same or similar configurations as the display 16 of FIGS. 1A and 1B. The panel 5062 may be implemented to be flexible, transparent, or wearable. The panel 5062 may also be incorporated into one module together with the touch panel 5052. The hologram unit 5064 is capable of showing a stereoscopic image in the air by using light interference. The projector 5066 is capable of displaying an image by projecting light onto a screen. The screen may be located inside or outside of the electronic device 5001. According to an embodiment of the present disclosure, the display 5060 may further include a control circuit for controlling the panel 5062, the hologram unit 5064, or the projector 5066.

The interface 5070 includes at least one of an HDMI 5072, a USB 5074, an optical interface 5076, and a D-subminiature (D-sub) 5078. The interface 5070 may be included in the communication interface 17 shown in FIGS. 1A and 1B. Additionally or alternatively, the interface 5070 is capable of including a mobile high-definition link (MHL) interface, an SD card/MMC interface, or an infrared data association (IrDA) standard interface.

The audio module 5080 is capable of providing bidirectional conversion between a sound and an electronic signal. At least part of the components in the audio module 5080 may be included in the input/output interface 15 shown in FIGS. 1A and 1B. The audio module 5080 is capable of processing sound information input or output through a speaker 5082, a receiver 5084, earphones 5086, the microphone 5088, and the like.

The camera module 5091 refers to a device capable of taking both still and moving images. The camera module 5091 is capable of including one or more image sensors (e.g., a front image sensor or a rear image sensor), a lens, an ISP, a flash (e.g., an LED or xenon lamp), and the like.

The power management module 5095 is capable of managing power of the electronic device 5001. The power management module 5095 is capable of including a power management IC (PMIC), a charger IC, or a battery gauge.

The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, and the like. The battery gauge is capable of measuring the residual capacity, charge in voltage, current, or temperature of the battery 5096. The battery 5096 takes the form of either a rechargeable battery or a solar battery.

The indicator 5097 is capable of displaying a specific status of the electronic device 5001 or a part thereof (e.g., the processor 5010), e.g., a boot-up status, a message status, a charging status, and the like. The motor 5098 is capable of converting an electrical signal into mechanical vibrations, such as, a vibration effect, a haptic effect, and the like. The electronic device 5001 is capable of further including a processing unit (e.g., a GPU) for supporting a mobile TV. The processing unit for supporting a mobile TV is capable of processing media data pursuant to standards, e.g., digital multimedia broadcasting (DMB), digital video broadcasting (DVB), and the like.

Each of the elements described in the present disclosure may be formed with one or more components, and the names of the corresponding elements may vary according to the type of the electronic device. The electronic device may include at least one of the above described elements described in the present disclosure, and may exclude some of the elements or further include additional elements. Further, some of the elements of the electronic device may be coupled to form a single entity while performing the same functions as those of the corresponding elements before the coupling.

Figure 51:
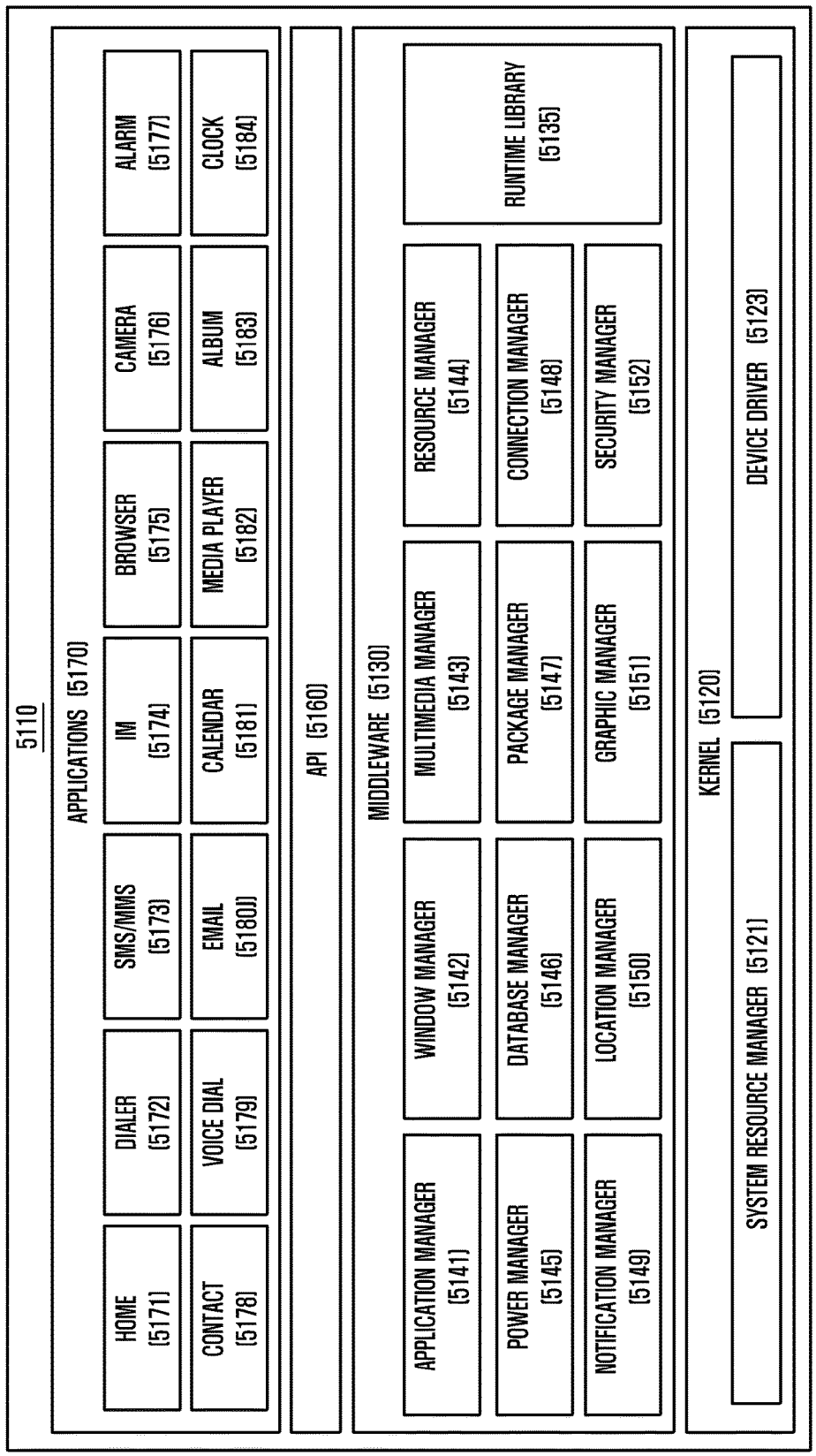
FIG. 51 is a block diagram illustrating a program module, according to an embodiment of the present disclosure.

FIG. 51 is a block diagram illustrating a programming module, according to an embodiment of the present disclosure.

Referring to FIG. 51, according to an embodiment of the present disclosure, a program module 5110 (e.g., the program module 14 of FIGS. 1A and 1B) is capable of including an OS for controlling resources related to the electronic device (e.g., the electronic device 11 of FIG. 1A) and/or various applications (e.g., application programs 14D of FIGS. 1A and 1B) running on the OS.

The program module 5110 includes a kernel 5120, middleware 5130, API 5160, and/or applications 5170. At least part of the program module 5110 may be preloaded on the electronic device or downloaded from a server (e.g., the first and second external electronic device 19A or 19B, the server 19C, and the like).

The kernel 5120 (for example, the kernel 14A) includes a system resource manager 5121 and/or a device driver 5123. The system resource manager 5121 may include, for example, a process manager, a memory manager, and a file system manager. The system resource manager 5121 may perform a system resource control, allocation, and recall. The device driver 5123 may include, for example, a display driver, a camera driver, a BT driver, a shared memory driver, a USB driver, a keypad driver, a Wi-Fi driver, and an audio driver. Further, according to an embodiment of the present disclosure, the device driver 312 may include an interprocess communication (IPC) driver.

The middleware 5130 may provide a function required in common by the applications 5170. Further, the middleware 5130 may provide a function through the API 5160 to allow the applications 5170 to efficiently use limited system resources within the electronic device. The middleware 5130 includes at least one of a runtime library 5135, an application manager 5141, a window manager 5142, a multimedia manager 5143, a resource manager 5144, a power manager 5145, a database manager 5146, a package manager 5147, a connection manager 5148, a notification manager 5149, a location manager 5150, a graphic manager 5151, and a security manager 5152.

The runtime library 5135 may include, for example, a library module used by a complier to add a new function through a programming language while the applications 5170 are executed. The runtime library 5135 executes input and output, management of a memory, a function associated with an arithmetic function and the like.

The application manager 5141 may manage, for example, a life cycle of at least one of the applications 5170. The window manager 5142 may manage GUI resources used on the screen. The multimedia manager 5143 may detect a format required for reproducing various media files and perform an encoding or a decoding of a media file by using a codec suitable for the corresponding format. The resource manager 5144 manages resources, such as a source code, a memory, a storage space, and the like, of at least one of the applications 5170.

The power manager 5145 may operate together with a basic input/output system (BIOS) to manage a battery or power and provides power information required for the operation. The database manager 5146 may manage generation, search, and change of a database to be used by at least one of the applications 5170. The package manager 5147 may manage an installation or an update of an application distributed in a form of a package file.

The connection manager 5148 may manage, for example, a wireless connection, such as Wi-Fi or BT. The notification manager 5149 may display or notify a user of an event, such as an arrival message, an appointment, a proximity alarm or the like, in a manner that does not disturb the user. The location manager 5150 may manage location information of the electronic device. The graphic manager 5151 may manage a graphic effect provided to the user or a UI related to the graphic effect. The security manager 5152 provides a general security function required for a system security or a user authentication. When the electronic device (for example, the electronic device 11) has a call function, the middleware 5130 may further include a telephony manager for managing a voice of the electronic device or a video call function.

The middleware 5130 is capable of including modules configuring various combinations of functions of the above described components. The middleware 5130 is capable of providing modules specialized according to types of OSs to provide distinct functions. The middleware 5130 may be adaptively configured in such a way as to remove part of the existing components or to include new components.

The API 5160 (for example, API 133) may be a set of API programming functions, and may be provided with a different configuration according to an OS. For example, a single API set may be provided for each platform, or two or more API sets may be provided.

The applications 5170 (e.g., the application programs 14D) include one or more applications for performing various functions, e.g., home 5171, dialer 5172, SMS/MMS 5173, instant message (IM) 5174, browser 5175, camera 5176, alarm 5177, context 5178, voice dial 5179, email 5180, calendar 5181, media player 5182, album 5183, clock 5184, health care (e.g., an application for measuring amount of exercise, blood sugar level, and the like), and environment information (e.g., an application for providing atmospheric pressure, humidity, temperature, and the like).

According to an embodiment of the present disclosure, the applications 5170 are capable of including an application for supporting information exchange between an electronic device (e.g., the electronic device 11 shown in FIG. 1A) and an external device (e.g., electronic devices 19A and 19B), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, and the like) to external devices (e.g., the first and second external electronic devices 19A and 19B). In addition, the notification relay application is capable of receiving notification information from external devices to provide the received information to the user.

The device management application is capable of managing (e.g., installing, removing or updating) at least one function of an external device (e.g., the first and second external electronic devices 19A and 19B) communicating with the electronic device. Examples of the function are a function of turning-on/off the external device or part of the external device, a function of controlling the brightness (or resolution) of the display, applications running on the external device, services provided by the external device, and the like. Examples of the services are a call service, messaging service, and the like.

The applications 5170 are capable of including an application (e.g., a health care application of a mobile medical device, and the like) specified attributes of an external device (e.g., the first and second external electronic devices 19A and 19B). The applications 5170 are capable of including applications received from an external device (e.g., the server 19C, and the first and second external electronic devices 19A and 19B). The applications 5170 are capable of including a preloaded application or third party applications that can be downloaded from a server. It should be understood that the components of the program module 5110 may be called different names according to types of OSs.

At least part of the program module 5110 can be implemented with software, firmware, hardware, or any combination of two or more of them. At least part of the program module 5110 can be implemented (e.g., executed) by a processor 5010. At least part of the programing module 5110 may include modules, programs, routines, sets of instructions or processes, and the like, in order to perform one or more functions.

The term "module", as used herein, may mean a unit including one of hardware, software, and firmware or any combination of two or more of them. The term "module" may be interchangeable with the term "unit," "logic," "logical block," "component," or "circuit." A module may be the smallest unit of an integrated component or a part thereof. A module may be the smallest unit that performs one or more functions or a part thereof. A module may be mechanically or electronically implemented. For example, a module may include at least one of the following: application-specific IC (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments can be implemented with instructions as programming modules that are stored in computer-readable storage media. One or more processors (e.g., the processor 5010) can execute instructions, thereby performing the functions. An example of the computer-readable storage media may be a memory 5030. At least part of the programming modules can be implemented (executed) by a processor. At least part of the programing module may include modules, programs, routines, sets of instructions or processes, and the like, in order to perform one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

The various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or programming modules, according to various embodiments, may include one or more components, remove part of them described above, or include new components. The operations performed by modules, programming modules, or the other components may be executed in serial, parallel, repetitive or heuristic fashion. Part of the operations can be executed in any other order, skipped, or executed with additional operations.

Embodiments of the present disclosure provide an electronic device capable of transmitting, to a card reading apparatus, payment information carried by magnetic field signals, and thus making payment for charges. Various embodiments also provide a handheld electronic device capable of making payment for charges, and the like, without errors, as if a magnetic card is used against the apparatus. Therefore, the present disclosure is capable of leading to activating offline mobile payment.

While the disclosure has been shown and described with reference to certain embodiments thereof, it will be understood by those skilled in the art that various changes in form and detail may be made therein without departing from the spirit and scope of the present disclosure as defined by the appended claims and their equivalents.

What is claimed is:

1. An electronic device comprising:
    a housing having a first surface facing a first direction, a second surface facing a second direction opposite to the first direction, and a side member enclosing at least a portion of a space between the first surface and the second surface;
    a conductive pattern disposed in the housing and having a first conductive coil with an axis that is substantially perpendicular to the first direction or the second direction;
    a communication circuit disposedin the housing, electrically connected with the first conductive coil, and configured to cause the first conductive coil to generate a magnetic flux;
    a display exposed through at least a portion of the first surface; and
    a processor disposed in the housing and electrically connected with the communication circuit and the display,
    wherein the second surface comprises a first region made of a conductive material and a second region made of a nonconductive material,
    wherein the first region comprises one or more openings,
    wherein the second region fills a first opening of the one or more openings,
    wherein, when viewed from the second surface, the first conductive coil is disposed mostly under the first region, and
    wherein the first conductive coil is configured to include a first section disposed near or on the second region to cause the magnetic flux to pass through the second region.

2. The electronic device of claim 1, wherein the second surface further comprises a third region made of a nonconductive material, wherein the third region fills a second opening of the one or more openings, and wherein the first conductive coil is configured to include a second section disposed near or on the third region to cause the magnetic flux to pass through the third region.

3. The electronic device of claim 2, wherein, when viewed from the second surface, the axis of the first conductive coil extends in a third direction from the first region to the second region.

4. The electronic device of claim 3, wherein the first conductive coil is wound along the axis.

5. The electronic device of claim 2, wherein, when viewed from the second surface, the second region and the third region are at least partially enclosed by the first region.

6. The electronic device of claim 2, wherein the second region and the third region are arranged symmetrically with respect to a portion of the first region.

7. The electronic device of claim 1, further comprising a flexible printed circuit board (FPCB), and wherein the conductive pattern is mounted on the FPCB.

8. The electronic device of claim 7, wherein the FPCB comprises a first layer, a second layer, and a middle layer between the first layer and the second layer, wherein the first layer comprises a first plurality of first conductive lines constituting a part of the first conductive coil, wherein the second layer comprises a second plurality of second conductive lines constituting another part of the first conductive coil, and wherein the middle layer comprises a plurality of conductive vias to electrically connect the plurality of first conductive lines and the plurality of second conductive lines.

9. The electronic device of claim 8, wherein the FPCB further comprises a core to increase the magnetic force generated by the first conductive coil.

10. The electronic device of claim 1, wherein the conductive pattern further comprises a second conductive coil disposed in the housing and having an axis substantially perpendicular to the first direction or the second direction.

11. The electronic device of claim 10, wherein the first conductive coil and the second conductive coil are realized using an FPCB.

12. The electronic device of claim 11, wherein the FPCB includes a first layer, a second layer, a third layer, a fourth layer, and a fifth layer, wherein the first conductive coil is formed on the first layer and the fifth layer, and wherein the second conductive coil is formed on the second layer and the fourth layer.

13. The electronic device of claim 10, wherein one coil among the first conductive coil and the second conductive coil is used for one of near field communication (NFC), magnetic secure transmission (MST), and wireless charging, and the other coil is used for another one of NFC, MST, and wireless charging.

14. The electronic device of claim 1, wherein the conductive region of the housing is electrically connected with the first conductive coil to form a current path.

15. The electronic device of claim 1, wherein the direction of a current flowing through the first conductive coil is perpendicular to the direction of signal lines arranged in the display.

16. An electronic device comprising:
a housing comprising a first surface facing a first direction, a second surface facing a second direction opposite to the first direction, and a side member enclosing at least a portion of a space between the first surface and the second surface;
a conductive pattern disposed in the housing, and having a first conductive coil with a first axis that is substantially parallel with the first direction or the second direction, and a second conductive coil with a second axis that is substantially perpendicular to the first direction or the second direction;
a communication circuit disposed in the housing, electrically connected with the first conductive coil and the second conductive coil, and configured to cause at least one of the first conductive coil and the second conductive coil to generate a magnetic flux;
a display exposed through at least a portion of the first surface; and
a processor disposed in the housing and electrically connected with the communication circuit and the display,
wherein, when viewed from the second surface, the first conductive coil encloses the second conductive coil, and
wherein, when viewed from the second surface, the second conductive coil is disposed mostly under the second surface.

17. The electronic device of claim 16, wherein the first conductive coil and the second conductive coil emit a magnetic field signal carrying magnetic secure transmission (MST) data.

18. The electronic device of claim 16, wherein one of the first conductive coil and the second conductive coil emits a magnetic field signal carrying MST data, and another of the first conductive coil and the second conductive coil emits a magnetic field signal carrying near field communication (NFC) data.

19. The electronic device of claim 16, wherein the first conductive coil and the second conductive coil are realized using a flexible printed circuit board (FPCB), and
wherein the FPCB comprises a first layer, a second layer, and a middle layer between the first layer and the second layer, wherein, when viewed from the second surface, the first conductive coil is disposed on the first layer so as to enclose the second conductive coil, wherein the first layer comprises a plurality of first conductive lines constituting a part of the second conductive coil, wherein the second layer comprises a plurality of second conductive lines constituting another part of the second conductive coil, and wherein the middle layer comprises a plurality of conductive vias to electrically connect the plurality of first conductive lines of the first layer and the plurality of second conductive lines of the second layer.

20. The electronic device of claim 19, wherein the middle layer comprises a first shield layer to prevent a first magnetic field signal of the first conductive coil from affecting a second magnetic field signal of the second conductive coil, and wherein the second layer comprises a second shield layer to prevent the second magnetic field signal from affecting the first magnetic field signal.

* * * * *